US010619944B2

(12) United States Patent
Cole et al.

(10) Patent No.: US 10,619,944 B2
(45) Date of Patent: Apr. 14, 2020

(54) HEAT EXCHANGER INCLUDING MANIFOLD

(71) Applicant: The Abell Foundation, Inc., Baltimore, MD (US)

(72) Inventors: Barry R. Cole, Mineral, VA (US); Laurence Jay Shapiro, Baltimore, MD (US); Barry Noel, Montpelier, VA (US); Hoseong Lee, College Park, MD (US); Yunho Hwang, Ellicott City, MD (US); Daniel Latimer Wilkins, Saint Leonard, MD (US)

(73) Assignee: The Abell Foundation, Inc., Baltimore, MD (US)

( * ) Notice: Subject to any disclaimer, the term of this patent is extended or adjusted under 35 U.S.C. 154(b) by 554 days.

(21) Appl. No.: 14/435,829

(22) PCT Filed: Oct. 15, 2013

(86) PCT No.: PCT/US2013/065004
§ 371 (c)(1),
(2) Date: Apr. 15, 2015

(87) PCT Pub. No.: WO2014/062653
PCT Pub. Date: Apr. 24, 2014

(65) Prior Publication Data
US 2015/0260464 A1 Sep. 17, 2015

Related U.S. Application Data

(60) Provisional application No. 61/720,591, filed on Oct. 31, 2012, provisional application No. 61/714,538, filed on Oct. 16, 2012.

(51) Int. Cl.
F28F 3/08 (2006.01)
F28F 3/12 (2006.01)
(Continued)

(52) U.S. Cl.
CPC .............. F28F 3/08 (2013.01); F03G 7/05 (2013.01); F28D 7/06 (2013.01); F28D 9/005 (2013.01);
(Continued)

(58) Field of Classification Search
CPC .. F28F 3/08; F28F 3/12; F28D 9/0081; F28D 9/0056
(Continued)

(56) References Cited

U.S. PATENT DOCUMENTS 2,038,172 A 4/1936 Haley
2,156,544 A 5/1939 Raskin
(Continued)

FOREIGN PATENT DOCUMENTS

CN 85106574 A 3/1989
CN 2670889 Y 1/2005
(Continued)

OTHER PUBLICATIONS

Notification of Transmittal of the International Search Report and the Written Opinion of the International Searching Authority for PCT/US2013/065004 dated Jan. 23, 2014, 17 pages.
(Continued)

Primary Examiner — Leonard R Leo
(74) Attorney, Agent, or Firm — Fish & Richardson P.C.

(57) ABSTRACT

A heat exchanger includes heat exchanger plates in a stacked arrangement such that each heat exchanger plate is spaced apart from the adjacent heat exchanger plate. The space between adjacent heat exchanger plates defines an external fluid passageway, and each external fluid passageway is configured to receive a first fluid. Each heat exchanger plate includes a peripheral edge, an internal fluid passageway configured to receive a second fluid. The internal fluid passageway includes an inlet and an outlet that open at the
(Continued)

peripheral edge. The heat exchanger further includes a manifold having a supply chamber in fluid communication with the inlet of each heat exchanger plate and a discharge chamber in fluid communication with the outlet of each heat exchanger plate.

20 Claims, 40 Drawing Sheets

(51) Int. Cl.
  *F28D 9/00* (2006.01)
  *F28F 9/26* (2006.01)
  *F03G 7/05* (2006.01)
  *F28D 7/06* (2006.01)
(52) U.S. Cl.
  CPC ......... *F28D 9/0056* (2013.01); *F28D 9/0081* (2013.01); *F28D 9/0093* (2013.01); *F28F 9/26* (2013.01); *F28F 3/12* (2013.01); *Y02E 10/34* (2013.01)
(58) Field of Classification Search
  USPC ................................................ 165/170, 146
  See application file for complete search history.

(56) References Cited

U.S. PATENT DOCUMENTS

| | | | |
|---|---|---|---|
| 2,263,182 A | 11/1941 | MacPherson | |
| 2,619,811 A | 12/1952 | Philipp | |
| 2,648,217 A | 8/1953 | Gladville | |
| 2,827,774 A | 3/1958 | Dunkelman | |
| 2,900,175 A | 8/1959 | McGuffey | |
| 3,095,014 A | 6/1963 | Dosker | |
| 3,246,689 A | 4/1966 | Remde et al. | |
| 3,312,056 A | 4/1967 | Lagelbauer | |
| 3,334,399 A * | 8/1967 | Teeguarden | B21D 53/04 |
| | | | 165/166 |
| 3,368,614 A | 2/1968 | Anderson | |
| 3,502,141 A | 3/1970 | Allen | |
| 3,524,476 A | 8/1970 | Thomas | |
| 3,538,955 A | 11/1970 | Anderson | |
| 3,558,439 A | 1/1971 | Anderson | |
| 3,599,589 A | 8/1971 | Busey | |
| 3,795,103 A | 3/1974 | Anderson | |
| 3,805,515 A | 4/1974 | Zener | |
| 3,837,308 A | 9/1974 | Harvey et al. | |
| 4,002,200 A | 1/1977 | Raskin | |
| 4,006,619 A | 2/1977 | Anderson | |
| 4,014,279 A | 3/1977 | Pearson | |
| 4,030,301 A | 6/1977 | Anderson | |
| 4,036,286 A | 7/1977 | Anderson et al. | |
| 4,048,943 A | 9/1977 | Gerwick, Jr. | |
| 4,055,145 A | 10/1977 | Mager et al. | |
| 4,062,189 A | 12/1977 | Mager et al. | |
| 4,066,121 A | 1/1978 | Klein | |
| 4,087,975 A | 5/1978 | Owens | |
| 4,089,324 A | 5/1978 | Tjaden | |
| 4,131,159 A | 12/1978 | Long | |
| 4,139,054 A | 2/1979 | Anderson | |
| 4,179,781 A | 12/1979 | Long | |
| 4,201,263 A | 5/1980 | Anderson | |
| 4,209,061 A | 6/1980 | Schwemin | |
| 4,209,991 A | 7/1980 | Anderson | |
| 4,210,819 A | 7/1980 | Wittig et al. | |
| 4,210,820 A | 7/1980 | Wittig | |
| 4,229,868 A | 10/1980 | Kretzinger | |
| 4,231,312 A | 11/1980 | Person | |
| 4,231,420 A | 11/1980 | Anderson | |
| 4,234,269 A | 11/1980 | Person et al. | |
| 4,254,626 A | 3/1981 | Anderson | |
| 4,265,301 A | 5/1981 | Anderson | |
| 4,281,614 A | 8/1981 | McNary et al. | |
| 4,282,834 A | 8/1981 | Anderson | |
| 4,290,631 A | 9/1981 | Anderson | |
| 4,301,375 A | 11/1981 | Anderson | |
| 4,334,965 A | 6/1982 | Wu | |
| 4,350,014 A | 9/1982 | Sanchez et al. | |
| 4,358,225 A | 11/1982 | van der Pot et al. | |
| 4,363,570 A | 12/1982 | van der Pot | |
| 4,384,459 A | 5/1983 | Johnston | |
| 4,417,446 A | 11/1983 | Nakamoto et al. | |
| 4,434,112 A | 2/1984 | Pollock | |
| 4,497,342 A | 2/1985 | Wenzel et al. | |
| 4,548,043 A | 10/1985 | Kalina | |
| 4,578,953 A | 4/1986 | Krieger et al. | |
| 4,603,553 A | 8/1986 | Ridgway | |
| 4,628,212 A | 12/1986 | Uehara et al. | |
| 4,700,543 A | 10/1987 | Krieger et al. | |
| 4,731,072 A * | 3/1988 | Aid | A61M 5/44 |
| | | | 604/408 |
| 4,749,032 A | 6/1988 | Rosman et al. | |
| 4,753,554 A | 6/1988 | Jeter | |
| 4,809,774 A | 3/1989 | Hagemeister | |
| 4,823,867 A | 4/1989 | Pollard et al. | |
| 4,871,017 A | 10/1989 | Cesaroni | |
| 5,057,217 A | 10/1991 | Lutz et al. | |
| 5,074,280 A * | 12/1991 | Evens | F24H 3/105 |
| | | | 126/110 R |
| 5,076,354 A | 12/1991 | Nishishita | |
| 5,101,890 A | 4/1992 | Aoki et al. | |
| 5,104,263 A | 4/1992 | Shibahara et al. | |
| 5,123,772 A | 6/1992 | Anderson | |
| 5,359,989 A | 11/1994 | Chase et al. | |
| 5,417,280 A * | 5/1995 | Hayashi | B60H 1/3227 |
| | | | 165/153 |
| 5,441,489 A | 8/1995 | Utsumi et al. | |
| 5,555,838 A | 9/1996 | Bergman | |
| 5,582,691 A | 12/1996 | Flynn et al. | |
| 5,656,345 A | 8/1997 | Strand et al. | |
| 5,769,155 A | 6/1998 | Ohadi et al. | |
| 5,875,838 A * | 3/1999 | Haselden | F28D 9/0043 |
| | | | 165/146 |
| 5,983,624 A | 11/1999 | Anderson | |
| 6,167,693 B1 | 1/2001 | Anderson | |
| 6,289,977 B1 * | 9/2001 | Claudel | B23K 26/10 |
| | | | 165/170 |
| 6,293,734 B1 | 9/2001 | Thomas et al. | |
| 6,301,872 B1 | 10/2001 | Anderson | |
| 6,347,912 B1 | 2/2002 | Thomas | |
| 6,406,223 B1 | 6/2002 | Thomas | |
| 6,451,204 B1 | 9/2002 | Anderson | |
| 6,472,614 B1 | 10/2002 | Dupont et al. | |
| 6,481,197 B1 | 11/2002 | Anderson | |
| 6,553,752 B2 | 4/2003 | Anderson | |
| 6,634,853 B1 | 10/2003 | Anderson | |
| 6,663,343 B1 | 12/2003 | Anderson | |
| 6,718,901 B1 | 4/2004 | Abbott et al. | |
| 6,742,578 B2 | 6/2004 | Nakamura | |
| 6,843,278 B2 | 1/2005 | Espinasse | |
| 6,848,863 B2 | 2/2005 | Karayaka et al. | |
| 6,942,019 B2 * | 9/2005 | Pikovsky | F28F 3/12 |
| | | | 165/170 |
| 7,197,999 B2 | 4/2007 | Murray | |
| 7,243,716 B2 | 7/2007 | Denniel et al. | |
| 7,328,578 B1 | 2/2008 | Saucedo | |
| 7,431,623 B1 | 10/2008 | Saucedo et al. | |
| 7,472,742 B2 | 1/2009 | Kumar et al. | |
| 7,600,569 B2 | 10/2009 | Routeau et al. | |
| 7,610,949 B2 | 11/2009 | Palanchon | |
| 7,735,321 B2 | 6/2010 | Howard | |
| 7,749,464 B2 | 7/2010 | Sakakura et al. | |
| 7,882,703 B2 | 2/2011 | Pellen | |
| 7,900,452 B2 | 3/2011 | Howard et al. | |
| 7,941,921 B2 * | 5/2011 | Filippi | B01J 8/0257 |
| | | | 165/170 |
| 8,025,834 B2 | 9/2011 | Miller et al. | |
| 8,043,027 B2 | 10/2011 | Duroch et al. | |
| 8,070,388 B2 | 12/2011 | Thomas | |
| 8,070,389 B2 | 12/2011 | Ayers et al. | |
| 8,083,902 B2 | 12/2011 | Al-Garni et al. | |
| 8,096,589 B2 | 1/2012 | De Aquino et al. | |
| 8,100,150 B2 | 1/2012 | Jung et al. | |

(56) References Cited

U.S. PATENT DOCUMENTS

| | | |
|---|---|---|
| 8,117,843 B2 | 2/2012 | Howard et al. |
| 8,123,226 B2 | 2/2012 | Bell et al. |
| 8,146,362 B2 | 4/2012 | Howard et al. |
| 8,152,949 B2 | 4/2012 | Bailey et al. |
| 8,172,481 B2 | 5/2012 | Luppi |
| 8,182,176 B2 | 5/2012 | Bailey et al. |
| 8,250,847 B2 | 8/2012 | Rapp et al. |
| 8,256,469 B2 | 9/2012 | Felix-Henry |
| 8,282,315 B2 | 10/2012 | Espinasse et al. |
| 8,286,516 B2 | 10/2012 | Routeau et al. |
| 8,353,162 B2 | 1/2013 | Nagurny |
| 8,424,307 B2 | 4/2013 | Hsu et al. |
| 8,444,182 B2 | 5/2013 | Kuo et al. |
| 9,086,057 B2 | 7/2015 | Rekret et al. |
| 2002/0168232 A1 | 11/2002 | Xu et al. |
| 2003/0172758 A1 | 9/2003 | Anderson |
| 2003/0221603 A1 | 12/2003 | Horton |
| 2005/0155749 A1 | 7/2005 | Memory et al. |
| 2006/0008695 A1 | 1/2006 | Bai et al. |
| 2006/0231344 A1 | 10/2006 | Drzewiecki |
| 2007/0028626 A1 | 2/2007 | Chen |
| 2007/0163765 A1* | 7/2007 | Rondier ............... H01L 23/473 165/170 |
| 2007/0267000 A1 | 11/2007 | Raduenz |
| 2007/0289303 A1 | 12/2007 | Prueitt |
| 2008/0025799 A1 | 1/2008 | Kawasaki |
| 2008/0110595 A1 | 5/2008 | Palanchon |
| 2008/0295517 A1 | 12/2008 | Howard et al. |
| 2009/0013690 A1 | 1/2009 | Marshall |
| 2009/0077969 A1 | 3/2009 | Prueitt |
| 2009/0158987 A1 | 6/2009 | Ramachandran et al. |
| 2009/0178722 A1 | 7/2009 | Howard |
| 2009/0183862 A1 | 7/2009 | Benezech et al. |
| 2009/0217664 A1 | 9/2009 | Rapp et al. |
| 2009/0258289 A1 | 10/2009 | Weber et al. |
| 2009/0294110 A1 | 12/2009 | Foust |
| 2009/0301088 A1 | 12/2009 | Kuo et al. |
| 2009/0308582 A1 | 12/2009 | Nagurny et al. |
| 2010/0084120 A1* | 4/2010 | Yin ..................... F22B 27/00 165/146 |
| 2010/0139272 A1 | 6/2010 | Howard et al. |
| 2010/0180924 A1 | 7/2010 | Bailey et al. |
| 2010/0275597 A1 | 11/2010 | Kuo |
| 2011/0079375 A1 | 4/2011 | Nagurny et al. |
| 2011/0120636 A1 | 5/2011 | Bailey et al. |
| 2011/0127022 A1 | 6/2011 | Eller et al. |
| 2011/0173978 A1 | 7/2011 | Rekret et al. |
| 2011/0173979 A1 | 7/2011 | Krull et al. |
| 2011/0272864 A1 | 11/2011 | Miller et al. |
| 2011/0293379 A1 | 12/2011 | Halkyard et al. |
| 2012/0011849 A1 | 1/2012 | Cole et al. |
| 2012/0024504 A1 | 2/2012 | Jensen |
| 2012/0043755 A1 | 2/2012 | Van Ryzin et al. |
| 2012/0073291 A1 | 3/2012 | Shapiro et al. |
| 2012/0080164 A1 | 4/2012 | Nagurny et al. |
| 2012/0080175 A1 | 4/2012 | Levings et al. |
| 2012/0125561 A1 | 5/2012 | Levings et al. |
| 2012/0167813 A1 | 7/2012 | Lambrakos et al. |
| 2012/0183356 A1 | 7/2012 | Risi et al. |
| 2012/0186781 A1 | 7/2012 | Dreyer et al. |
| 2012/0195690 A1 | 8/2012 | Luo et al. |
| 2012/0199335 A1 | 8/2012 | Maurer |
| 2012/0201611 A1 | 8/2012 | Flores, Sr. et al. |
| 2012/0207600 A1 | 8/2012 | Harris et al. |
| 2012/0216737 A1 | 8/2012 | Luo et al. |
| 2012/0234597 A1 | 9/2012 | Madden |
| 2012/0241040 A1 | 9/2012 | Fogg |
| 2012/0257931 A1 | 10/2012 | Tkaczyk et al. |
| 2013/0037601 A1 | 2/2013 | Eller et al. |
| 2013/0153171 A1 | 6/2013 | Nagurny et al. |
| 2015/0271909 A1 | 9/2015 | Brooks et al. |

FOREIGN PATENT DOCUMENTS

| | | |
|---|---|---|
| CN | 201301785 | 9/2009 |
| CN | 101568790 | 10/2009 |
| EP | 183008 B1 | 6/1989 |
| EP | 0908382 | 4/1999 |
| EP | 1788335 | 5/2007 |
| EP | 02508831 | 10/2012 |
| EP | 2508831 A1 | 10/2012 |
| JP | 55-001479 | 1/1980 |
| JP | 55-32896 | 3/1980 |
| JP | 57-157004 | 9/1982 |
| JP | 59130963 | 9/1984 |
| JP | 60028681 | 2/1985 |
| JP | S61-049995 | 3/1986 |
| JP | 61-149507 | 7/1986 |
| JP | S62142989 | 6/1987 |
| JP | 02-271080 | 11/1990 |
| JP | 05-288481 | 11/1993 |
| JP | 05-340342 | 12/1993 |
| JP | 6235596 | 8/1994 |
| JP | 07098193 | 4/1995 |
| JP | H10-137877 | 5/1998 |
| JP | 10513540 | 12/1998 |
| JP | 2002-267272 | 9/2002 |
| JP | 2005127650 | 5/2005 |
| JP | 2005195192 | 7/2005 |
| JP | 2006336873 | 12/2006 |
| JP | 2007-518053 | 7/2007 |
| JP | 2007278568 | 10/2007 |
| JP | 04046289 | 2/2008 |
| JP | 2008045775 | 2/2008 |
| JP | 2014-524540 | 9/2014 |
| KR | 2006104306 A | 10/2006 |
| KR | 2009/0095917 | 9/2009 |
| WO | WO 90/01659 | 2/1990 |
| WO | WO 1990/010839 | 9/1990 |
| WO | WO 96/07028 | 3/1996 |
| WO | 9620382 | 7/1996 |
| WO | WO 2004031676 | 4/2004 |
| WO | WO 2007/064572 | 6/2007 |
| WO | WO 2011/035943 | 3/2011 |
| WO | WO 2011/091295 | 7/2011 |

OTHER PUBLICATIONS

Notification Concerning Transmittal of Copy of International Preliminary Report on Patentability (Chapter I of the Patent Cooperation Treaty) for International Application No. PCT/US2013/065004, dated Apr. 30, 2015, 13 pages.

Partial Supplementary European Search Report for corresponding EP Application No. 13847774.0, dated Aug. 5, 2016, 6 pages.

English Translation of the Notification of First Office Action issued in corresponding CN Application No. 201380065659.9 dated Aug. 26, 2016, 13 pages.

Japan Office Action in Japanese Application No. 2015-537003, dated Oct. 24, 2017, 36 pages (with English translation).

European Communication in Application No. 13847774, dated Mar. 13, 2018, 4 pages.

Avery, William H. et al., "Renewable Energy From the Ocean—A Guide to OTEC", The John's Hopkins University—Applied Physics Laboratory Series in Science and Engineering (1994).

Chinese Office Action in Chinese Application No. 201610913479.7 dated May 20, 2019, (14 pages with English translation).

Chinese Office Action in Chinese Application No. 201710890585.2, dated Mar. 1, 2019, (15 pages with English translation).

European Communication in Application No. 12823372.3, dated Mar. 13, 2019, 6 pages.

Indian Communication in Application No. 1761/DELNP/2014, dated Mar. 6, 2019, 7 pages.

Indian Communication in Application No. 1763/DELNP/2014, dated Mar. 19, 2019, 5 pages.

Indian Communication in Application No. 4028/DELNP/2015, dated May 24, 2019, 6 pages.

International Preliminary Report on Patentability in International Application No. PCT/US2011/022115, dated Jul. 24, 2012 (7 pages).

(56) References Cited

OTHER PUBLICATIONS

International Preliminary Report on Patentability in International Application No. PCT/US2011/044015, dated Jan. 24, 2013 (6 pages).
International Preliminary Report on Patentability in International Application No. PCT/US2012/050941, dated Feb. 18, 2014 (7 pages).
International Preliminary Report on Patentability in International Application No. PCT/US2012/050954, dated Feb. 18, 2014, (7 pages).
Japan Patent Office, Notice of Reasons for Rejection in JP Appl. No. 2013-519829 dated Mar. 31, 2015, 12 pages.
Japan Patent Office, Notice of Reasons for Rejection issued in JP Appl. No. 2012-550166 dated Dec. 9, 2014 8 pages (with English Translation).
Japanese Office Action issued in corresponding Japan Application No. 2014-526169 dated Jul. 14, 2016, 13 pages (with translation).
Korean Office Action in Application No. 10-2014-7006928, dated Sep. 6, 2018, 7 pages.
PCT International Search Report and the Written Opinion in International Application No. PCT/US2011/022115, dated Nov. 18, 2011 (10 pages).
PCT International Search Report and Written Opinion in International Appln. No. PCT/US2013/065098, dated Jan. 21, 2014, 11 pages.
PCT International Search Report and Written Opinion in International Appln. No. PCT/US2012/050941, dated Feb. 27, 2013, 10 pages.
PCT International Search Report and Written Opinion in International Appln. No. PCT/US2012/050933, dated Feb. 15, 2013, 10 pages.
PCT International Search Report and Written Opinion in International Appln. No. PCT/US2012/050954, dated Feb. 15, 2013, 10 pages.
PCT International Search Report and Written Opinion in International Appln. No. PCT/US2011/044015, dated Mar. 22, 2012, 8 pages.
State Intellectual Property Office of the People's Republic of China, The First Office Action issued in CN 201180015212.1 dated Sep. 23, 2014, 10 pages (with English Translation).
State Intellectual Property Office of the People's Republic of China, The First Office Action issued in CN 201610913479.7, dated Jul. 5, 2017, 25 pages (with English translation).
State Intellectual Property Office of the People's Republic of China, The Second Office Action issued in CN 201180015212.1 dated Mar. 18, 2015, 7 pages (with English Translation).
Supplementary European Search Report for EP Appl. No. 12823372.3 dated Feb. 27, 2015, 5 pages.
USPTO Final Office Action; dated Dec. 19, 2013; U.S. Appl. No. 13/183,047; Ex. Harris; 10 pp.
USPTO Final Office Action; dated Feb. 20, 2015; U.S. Appl. No. 13/209,944; Ex. Leo; 14 pp.
USPTO Final Office Action; dated Mar. 31, 2014; U.S. Appl. No. 12/691,655; Ex. Nguyen; 13 pp.
USPTO Final Office Action; dated Oct. 25, 2013; U.S. Appl. No. 13/011,619; Ex. Mian; 16 pp.
USPTO Final Office Action; dated Oct. 9, 2013; U.S. Appl. No. 13/209,893; Ex. Wan; 19 pp.
USPTO Non-Final Office Action; dated Apr. 2, 2014; U.S. Appl. No. 13/209,865; Ex. Dounis; 36 pp.
USPTO Non-Final Office Action; dated Jun. 18, 2014; U.S. Appl. No. 13/209,944; Ex. Leo; 14 pp.
USPTO Non-Final Office Action; dated Jun. 6, 2014; U.S. Appl. No. 13/011,619;Ex. Mian; 17 pp.
USPTO Office Action, dated Apr. 26, 2013; U.S. Appl. No. 13/209,893; Ex. Wan; 31 pp.
USPTO Office Action, dated Apr. 3, 2015, U.S. Appl. No. 13/209,893, Ex. Wan, 7pp.
USPTO Office Action; dated Apr. 26, 2013; U.S. Appl. No. 13/183,047; Ex. Harris, 22 pp.
USPTO Office Action; dated Apr. 5, 2013; U.S. Appl. No. 12/691,655; Ex. Nguyen; 13 pp.
USPTO Office Action; dated Feb. 8, 2013; U.S. Appl. No. 13/011,619; Ex. Mian; 33 pp.
USPTO Office Action; dated Feb. 25, 2014; U.S. Appl. No. 12/691,663; Ex. Nguyen; 7 pp.
USPTO Office Action; dated Jul. 1, 2013; U.S. Appl. No. 13/209,865; Ex. Dounis; 31 pp.
USPTO Office Action; dated Mar. 29, 2013; U.S. Appl. No. 12/691,663; Ex. Nguyen; 12 pp.
USPTO Office Action; dated May 20, 2014; U.S. Appl. No. 13/209,893; Ex. Wan; 21 pp.
USPTO Office Action; dated Sep. 16, 2013; U.S. Appl. No. 12/691,655; Ex. Nguyen; 10 pp.
JP Office Action in Japanese Appln. No. 2016-242996, dated Jun. 6, 2019, 7 pages (with English translation).
KR Office Action in Korean Appln. No. 10-2014-7006928, dated Jul. 30, 2019, 8 pages (with English translation).
EP Extended Search Report in European Appln. No. 19181667.7, dated Dec. 11, 2019, 7 pages.
KR Office Action in Korean Appln. No. 10-2019-7032103, dated Dec. 12, 2019, 12 pages. (with English translation).

* cited by examiner

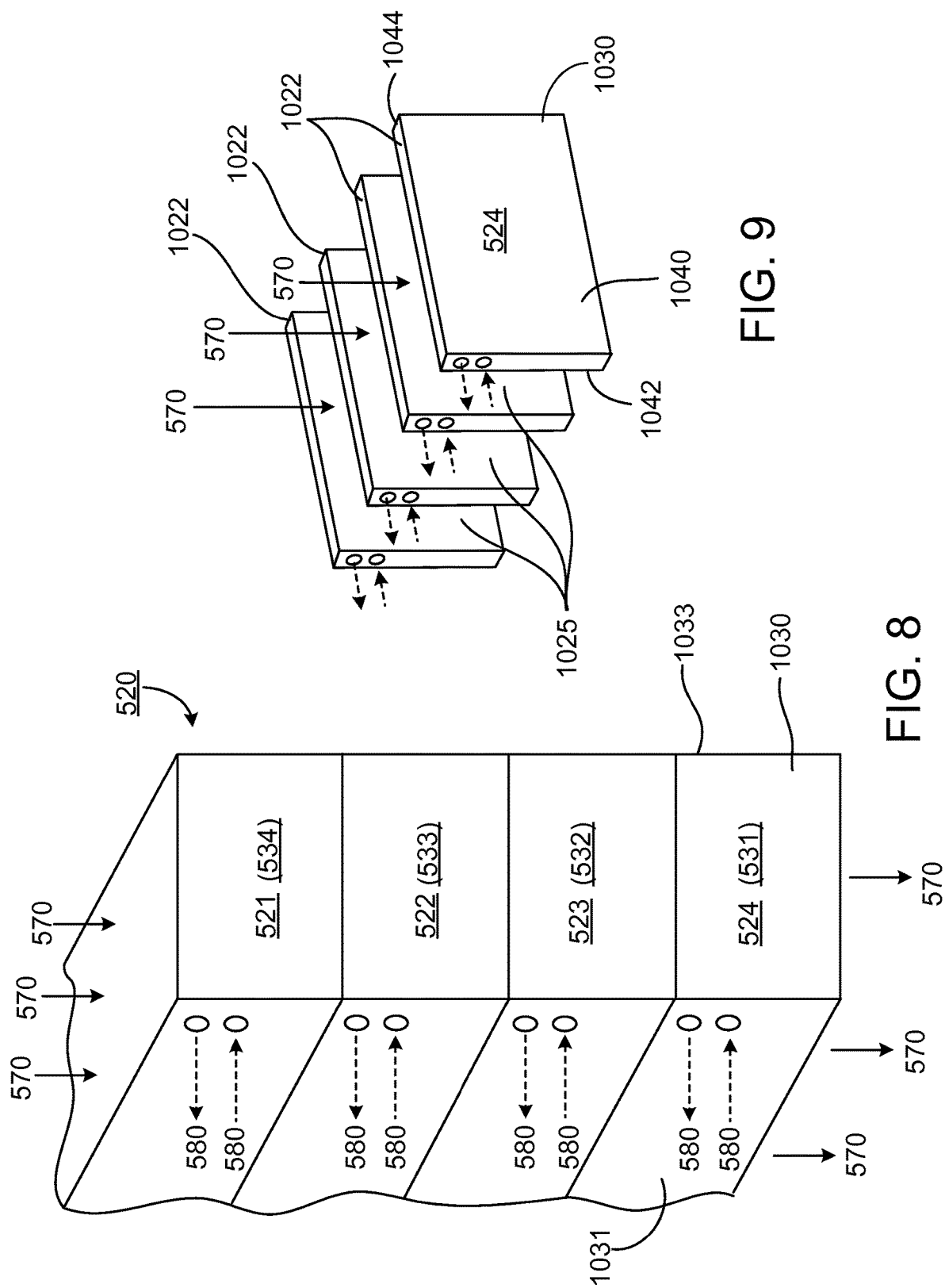

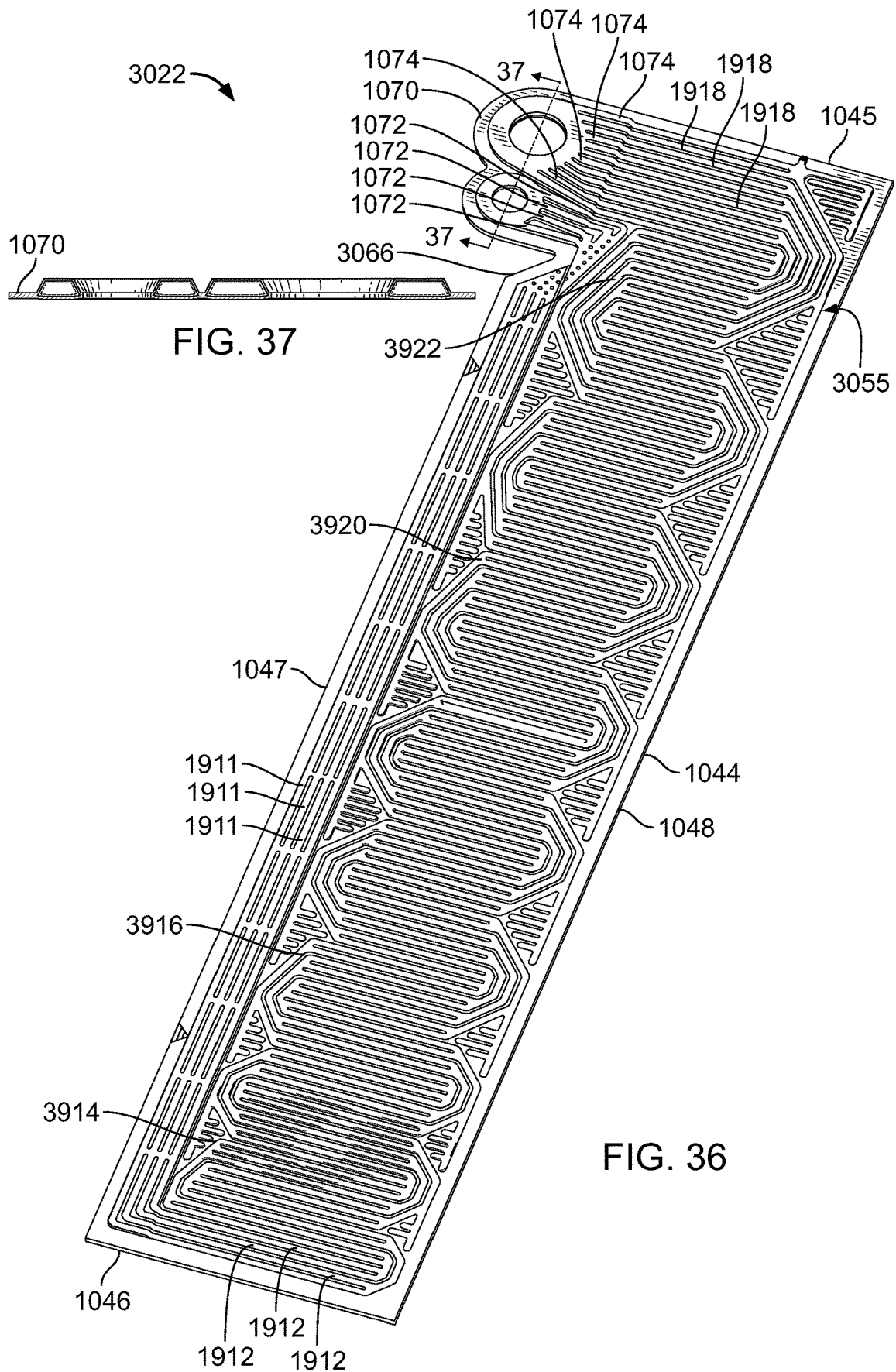

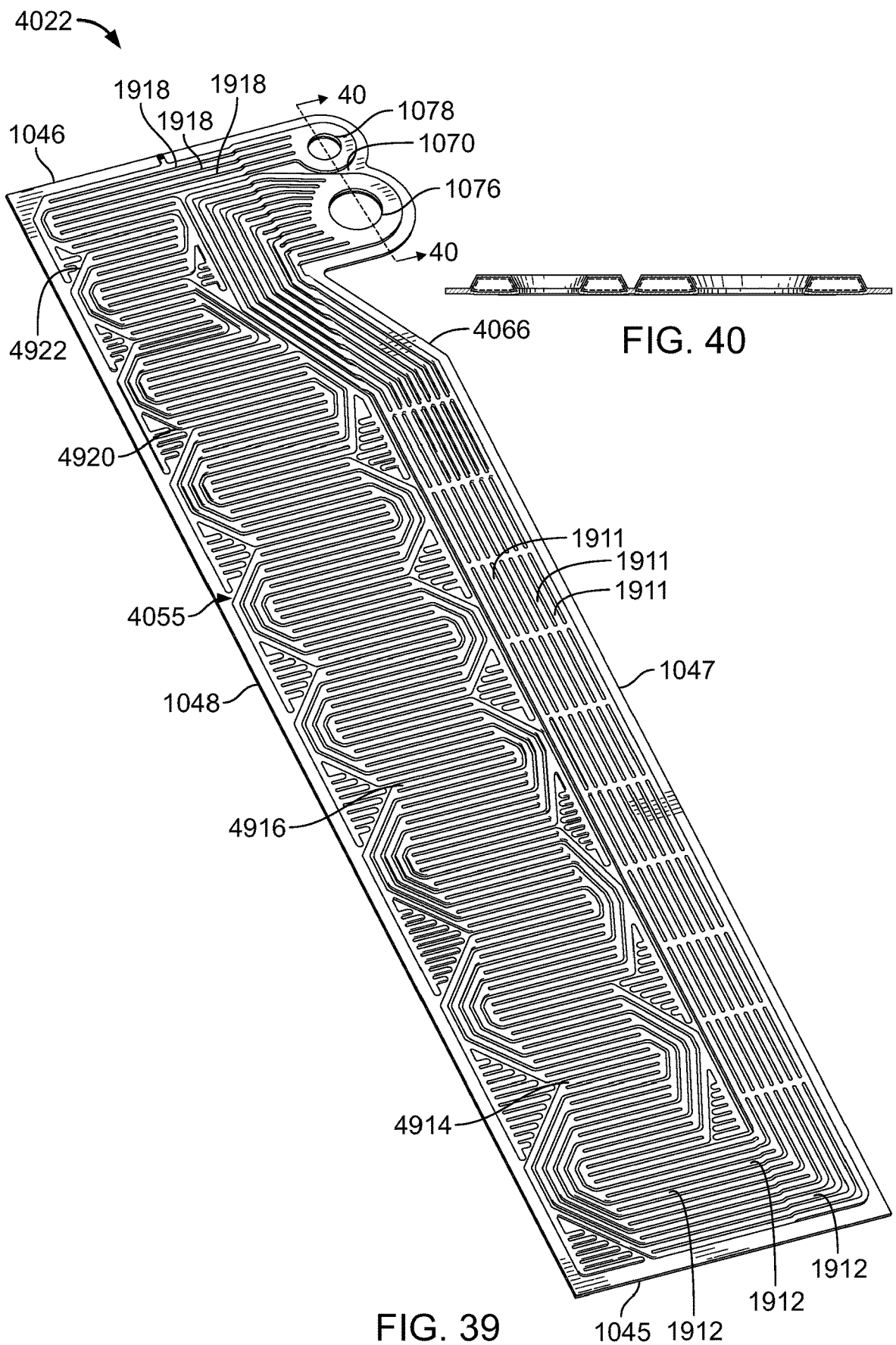

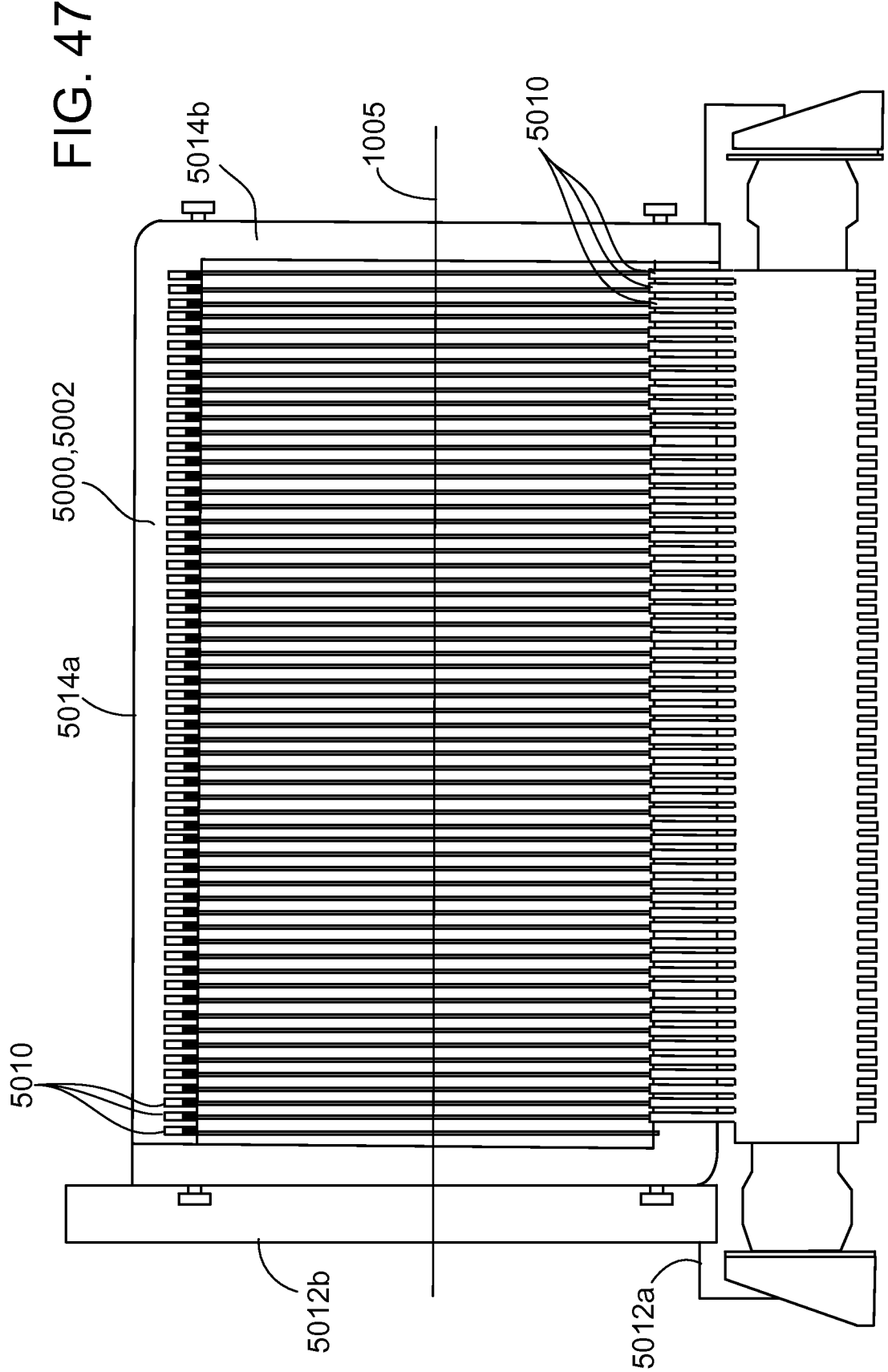

HEAT EXCHANGER INCLUDING MANIFOLD

RELATED APPLICATIONS

This application is a national stage application under 35 U.S.C. § 371 of International Patent Application No. PCT/US2013/065004, filed on Oct. 15, 2013, which claims the benefit of priority to U.S. Provisional Application No. 61/720,591, filed Oct. 31, 2012, and U.S. Provisional Application No. 61/714,538, filed Oct. 16, 2012, all of which are incorporated herein by reference in their entirety.

TECHNICAL FIELD

This invention relates to transferring heat between fluids and, more specifically, to transferring heat between fluids using heat exchange plates.

BACKGROUND

Tropical oceans and seas around the world offer a unique renewable energy resource. Ocean Thermal Energy Conversion ("OTEC") is a manner of producing renewable energy using solar energy stored as heat in the oceans' tropical regions. The OTEC process uses the temperature difference between surface and deep sea tropical waters to drive a heat engine to produce electrical energy. The warm water needed for the OTEC heat engine is found at the surface of the ocean, to a depth of 100 ft or less. The constant source of cold water for cooling the OTEC engine is found at a depth of between 2700 ft and 4200 ft or more. Since such depths are not typically found in close proximity to population centers or even land masses, an offshore power plant is required.

Floating, low heave OTEC power plants having a high efficiency, multi-stage heat exchange systems have been proposed in which the warm and cold water supply conduits and heat exchangers are structurally integrated into a floating platform and used to drive a heat engine. In turn, the heat engine drives a generator, whereby electrical power is obtained.

SUMMARY

In some aspects, a power generation plant uses ocean thermal energy conversion processes as an energy source.

Further aspects relate to a floating, low heave OTEC power plant having a high efficiency, multi-stage heat exchange system, wherein the warm and cold water supply conduits and heat exchanger modules are structurally integrated into the floating platform or structure of the power plant.

In some aspects of example implementations of the present invention, a heat exchanger includes two or more heat exchanger plates in a stacked arrangement such that each heat exchanger plate is spaced apart from the adjacent heat exchanger plate, the space between adjacent heat exchanger plates defining an external fluid passageway, each external fluid passageway configured to receive a first fluid. Each heat exchanger plate includes a peripheral edge, an internal fluid passageway configured to receive a second fluid, and an inlet into the internal fluid passageway that opens at the peripheral edge, and a manifold having fluid communication with the inlet of each heat exchanger plate.

In other example implementations of the present invention, the heat exchanger may include one or more of the following features: The manifold includes a manifold chamber that extends in a direction normal to plane defined by a heat exchanger plate. The manifold includes a tab that protrudes from a portion of the peripheral edge of each heat exchanger plate, wherein each tab includes a tab passageway in fluid communication with the internal passageway, each tab includes an opening that intercepts its tab passageway, the openings of each tab are aligned in a direction normal to a plane defined by a heat exchanger plate and define a manifold chamber, and the inner surface of the manifold chamber includes joints corresponding to a connection between a first surface of a tab passageway of one tab and a second surface of a tab passageway of an adjacent tab. The tabs of each plate are encapsulated in a rigid material. The tabs of each plate are encapsulated in a fluid-impermeable material. The manifold is at least partially encapsulated in a rigid material. The manifold is configured to be connected to a manifold of a second heat exchanger such that the respective manifolds are in fluid communication.

Still further example implementations of the present invention may include one or more of the following features: Each plate comprises a first exterior heat exchange surface and a second exterior heat exchange surface that is opposed to the first exterior heat exchange surface, the first and second exterior heat exchange surfaces being in fluid contact with the first fluid when the heat exchanger is in use. The heat exchanger comprises an outlet from the internal fluid passageway, the outlet opening at the peripheral edge, and the manifold has fluid communication with the outlet of each heat exchanger plate, and the manifold comprises a first manifold chamber configured to supply the second fluid to the inlet of the internal fluid passageway, and a second manifold chamber configured to receive the second fluid from the outlet of the internal fluid passageway, wherein the first manifold chamber is isolated from the second manifold chamber. The first manifold chamber has a different volume than the second manifold chamber. The internal passageway is defined between a flat interior surface of the heat exchanger plate and non-flat interior surface of the heat exchanger plate. Each heat exchanger plate comprises a first heat exchange surface that is non-planar, and a second heat exchange surface that is opposed to the first heat exchange surface and that is planar, and the stacked arrangement of the heat exchanger plates comprises arranging the heat exchanger plates so that the first heat exchange surface of one plate of the stack faces the second heat exchange surface of an adjacent plate of the stack. The internal fluid passageway expands outward from only one side of the plate, whereby a plate first side includes outwardly protruding regions corresponding to the location of the internal fluid passageway, and a plate second side is un-deformed. The internal fluid passageway includes several mini-channels.

In some example implementations, the two or more heat exchanger plates are stacked vertically. In other aspects the two or more heat exchanger plates are stacked horizontally. The heat exchanger plates can be arranged in any manner wherein a gap exists between each individual heat exchanger plate to allow a fluid to surround and flow past each heat exchanger plate.

In further example implementations, a heat exchanger includes heat exchanger plates in a stacked arrangement, each heat exchanger plate being spaced from the adjacent heat exchanger plate, the space between adjacent heat exchanger plates defining an external fluid passageway, each external fluid passageway configured to receive a first fluid. Each heat exchanger plate includes a peripheral edge, an internal fluid passageway configured to receive a second fluid, an inlet into a first end of the internal fluid passageway, the inlet opening at the peripheral edge, and an outlet from a second end of the internal fluid passageway, the outlet opening at the peripheral edge, and a manifold having a supply chamber that is in fluid communication with the inlet of each heat exchanger plate, and a discharge chamber that is in fluid communication with the outlet of each heat exchanger plate.

Other example implementations of the present invention may include one or more of the following features: The manifold supply chamber and the manifold discharge chamber each extend in a direction normal to plane defined by a heat exchanger plate. The manifold includes a tab that protrudes from a portion of the peripheral edge of each heat exchanger plate, wherein each tab includes a tab inlet passageway in fluid communication with the internal fluid passageway inlet, and a tab outlet passageway in fluid communication with the internal fluid passageway outlet, each tab includes an tab inlet opening that intercepts its tab inlet passageway, and a tab outlet opening that intercepts its tab outlet passageway, the tab inlet openings of each tab define a manifold supply chamber, and the inner surface of the manifold chamber includes joints corresponding to a connection between a first surface of a tab inlet passageway of one tab and a second surface of a tab inlet passageway of an adjacent tab, and the tab outlet openings of each tab define a manifold discharge chamber, and the inner surface of the manifold discharge chamber includes joints corresponding to a connection between a first surface of a tab outlet passageway of one tab and a second surface of a tab outlet passageway of an adjacent tab. The tabs of each plate are encapsulated in a rigid material. The tabs of each plate are encapsulated in a fluid-impermeable material. The manifold is at least partially encapsulated in a rigid material. The manifold is configured to be connected to a manifold of a second heat exchanger such that the respective manifolds are in fluid communication. Each plate comprises a first exterior heat exchange surface and a second exterior heat exchange surface that is opposed to the first exterior heat exchange surface, the first and second exterior heat exchange surfaces being in fluid contact with the first fluid when the heat exchanger is in use. The manifold supply chamber has a different volume than the manifold discharge chamber.

Still further example implementations of the present invention may include one or more of the following features: The internal passageway is defined between a flat interior surface of the heat exchanger plate and non-flat interior surface of the heat exchanger plate. Each heat exchanger plate comprises a first heat exchange surface that is non-planar, and a second heat exchange surface that is opposed to the first heat exchange surface and that is planar, and the stacked arrangement of the heat exchanger plates comprises arranging the heat exchanger plates so that the first heat exchange surface of one plate of the stack faces the second heat exchange surface of an adjacent plate of the stack. The internal fluid passageway expands outward from only one side of the plate, whereby a plate first side includes outwardly protruding regions corresponding to the location of the internal fluid passageway, and a plate second side is un-deformed. The internal fluid passageway includes several mini-channels.

In some example implementations of the present invention, a heat exchanger includes stacked heat exchanger plates, each heat exchanger plate comprising an internal fluid passageway configured to receive a first fluid, a first outer surface and a second outer surface that is opposed to the first outer surface. The first outer surface is planar, the second outer surface includes protruding regions that correspond to the location of the internal passageway within the heat exchanger plate, and the heat exchanger plates are stacked along an axis that is perpendicular to the first outer surface such that the first outer surface of one heat exchanger plate faces the second outer surface of an adjacent heat exchanger plate.

Further example implementations include one or more of the following features: The heat exchanger plates are arranged so that the first outer surface of one heat exchanger plate is spaced apart from the second outer surface of an adjacent heat exchanger plate. The first outer surface and the second outer surface are each in fluid contact with a second fluid when the heat exchanger is in use.

In some aspects of the present invention, a method of manufacturing a heat exchanger includes providing a heat exchanger plate having a first side providing a first external heat exchange surface, a second side opposed to the first side and providing a second external heat exchange surface, and an internal fluid passageway; cutting an opening in the plate so that the cut opening intercepts the internal passageway; repeating the above steps to form plural cut plates; stacking the cut plates along an alignment axis to provide a plate stack having aligned cut openings, and joining cut edges of the cut openings such that a first side of one plate is joined to a second side of an adjacent plate, and such that a manifold chamber is formed within a volume defined at least in part by the respective joined openings, the manifold chamber being in fluid communication with each internal passageway.

Example aspects of the present invention include methods may include one or more of the following additional features: Attaching a flange to the cut openings of the outermost plates of the plate stack, and encapsulating a portion of the joined plates and a ferrule portion of the flange in plastic. The heat exchanger further comprises a tab that protrudes from a portion of the peripheral edge of each plate, and the cut opening of each plate is located within the tab. The tabs of the heat exchanger are encapsulated in an encapsulating material different from the material used to form the tabs. The tabs of the heat exchanger are encapsulated in plastic. Stacking includes arranging the plates such that the side of one plate faces the second side of an adjacent plate. Providing a heat exchanger plate having an internal fluid passageway includes providing first panel and a second panel; applying a bonding-preventing agent to a surface of the first panel in a predetermined pattern; stacking the first panel and the second panel so that the bonding agent resides between the first sheet and the second sheet; roll-bonding the stacked first and second panels to form a plate; and expanding the plate so as to form an internal passageway corresponding to the predetermined pattern. During the step of expanding the plate, the second panel is deformed by a pressure of injected air and the first panel remains un-deformed by the pressure of injected air. Expanding the plate comprises injecting air between the first panel and the second panel. Joining the cut edges of the cut openings comprises joining a first panel of one plate to a second panel of an adjacent plate. Stacking the plates includes providing an alignment jig, and placement of the plates within the alignment jig to provide a plate stack having aligned peripheral edges and cut openings. After stacking, the alignment jig remains with the plate stack.

Example methods may also include one or more of the following additional features: Joining a connector to the cut openings of the outward-facing sides of the outer-most plates of the plate stack. The internal passageway includes an inlet end and an outlet end, the step of cutting an opening in the plate includes cutting an inlet opening that intercepts the inlet end of the internal passageway and cutting an outlet opening that intercepts the outlet end of the internal passageway, and the step of joining the cut edges includes joining the cut edges of the inlet openings such that a first side of one plate is joined to a second side of an adjacent plate, and such that a manifold supply chamber is formed within a volume defined at least in part by the respective joined inlet openings, the manifold supply chamber being in fluid communication with the inlet end of the internal passageway, and joining the cut edges of the outlet openings such that a first side of one plate is joined to a second side of an adjacent plate, and such than a manifold discharge chamber is formed within a volume defined at least in part by the respective joined outlet openings, the manifold discharge chamber being in fluid communication with the outlet end of the internal passageway. The manifold supply chamber and manifold discharge chamber reside within a single manifold such that there is no fluid communication between the supply chamber and the discharge chamber. The heat exchangers described herein provide enhanced heat transfer efficiency, and thus, for example, enhance the efficiency of the OTEC heat engine, which uses a highly efficient thermal cycle for maximum efficiency and power production. Heat transfer in boiling and condensing processes, as well as the heat exchanger materials and design, limit the amount of energy that can be extracted from each pound of warm water. However, the heat exchangers used in the evaporator and the condenser use high volumes of warm and cold water flow with low head loss to limit parasitic loads. The heat exchangers also provide high coefficients of heat transfer to enhance efficiency. The heat exchangers incorporate materials and designs tailored to the warm and cold water inlet temperatures to enhance efficiency. The heat exchanger design employs a simple construction method with low amounts of material to reduce cost and volume.

In some example embodiments of the present invention, the working fluid is supplied to and discharged from each plate of the heat exchangers along a plate peripheral side edge using a manifold in which the inlet and outlet connections are formed integrally with the plate and welded to the adjacent plate during the assembly process. The manifold, including the welded connections, are encased in an epoxy that flows between the plates in the manifold region to provide structural reinforcement to the assembly and prevent water from contacting the welded surfaces. This is an improvement over some plate heat exchangers that are supplied using tubes, since each end of each tube must be securely connected to the heat exchanger plate or a supply line. For example, in some embodiments, as many as 4 inlet and 8 outlet connections are required per plate of the heat exchanger. At densities of approximately 20 plates per linear foot, as many as 4800 individual connections could be required in a 20 foot module. This poses both a manufacturing logistics problem as well as a quality control problem. The connections are also left exposed to the seawater environment. Advantageously, by using the manifold at a side peripheral edge of the heat exchanger, use of tube connections is entirely eliminated, and corresponding the manufacturing logistical and quality control problems are avoided.

In other example embodiments of the present invention, the heat exchangers described herein are formed of plates that are expanded to form internal fluid passageways, where the expanded regions protrude on only one side of the plate, leaving the other side essentially flat. This allows the spacing between plates to have consistent maximum and minimum clearances regardless of where expansion occurs along the plate length. Using plates where the expanded regions protrude on only one side of the plate (referred to herein as "single-sided plates") mitigates the impact of lengthwise dimensional inconsistency associated with the roll-bonding manufacturing process used to form the plates. The roll bond process of fusing metals between rollers has inherent issues of lengthwise dimensional repeatability although the height is consistent. When roll-bonded plates in which the expanded regions protrude on both sides of the plate (referred to herein as "double-sided" plates) are stacked in a heat exchanger, the dimensional variation can result in configurations in which the expanded sections of adjacent plates are positioned directly opposite each other, resulting in pinch points with higher pressure losses and lower heat transfer than expected. By providing single-sided plates, and arranging the plates within the heat exchanger so that the protruding side of one plate faces the flat side of the adjacent plate, the negative effects of the dimensional variation are avoided. In addition, laboratory results confirm that the pressure losses for a one-sided plate are significantly reduced at flows and nominal spacing equal to that of double-sided plates.

The implementations, embodiments and examples of the inventions described herein may be combined as described above or in any other combination of the features disclosed.

The details of one or more embodiments are set forth in the accompanying drawings and the description below. Other features, objects, and advantages will be apparent from the description and drawings, and from the claims.

DESCRIPTION OF DRAWINGS

FIG. 8 schematically illustrates a multi-stage heat exchanger system.
FIG. 9 schematically illustrates a heat exchange module of the multi-stage heat exchange system.
FIG. 13A illustrates an enlarged view of a portion of FIG. 13.

FIG. 36 is a top perspective view of an evaporator heat exchange plate.

FIG. 37 is a sectional view of a portion of the heat exchange plate of FIG. 36 as seen along line 37-37.

FIG. 39 is a top perspective view of a condenser heat exchange plate.

FIG. 40 is a sectional view of a portion of the heat exchange plate of FIG. 38 as seen along line 40-40.

FIG. 47 is a top end view of an array enclosed within a cocoon.

Like reference symbols in the various drawings indicate like elements.

DETAILED DESCRIPTION

High efficiency, multi-stage heat exchange devices and systems are described herein. An exemplary embodiment is provided in which the heat exchange devices and systems are used in an OTEC power plant in which the warm and cold water supply conduits and heat exchangers are structurally integrated into a floating platform or a land based platform and used to drive a heat engine. As discussed above, OTEC is a process that uses heat energy from the sun that is stored in the Earth's oceans to generate electricity. The OTEC process uses the water temperature differences between warm surface water and cold deep water found in tropical regions to power a Rankine cycle, with the warm surface water serving as the heat source and the cold deep water serving as the heat sink. Rankine cycle turbines drive generators that produce electrical power.

Figure 1:
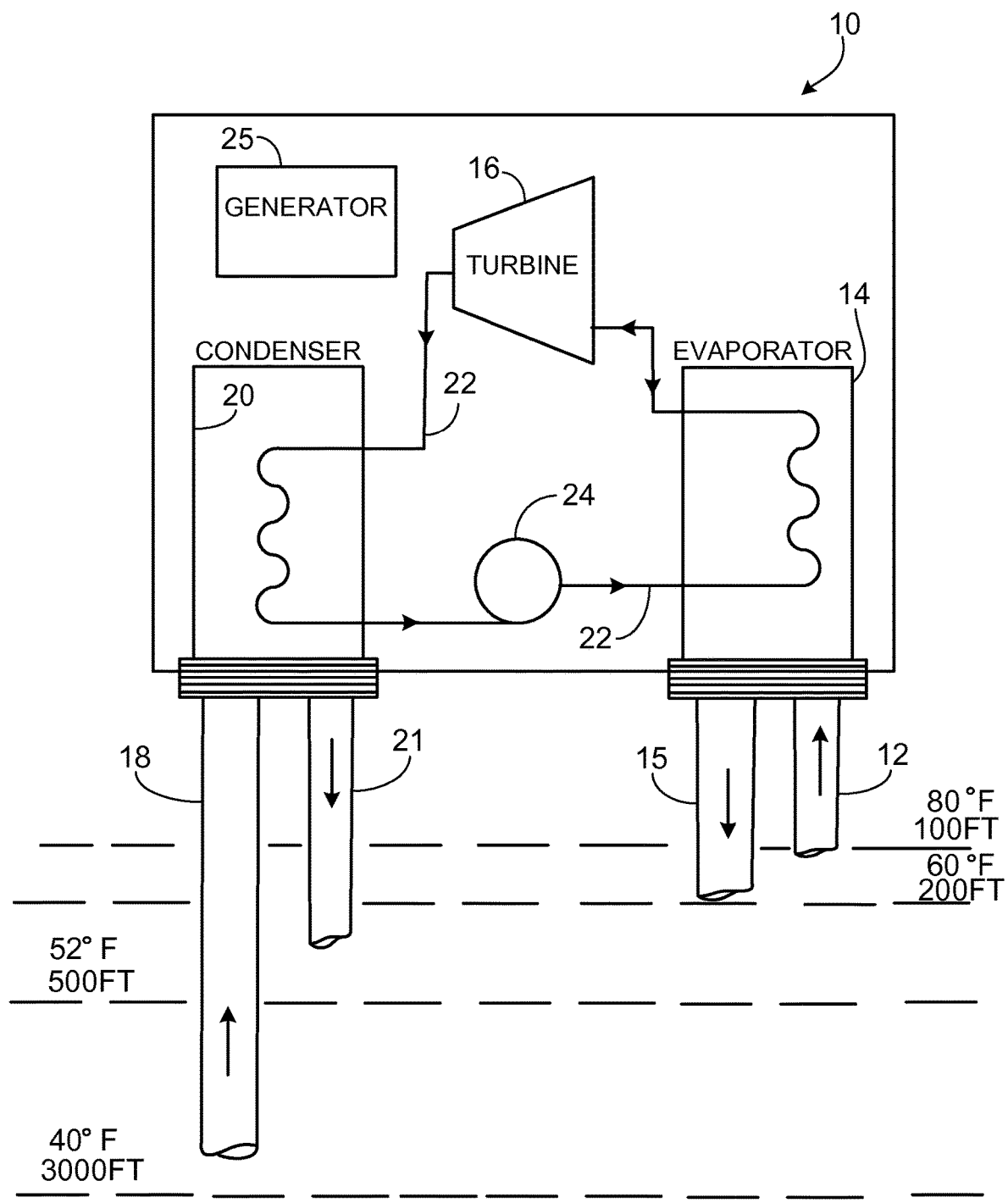
FIG. 1 illustrates an exemplary OTEC heat engine.

Although the heat exchange devices and systems are described herein with application to OTEC power plants, the heat exchange devices and systems are not limited to use in OTEC power plants. For example, the heat exchange devices and systems described herein would be useful in other applications requiring high efficiency heat exchange such as steam dump condensers and other waste heat conversion devices, and passive cooling systems of nuclear fuel plants as well as solar powered desalination plants. FIG. 1 illustrates a typical OTEC Rankine cycle heat engine 10 which includes warm sea water inlet 12, evaporator 14, warm sea water outlet 15, turbine 16, cold sea water inlet 18, condenser 20, cold sea water outlet 21, working fluid conduit 22 and working fluid pump 24.

In operation, heat engine 10 can use any one of a number of working fluids, for example commercial refrigerants such as ammonia. Other working fluids can include propylene, butane, R-22 and R-134a and their replacements. Warm sea water between approximately 75° F. and 85° F., or more, is drawn from the ocean surface or just below the ocean surface through warm sea water inlet 12 and in turn warms the ammonia working fluid passing through evaporator 14. The ammonia boils to a vapor pressure of approximately 9.3 atm. The vapor is carried along working fluid conduit 22 to turbine 16. The ammonia vapor expands as it passes through the turbine 16, producing power to drive an electric generator 25. The ammonia vapor then enters condenser 20 where it is cooled to a liquid by cold seawater drawn from a deep ocean depth of approximately 3000 ft. The cold seawater enters the condenser at a temperature of approximately 40° F. The vapor pressure of the ammonia working fluid at the temperature in the condenser 20, approximately 51° F., is 6.1 atm. Thus, a significant pressure difference is available to drive the turbine 16 and generate electric power. As the ammonia working fluid condenses, the liquid working fluid is pumped back into the evaporator 14 by working fluid pump 24 via working fluid conduit 22.

The heat engine 10 of FIG. 1 is essentially the same as the Rankine cycle of most steam turbines, except that OTEC differs by using different working fluids and lower temperatures and pressures. The heat engine 10 of the FIG. 1 is also similar to commercial refrigeration plants (for example, a heat pump using electric power), except that the OTEC cycle is run in the opposite direction so that a heat source (e.g., warm ocean water) and a cold heat sink (e.g., deep ocean water) are used to produce electric power.

Figure 2:
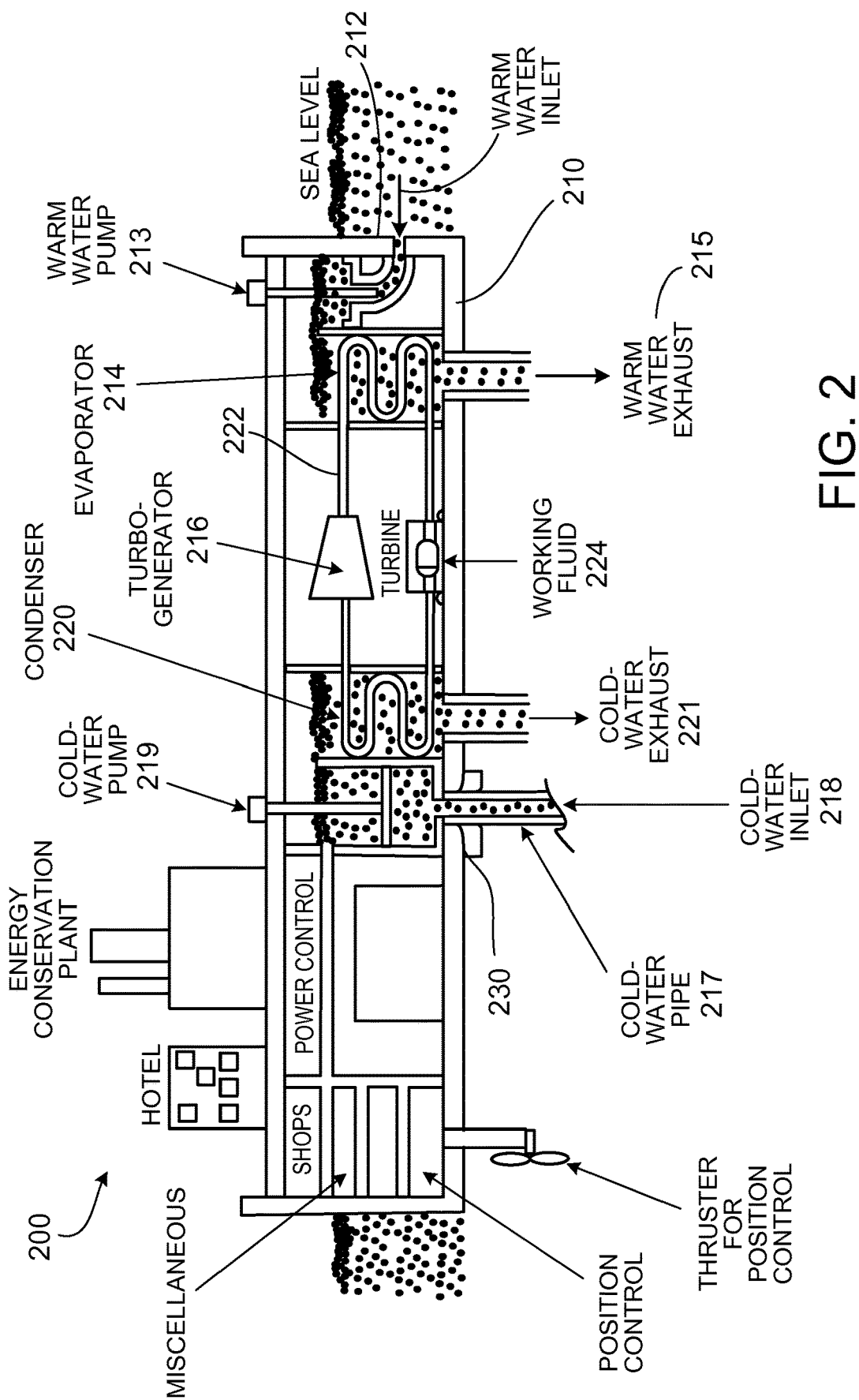
FIG. 2 illustrates an exemplary OTEC power plant.

FIG. 2 illustrates the components of a conventional floating OTEC power plant 200, which include: the vessel or platform 210, warm sea water inlet 212, warm water pump 213, evaporator 214, warm sea water outlet 215, turbo-generator 216, cold water pipe 217, cold water inlet 218, cold water pump 219, condenser 220, cold water outlet 221, working fluid conduit 222, working fluid pump 224, and pipe connections 230. OTEC plant 200 can also include electrical generation, transformation and transmission systems, position control systems such as propulsion, thrusters, or mooring systems, as well as various auxiliary and support systems (for example, personnel accommodations, emergency power, potable water, black and grey water, firefighting, damage control, reserve buoyancy, and other common shipboard or marine systems.).

Implementations of OTEC power plants utilizing the basic heat engine and system of FIGS. 1 and 2 have a relatively low overall efficiency of 3% or below. Because of this low thermal efficiency, OTEC operations require the flow of large amounts of water through the power system per kilowatt of power generated. This in turn requires large heat exchangers having large heat exchange surface areas.

The systems and approaches described herein address technical challenges in order to improve the efficiency of OTEC operations and reduce the cost of construction and operation.

The OTEC heat engine 10 described herein uses a highly efficient thermal cycle for maximum efficiency and power production. Heat transfer in boiling and condensing processes, as well as the heat exchanger materials and design, limit the amount of energy that can be extracted from each pound of warm seawater. The heat exchangers used in the evaporator 214 and the condenser 220 use high volumes of warm and cold water flow with low head loss to limit parasitic loads. The heat exchangers also provide high coefficients of heat transfer to enhance efficiency. The heat exchangers incorporate materials and designs tailored to the warm and cold water inlet temperatures to enhance efficiency. The heat exchanger design can use a simple construction method with low amounts of material to reduce cost and volume.

Figure 3:
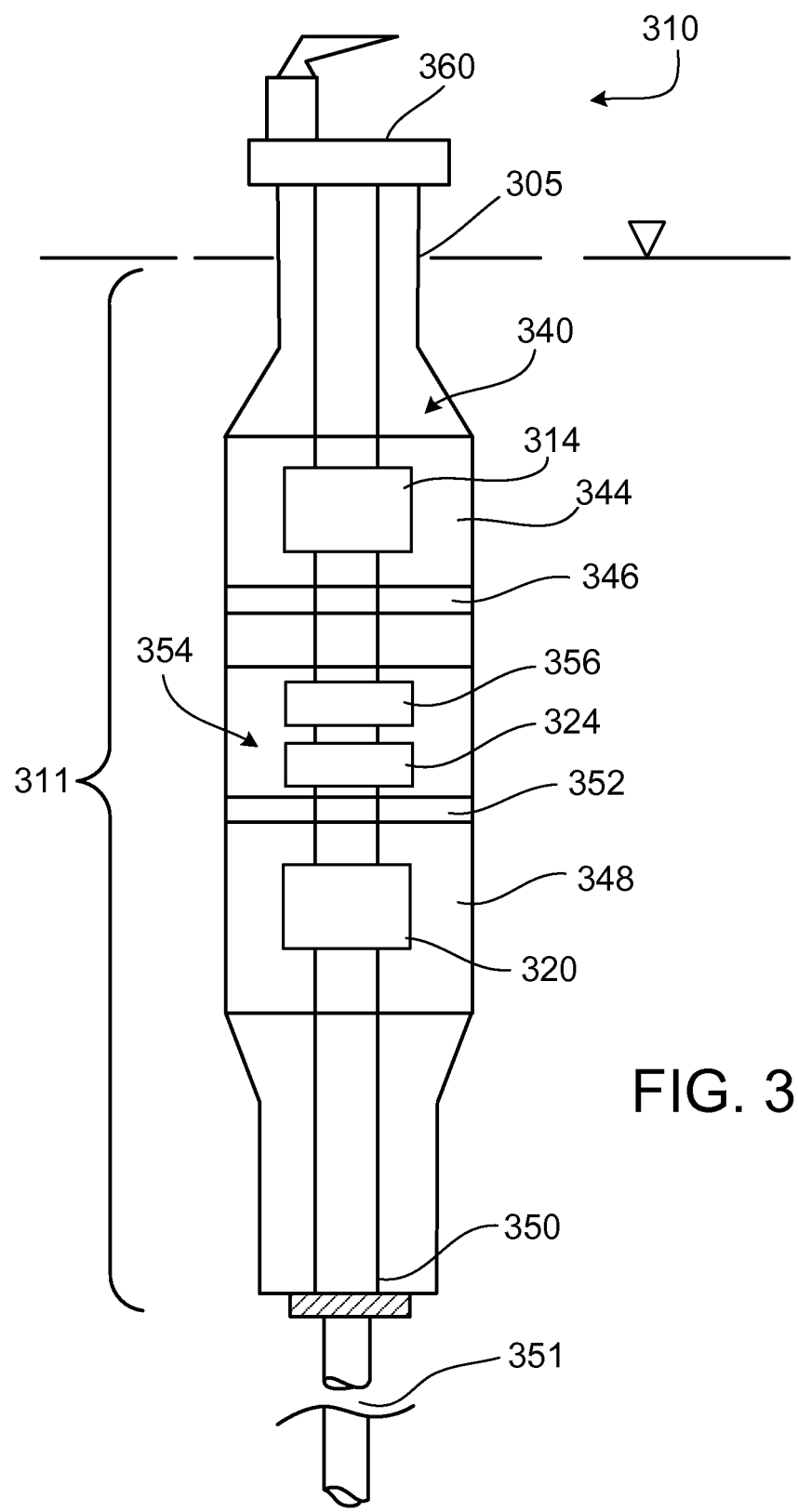
FIG. 3 illustrates another exemplary OTEC power plant.

The turbo generators 216 are highly efficient with low internal losses and may also be tailored to the working fluid to enhance efficiency FIG. 3 illustrates an implementation of an OTEC system that enhances the efficiency of previous OTEC power plants and overcomes many of the technical challenges associated therewith. This implementation comprises a spar for the vessel or platform, with heat exchangers and associated warm and cold water piping integral to the spar.

Spar 310 houses an integral multi-stage heat exchange system for use with an OTEC power generation plant. Spar 310 includes platform 360 that overlies a submerged portion 311 that resides below waterline 305. Submerged portion 311 comprises a warm water intake portion 340, an evaporator portion 344, a warm water discharge portion 346, a condenser portion 348, a cold water intake portion 350, a cold water pipe 351, a cold water discharge portion 352, a machinery deck portion 354.

In operation, warm sea water of between 75° F. and 85° F. is drawn through warm water intake portion 340 and flows down the spar 310 though structurally integral warm water conduits (not shown). Due to the high volume water flow requirements of OTEC heat engines, the warm water conduits direct flow to the evaporator portion 344 of between 500,000 gpm and 6,000,000 gpm. The warm water conduits have a diameter of between 6 ft and 35 ft, or more. Due to this size, the warm water conduits are vertical structural members of spar 310. Warm water conduits can be large diameter pipes of sufficient strength to vertically support spar 310. Alternatively, the warm water conduits can be passages integral to the construction of the spar 310.

Warm water then flows through the evaporator portion 344 which houses one or more stacked, multi-stage heat exchangers configured to operate as evaporators 314 for warming a working fluid to a vapor. The warm sea water is then discharged from spar 310 via warm water discharge 346. Warm water discharge can be located or directed via a warm water discharge pipe to a depth at or close to an ocean thermal layer that is approximately the same temperature as the warm water discharge temperature to limit environmental impacts. The warm water discharge can be directed to a sufficient depth to avoid thermal recirculation with either the warm water intake or cold water intake.

Cold sea water is drawn from a depth of between 2500 and 4200 ft, or more, at a temperature of approximately 40° F., via cold water pipe 351. The cold sea water enters spar 310 via cold water intake portion 350. Due to the high volume water flow requirements of OTEC heat engines, the cold seawater conduits direct flow to the condenser portion 348 of between 500,000 gpm and 6,000,000 gpm. Such cold seawater conduits have a diameter of between 6 ft and 35 ft, or more. Due to this size, the cold seawater conduits are vertical structural members of spar 310. Cold water conduits can be large diameter pipes of sufficient strength to vertically support spar 310. Alternatively, the cold water conduits can be passages integral to the construction of the spar 310.

Cold seawater then flows upward through the condenser portion 348 which houses stacked, multi-stage heat exchangers configured to operate as condensers 320, where the cold sea water cools a working fluid to a liquid. The cold sea water is then discharged from spar 310 via cold sea water discharge 352. Cold water discharge can be located or directed via a cold sea water discharge pipe to depth at or close to an ocean thermal layer that is approximately the same temperature as the cold sea water discharge temperature. The cold water discharge can be directed to a sufficient depth to avoid thermal recirculation with either the warm water intake or cold water intake.

Machinery deck portion 354 can be positioned vertically between the evaporator portion 344 and the condenser portion 348. Positioning machinery deck portion 354 beneath evaporator portion 344 allows nearly straight line warm water flow from intake, through the multi-stage evaporators, and to discharge. Positioning machinery deck portion 354 above condenser portion 348 allows nearly straight line cold water flow from intake, through the multi-stage condensers, and to discharge. Machinery deck portion 354 includes turbo generators 356. In operation, warm working fluid heated to a vapor flows from evaporator portion 344 to one or more turbo generators 356. The working fluid expands in turbo generator 356 thereby driving a turbine for the production of electrical power. The working fluid then flows to condenser portion 348 where it is cooled to a liquid and pumped to evaporator portion 344.

Figure 4:
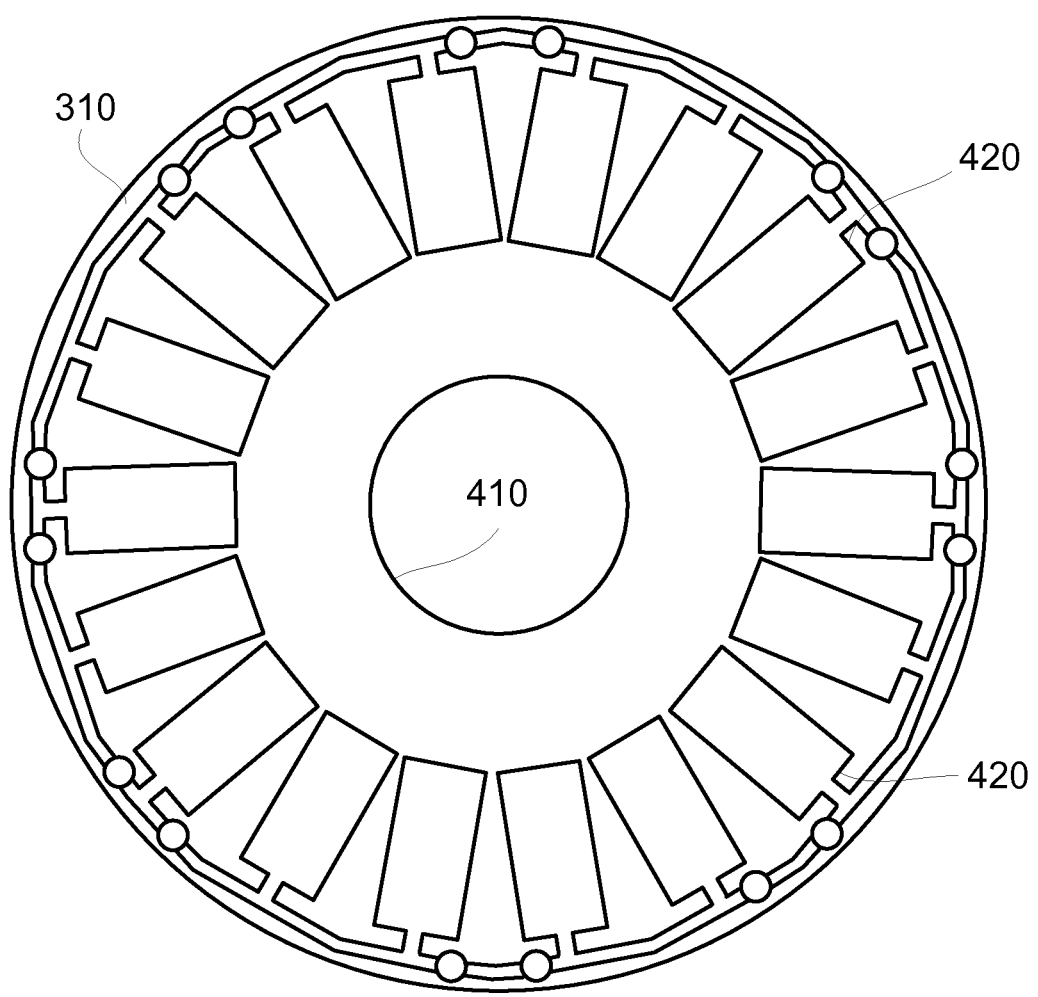
FIG. 4 illustrates a cross-sectional view of a heat exchanger arrangement the OTEC power plant of FIG. 3.

FIG. 4 illustrates an implementation of a system in which several multi-stage heat exchangers 420 are arranged about the periphery of spar 310. In particular, the heat exchangers are arranged to extend along a radius of the spar 310 in a spoke-like configuration. Heat exchangers 420 can be evaporators or condensers used in a heat engine. The peripheral layout of heat exchanges can be used with evaporator portion 344 or condenser portion 348 of the spar 310. The peripheral arrangement can support any number of heat exchangers 420 (e.g., 1 heat exchanger, between 2 and 8 heat exchangers, 8-16 heat exchangers, 16-32 heat exchangers, or 32 or more heat exchangers). One or more heat exchangers 420 can be peripherally arranged on a single deck or on multiple decks (e.g., on 2, 3, 4, 5, or 6 or more decks) of the spar 310. One or more heat exchangers can be peripherally offset between two or more decks such that no two heat exchangers are vertically aligned over one another. One or more heat exchangers can be peripherally arranged so that heat exchangers in one deck are vertically aligned with heat exchanges on another adjacent deck.

Individual heat exchangers 420 can comprise a multi-stage heat exchange system (e.g., a 2-, 3-, 4-, 5-, or 6- or more stage heat exchange system). In some embodiments, individual heat exchangers 420 are constructed to provide low pressure loss in the warm sea water flow, cold sea water flow, and working fluid flow through the heat exchanger.

It has been found that the multi-stage heat exchanger system enables high energy transfer to the working fluid from the non-working fluid (e.g., water) within the relatively low available temperature differential of, for example, an OTEC heat engine. The thermodynamic efficiency of an OTEC power plant is a function of how close the temperature of the working fluid approaches that of the water. The physics of the heat transfer dictate that the area required to transfer the energy increases as the temperature of the working fluid approaches that of the water. Increasing the velocity of the water can increase the heat transfer coefficient to offset the increase in surface area. However, increasing the velocity of the water can greatly increase the power required for pumping, thereby increasing the parasitic electrical load on the OTEC plant.

In some embodiments, a four stage hybrid cascade heat exchange cycle is employed to improve heat engine thermodynamic efficiency and thereby reduce the amount of energy that needs to be transferred between the fluids. This in turn serves to reduce the amount of heat exchange surface that is required. A hybrid cascade heat exchange cycle is described in detail in co-pending U.S. patent application Ser. No. 13/209,944 entitled Staved Ocean Thermal Energy Conversion Power Plant-Cold Water Pipe Connection, and co-pending U.S. patent application Ser. No. 13/209,865 entitled Ocean Thermal Energy Conversion Power Plant, incorporated herein by reference in their entirety.

The performance of heat exchangers is affected by the available temperature difference between the fluids as well as the heat transfer coefficient at the surfaces of the heat exchanger. The heat transfer coefficient generally varies with the velocity of the fluid across the heat transfer surfaces. Higher fluid velocities require higher pumping power, thereby reducing the net efficiency of the plant. A hybrid cascading multi-stage heat exchange system employing gasket-free, open flow plate heat exchanger arrays facilitates higher fluid velocities and greater plant efficiencies since the gasket-free, open flow heat exchanger arrays are stacked along a direction of fluid flow, permitting free flow of fluid into and through the system, as discussed further below. Thus, pressure losses associated with delivering the fluid to the plate heat exchanger array are substantially eliminated, and relatively high fluid velocities are achieved across the heat transfer surfaces of the plates within the array. This can be compared to some traditional plate heat exchanger arrays in which high pressure losses are incurred while delivering fluids to the plate, particularly within the delivery lines and the openings between the lines and the plate heat exchanger array. In such traditional plate heat exchanger arrays, the pressure losses incurred while delivering fluids to the plate result in relatively low fluid velocities across the heat transfer surfaces of the plates within the array, resulting in correspondingly low heat transfer. The hybrid cascading multi-stage heat exchange design also facilitates lower pressure drops through the heat exchanger, and the vertical plant design facilitates lower pressure drop across the whole system.

An integrated multi-stage OTEC power plant can produce electricity using the temperature differential between the surface water and deep ocean water in tropical and subtropical regions. Traditional piping runs for seawater can be eliminated by using the off-shore vessel's or platform's structure as a conduit or flow passage. Alternatively, the warm and cold seawater piping runs can use conduits or pipes of sufficient size and strength to provide vertical or other structural support to the vessel or platform. These integral seawater conduit sections or passages serve as structural members of the vessel, thereby reducing the requirements for additional steel. As part of the integral seawater passages, a multi-stage heat exchanger system provides multiple stages of working fluid evaporation without the need for external water nozzles or piping connections. The integrated multi-stage OTEC power plant allows the warm and cold seawater to flow in their natural directions. The warm seawater flows downward through the vessel as it is cooled before being discharged into a cooler zone of the ocean. In a similar fashion, the cold sea water from deep in the ocean flows upward through the vessel as it is warmed before discharging into a warmer zone of the ocean. This arrangement avoids the need for changes in seawater flow direction and associated pressure losses. The arrangement also reduces the pumping energy required.

Multi-stage heat exchanger systems allow for the use of a hybrid cascade OTEC cycle. In a multi-stage heat exchanger system, heat exchangers are stacked to form multiple heat exchanger stages or sections that have seawater passing through them in series to boil or condense the working fluid as appropriate. In the evaporator section, the warm seawater passes through a first stage where it boils off some of the working fluid as the sea water is cooled. The warm seawater then flows down the stack into the next heat exchanger stage and boils off additional working fluid at a slightly lower pressure and temperature. This occurs sequentially through the entire stack. Each stage or section of the heat exchanger system supplies working fluid vapor to a dedicated turbine that generates electrical power. Each of the evaporator stages has a corresponding condenser stage at the exhaust of the turbine. The cold seawater passes through the condenser stacks in a reverse order to the evaporators.

OTEC systems, by their nature require large volumes of water, for example, a 100 megawatt OTEC power plant can require, for example, up to orders of magnitude more water than required for a similarly sized combustion fired steam power plant. In an exemplary implementation, a 25MW OTEC power plant can require approximately 1,000,000 gallons per minute of warm water supply to the evaporators and approximately 875,000 gallons per minute of cold water to the condensers. The energy required for pumping water together with the small temperature differentials (approximately 35 to 45 degrees F.) act to drive down efficiency while raising the cost of construction.

Figure 5:
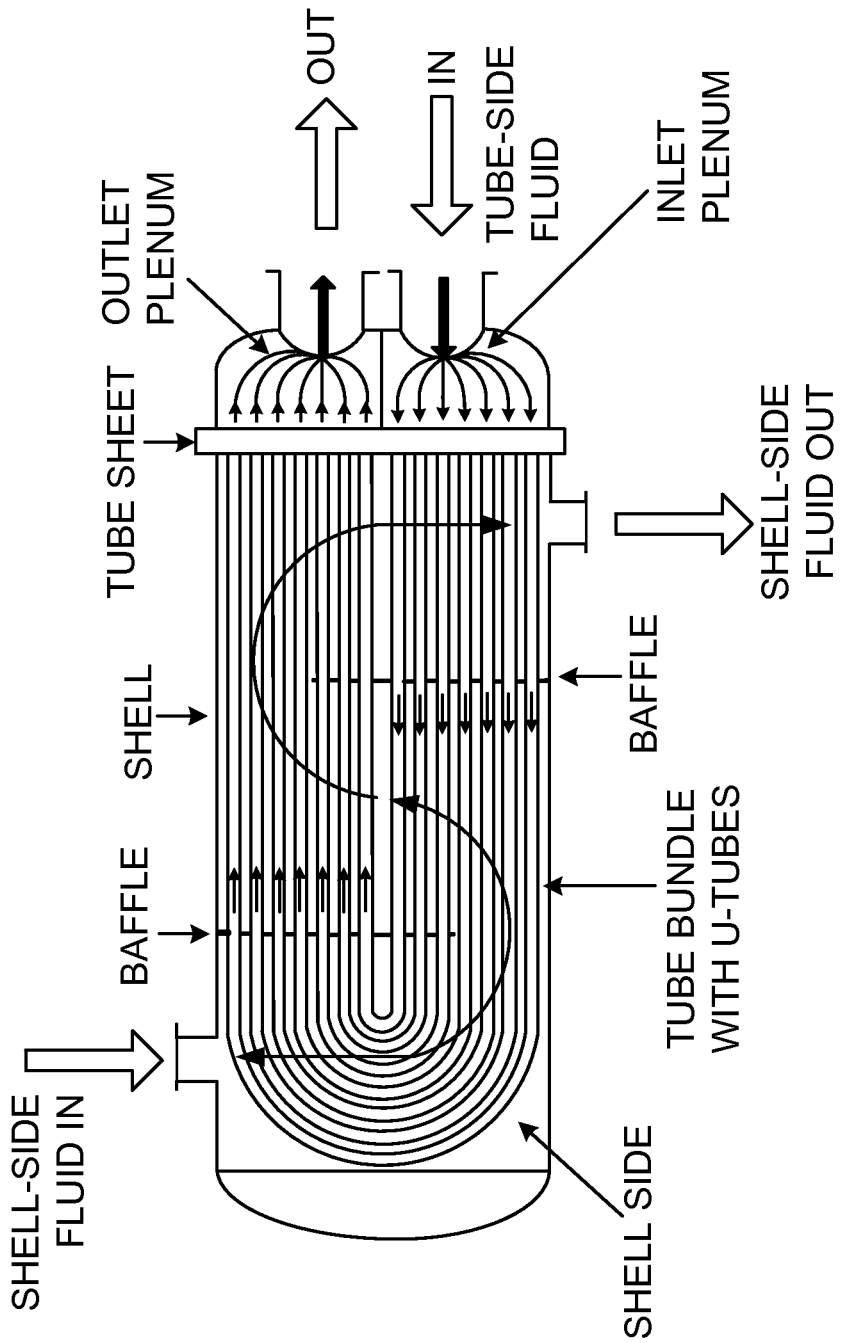
FIG. 5 illustrates a shell and tube heat exchanger.

Presently available heat exchangers are insufficient to handle the large volumes of water and high efficiencies required for OTEC heat exchange operations. As shown in FIG. 5, shell and tube heat exchangers consist of a series of tubes. One set of the tubes contains working fluid that must be either heated or cooled. The second, non-working fluid runs over the tubes that are being heated or cooled so that it can either provide the heat or absorb the heat required. The set of tubes is called the tube bundle and can be made up of several types of tubes: plain, longitudinally finned, etc. Shell and tube heat exchangers are typically used for high-pressure applications. This is because the shell and tube heat exchangers are robust due to their shape. Shell and tube heat exchangers are not ideal for the low temperature differential, low pressure, high volume nature of OTEC operations. For example, in order to deliver the large volumes of fluid required in the OTEC operation, traditional shell and tube heat exchangers would require complicated piping arrangements that are associated with high pressure losses and high pumping energy. In addition, traditional shell and tube heat exchangers are difficult to fabricate, install and maintain, particularly in a dynamic environment such as an offshore platform. Shell and tube heat exchanges also require precision assembly particularly for the shell to tube connections and for the internal supports. Moreover, shell and tube heat exchangers often have a low heat transfer coefficient and are restricted in the volume of water that can be accommodated.

Figure 6:
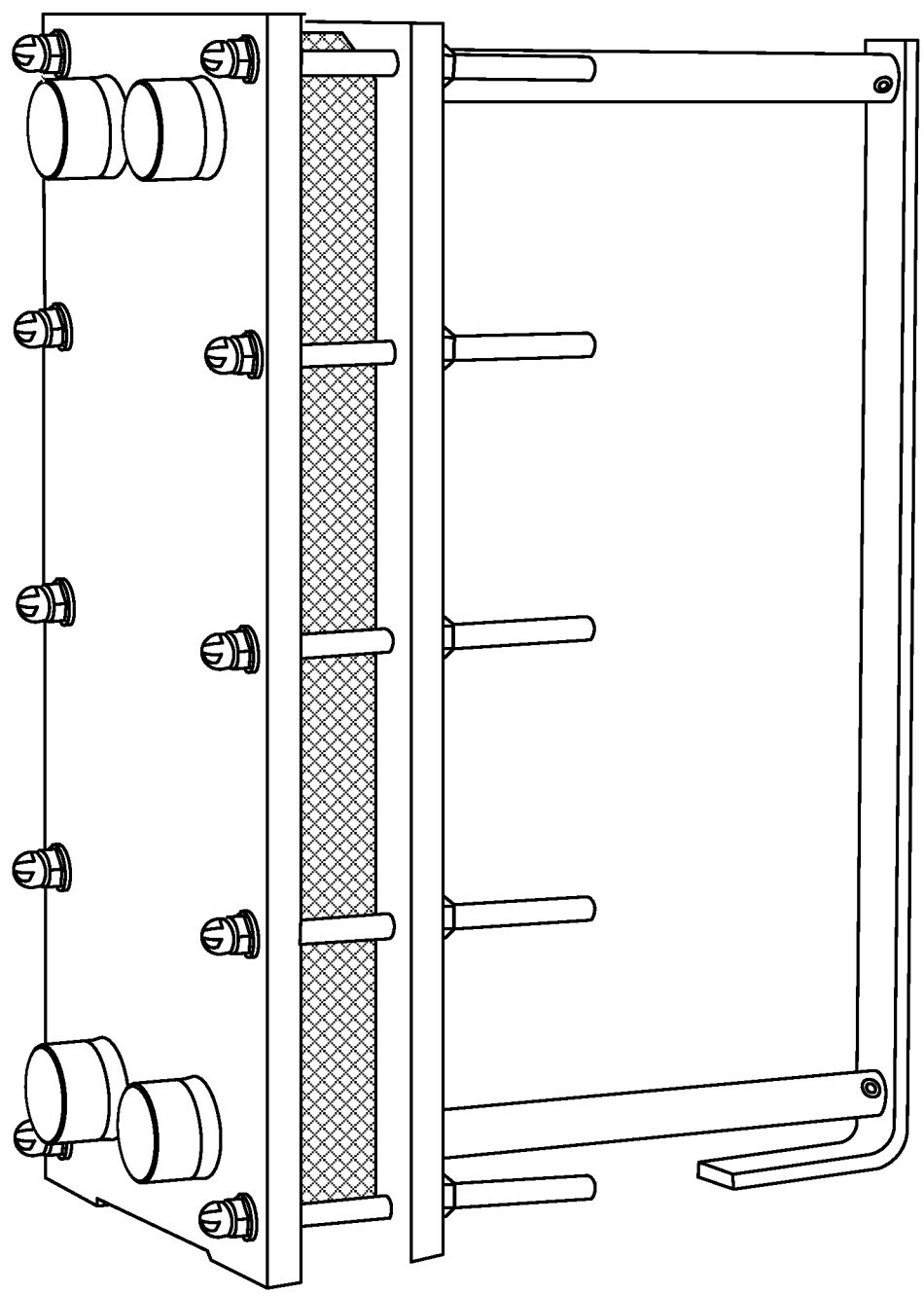
FIG. 6 illustrates a plate heat exchanger.

FIG. 6 depicts a plate and frame heat exchanger. Plate and frame heat exchangers can include multiple, thin, slightly-separated plates that have very large surface areas and fluid flow passages for heat transfer. This stacked-plate arrangement can be more effective, in a given space, than the shell and tube heat exchanger. Advances in gasket and brazing technology have made the plate-type heat exchanger increasingly practical. When used in open loops, these heat exchangers are normally of the gasket type to allow periodic disassembly, cleaning, and inspection. Permanently-bonded plate heat exchangers, such as dip-brazed and vacuum-brazed plate varieties, are often specified for closed-loop applications such as refrigeration. Plate heat exchangers also differ in the types of plates that are used, and in the configurations of those plates. Some plates may be stamped with "chevron" or other patterns, where others may have machined fins and/or grooves.

Plate and frame heat exchangers, however, have some significant disadvantages in OTEC applications. For example, these types of heat exchangers can require complicated piping arrangements that do not easily accommodate the large volumes of water needed with OTEC systems. Often, gaskets must be precisely fitted and maintained between each plate pair, and significant compressive forces that are applied to the plates and gaskets using bolts, are needed to maintain the gasket seals. Plate heat exchangers typically require complete disassembly to inspect and repair even one faulty plate. Materials needed for plate heat exchangers can be limited to costly titanium and/or stainless steel. These types of heat exchangers inherently provide relatively equal flow areas between the working and non-working fluids. Flow ratios between the fluids are typically 1:1. As can be seen in FIG. 6, supply and discharge ports are typically provided on the face of the plate, reducing the total heat exchange surface area and complicating the flow path of each of the working and non-working fluids. Moreover, plate and frame heat exchangers include complex internal circuiting for nozzles that penetrate all plates. The complex flow paths also impose significant pressure losses that do not contribute to heat transfer.

Figure 7:
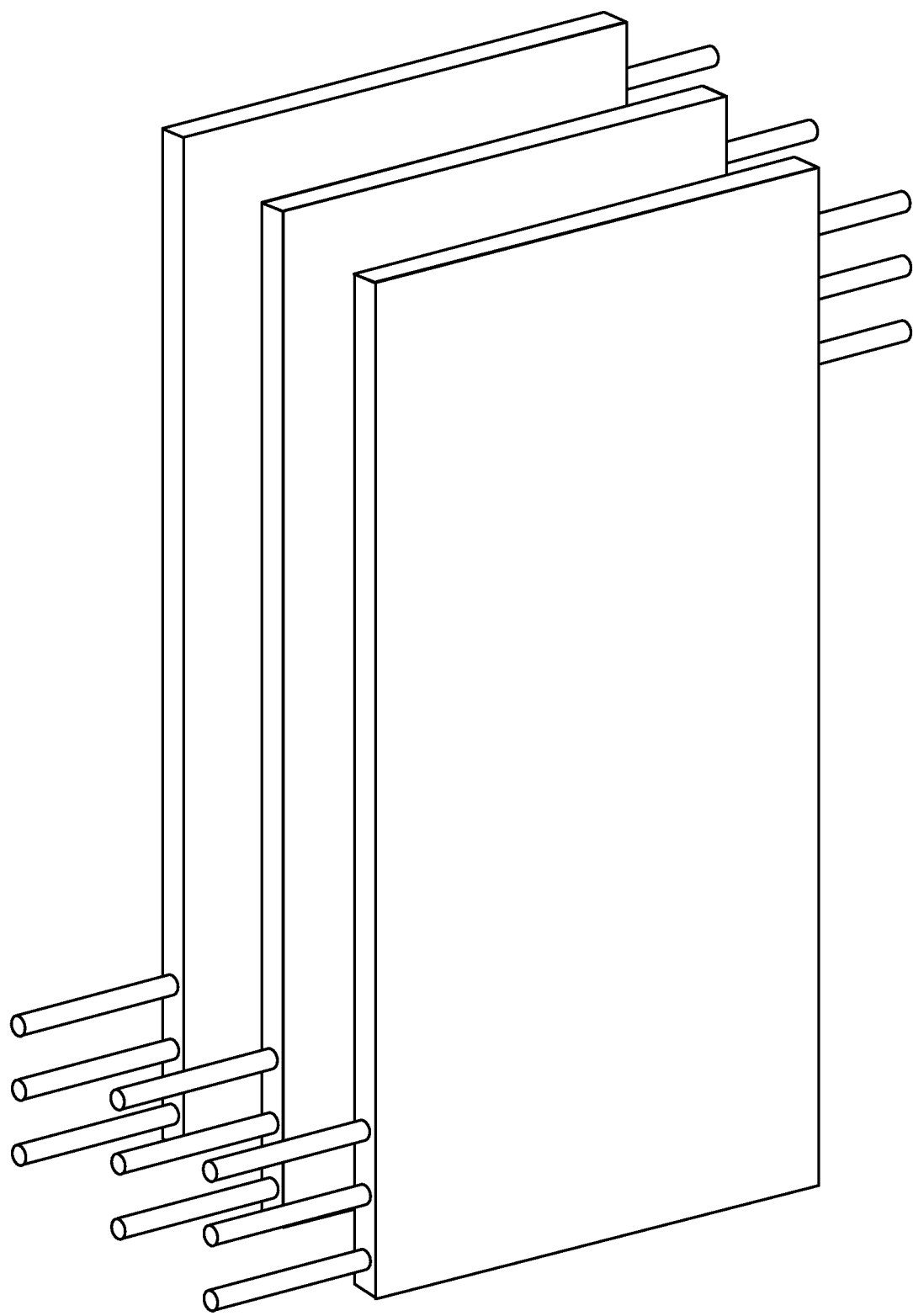
FIG. 7 illustrates another plate heat exchanger.

Referring to FIG. 7, it has been proposed to overcome some of the limitations of the plate heat exchangers described above by providing heat exchangers in which the working fluid is supplied to and discharged from each plate through tubes joined to the side edge of plates so as to reduce obstructions in the face of the plate or impediments to the water flow by the working fluid. In such heat exchanger plates, one end of each tube is joined to the plate using a welded connection, and the other end of the tube is joined to a header using a welded or mechanical joint connection. However, as discussed further below, each plate requires as many as 4 inlet and 8 outlet connections. At densities of approximately 20 plates per linear foot, as many as 4800 individual connections could be required in a 20 foot module. This poses both a manufacturing logistics problem as well as a quality control problem. When employed in an OTEC heat engine 10, the connections are also left exposed to the seawater environment.

In order to overcome the limitations of the heat exchangers described above, a gasket-free, open flow heat exchanger is provided. In some implementations, individual plates are horizontally aligned in a cabinet such that a gap exists between each plate. A flow path for the working fluid runs through the interior of each plate in a pattern providing high heat transfer (e.g., alternating serpentine, chevrons, z-patterns, and the like). The working fluid enters each plate through a manifold provided on the side of the plates so as to reduce obstructions in the face of the plate or impediments to the water flow by the working fluid, as discussed further below. The non-working fluid, such as water, flows vertically through the cabinet and fills the gaps between each of the open-flow plates. In some implementations, the non-working fluid is in contact with all sides of the open-flow plates or in contact with just the front and back surfaces of the open-flow plates.

The gasket-free, open flow heat exchanger including a manifold for supply and discharge of the working fluid eliminates the use of tube connections to the header entirely. In some cases, the inlet and outlet connections are formed integrally with the plate and welded to the adjacent plate during the assembly process. Once the connections are welded, the assembly can be encased in an epoxy that flows between the cartridges to provide structural reinforcement to the assembly and prevent seawater from contacting the welded surfaces, as discussed further below.

Referring to FIG. 8, an embodiment of a multi-stage heat exchanger system 520 includes multiple heat exchange modules 521, 522, 523 and 524 in a vertically stacked configuration. In this embodiment, each module 521, 522, 523, 524 corresponds to a stage of the system 520. In some implementations, for example when used as an evaporator 314 in the spar 310, the stacked heat exchanger modules accommodate warm sea water 570 flowing down through the system 520, from first evaporator module 521, to second evaporator module 522, to third evaporator module 523 to fourth evaporator module 524 (FIG. 8). In other implementations, for example when used as a condenser 320 in the spar 310, cold sea water 570 flows up through the system 520 from first condenser module 531, to second condenser module 532, to third condenser module 533, to fourth condenser module 534. In an embodiment, working fluid 580 flows through working fluid conduits in each heat exchanger module horizontally as compared to the vertical flow of the warm sea water or cold sea water. The vertical multi-stage heat exchange design of heat exchanger system 520 facilitates an integrated vessel and heat exchanger design (i.e., a spar), removes the requirement for interconnecting piping between heat exchanger stages, and ensures that virtually all of the heat exchanger system pressure drop occurs over the heat transfer surface. Thus, the flow direction of the water can be from top to bottom or bottom to top.

In some embodiments, the flow direction can be in the natural direction of the water as it is heated or cooled. For example, when condensing a working fluid, the water can flow through the vertically stacked module arrangement from bottom to top in the natural flow of convection as the water is warmed. In another example, when evaporating a working fluid, the water can flow from top to bottom as the water cools. In still other embodiments, the non-working fluid flow can be horizontally across the system, that is, from left to right or right to left. In other embodiments the flow direction can be vertical, horizontal or a combination of vertical and horizontal directions.

FIG. 9 schematically illustrates details of a single heat exchanger module 524 of the multi-stage heat exchanger system 520. The heat exchanger module 524 supports multiple heat exchange plates 1022. The non-working fluid 570 flows vertically through the heat exchanger module 524 and past each of the plates 1022. Solid arrows indicate the flow direction of the non-working fluid 570, which in this case is water.

The open-flow heat exchange module 524 includes cabinet face 1030 and cabinet side 1031. Opposite of cabinet face 1030 is cabinet face 1032 (not shown) and opposite of cabinet side 1031 is cabinet side 1033. The cabinet faces 1030, 1032 and sides 1031, 1033 form a plenum or water conduit through which the non-working fluid flows with little to no pressure losses due to piping. In contrast to the gasket-employing plate heat exchanger described above with respect to FIG. 6, the open flow heat exchanger module 524 uses the cabinet sides and faces to form a flow chamber containing the non-working fluid 570 (e.g., sea water) rather than using gaskets between plates to form the flow chamber containing the non-working fluid 580. Thus, the open-flow heat exchange module 524 is effectively gasket-free. This aspect of this system provides significant advantages over other plate and frame heat exchangers that rely on gaskets to isolate the working fluid from the energy providing medium (e.g., sea water). For example, corrosion testing of aluminum plate and frame heat exchangers done at NELHA in the 1980s and 1990s had to stop after only six months because there was so much leakage around the gaskets where biological deposits caused extensive corrosion. Plate and frame heat exchangers using gaskets rely on compression forces to seal gaskets against the plates. To assemble the unit requires additional space to insert plates and uncompressed gaskets and then tighten an array of bolts to about 50% of the original length. The applicants identified gasket issues as a major impediment to using a plate and frame design in an OTEC system.

In addition, the module approach combined with side edge mounted inlet and outlet ports for the heat exchange plates avoids the needs for the supply and discharge ports typically provided on the face of the plate heat exchange systems (see, e.g., FIG. 5). This approach increases the total heat exchange surface area of each plate as well as simplifying the flow path of both the working and non-working fluids. Removing the gaskets between the plates also removes significant obstructions that can cause resistance to flow. The gasket-free open-flow heat exchange modules can reduce back pressure and associated pumping demand, thus reducing the parasitic load of an OTEC plant and resulting in increased power that can be delivered to the utility company.

In the case of an OTEC condenser 320, module 524 is open on the bottom to the cold raw water supply, and open on the top to provide unobstructed fluid communication with the module 523 above. The final module in the vertical series 521 is open at the top to the raw water discharge system.

In the case of an OTEC evaporator 314, module 521 is open at the top to the warm raw water supply and open at the bottom to provide unobstructed fluid communication to the module 522 below. The final module 524 in the vertical series is open on the bottom to the warm raw water discharge system.

Figure 10:
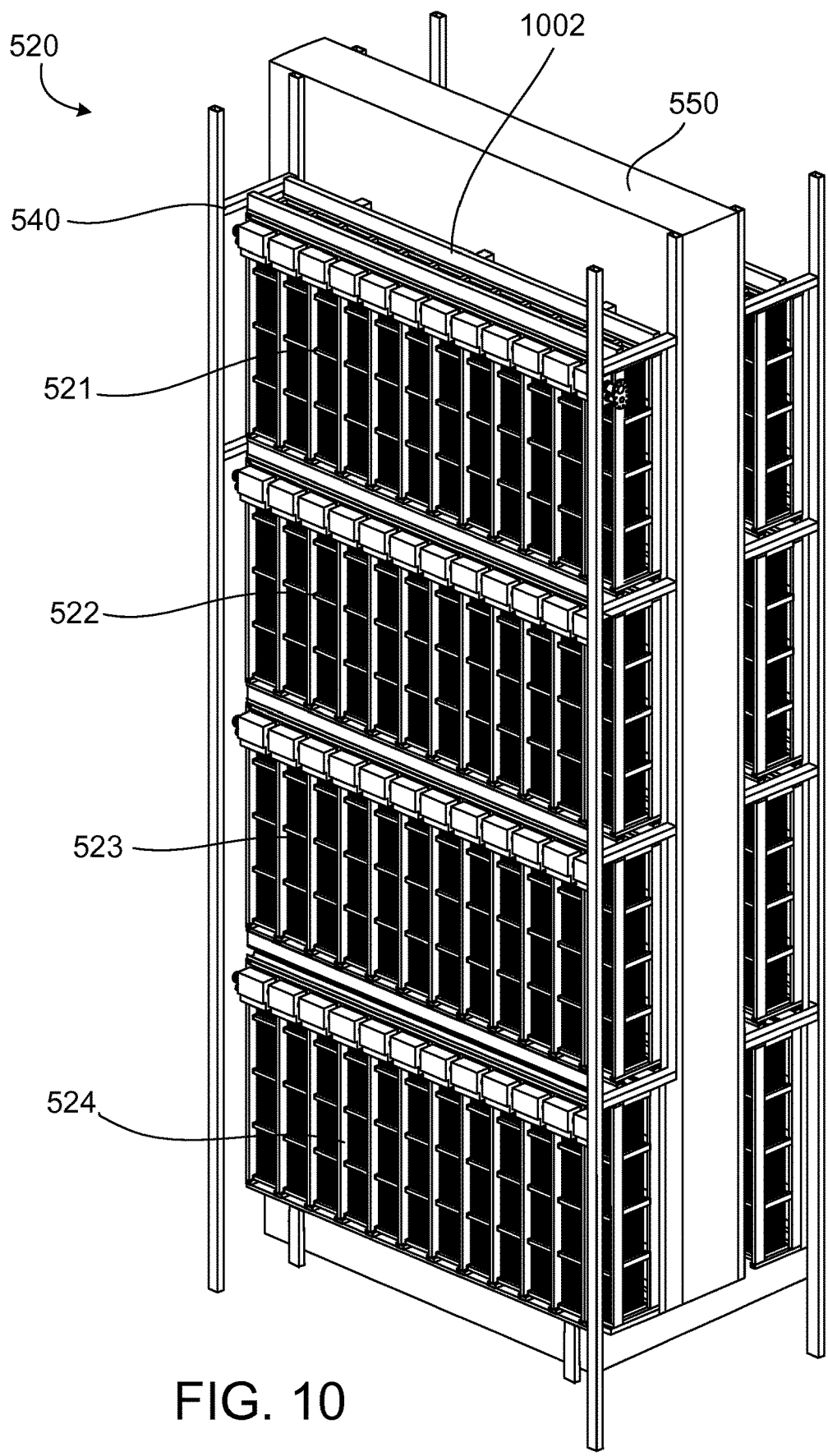
FIG. 10 illustrates a perspective view of four stage heat exchanger system.

Referring to FIG. 10, an exemplary embodiment of the multi-stage heat exchanger system 520 used in an evaporator 314 includes four heat exchanger modules 521, 522, 523, 524. In this embodiment, each heat exchanger module corresponds to one stage of the four-stage heat exchanger system 520. The four heat exchanger modules 521, 522, 523, 524 are supported on a support frame 540, which in turn is supported within the evaporator portion 344 by a pillar 550. Each of the four heat exchanger modules 521, 522, 523, 524 is identical, and thus only the lowermost module 524 will be described in detail.

Figure 11:
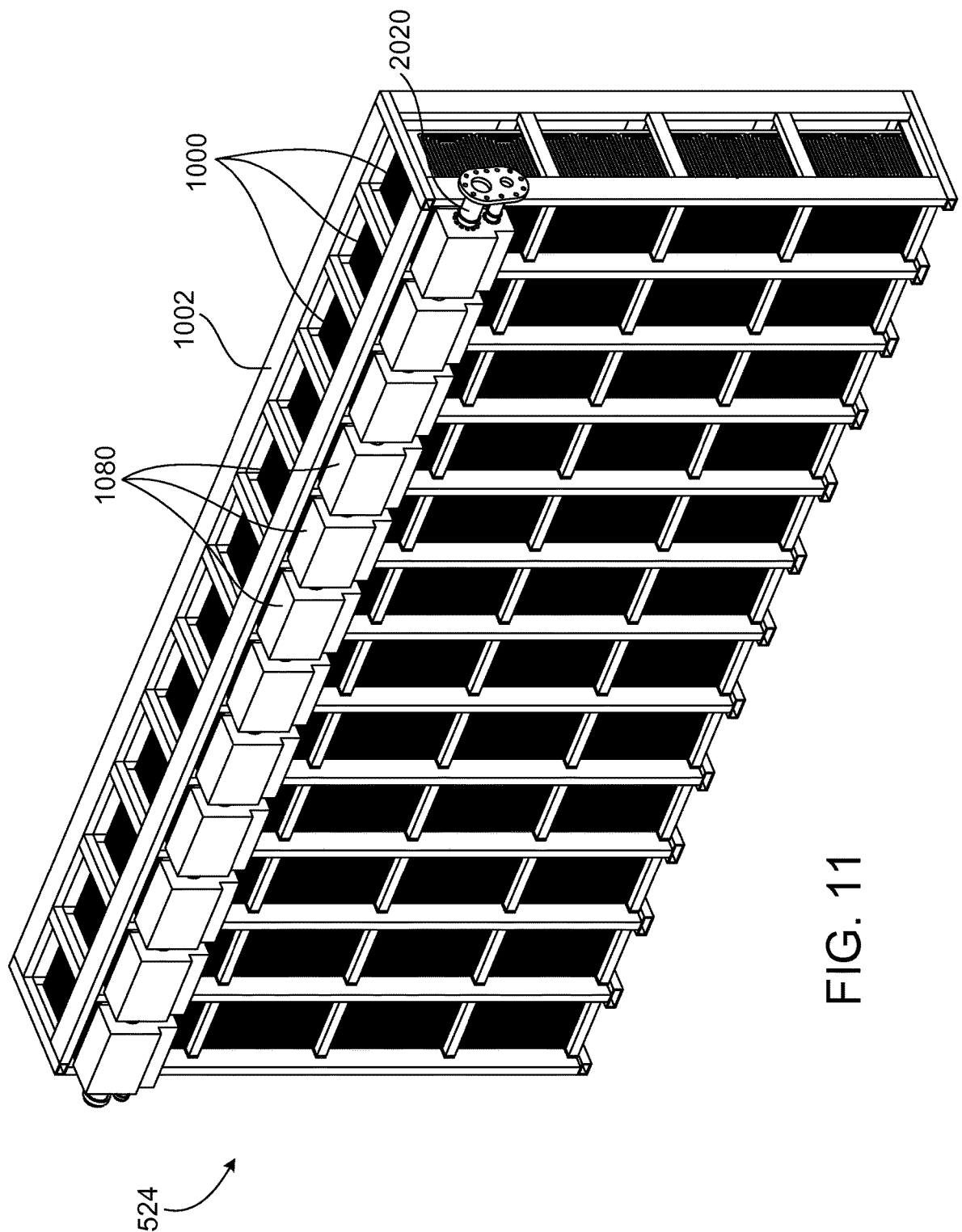
FIG. 11 illustrates a perspective view of a heat exchange module of the multi-stage heat exchange system of FIG. 10.

Referring to FIG. 11, the heat exchanger module 524 includes several heat exchanger arrays 1000 supported on a rack 1002. The rack 1002 is configured to cooperatively engage the support frame 540 when assembled into the multi-stage heat exchanger system 520.

Figure 12:
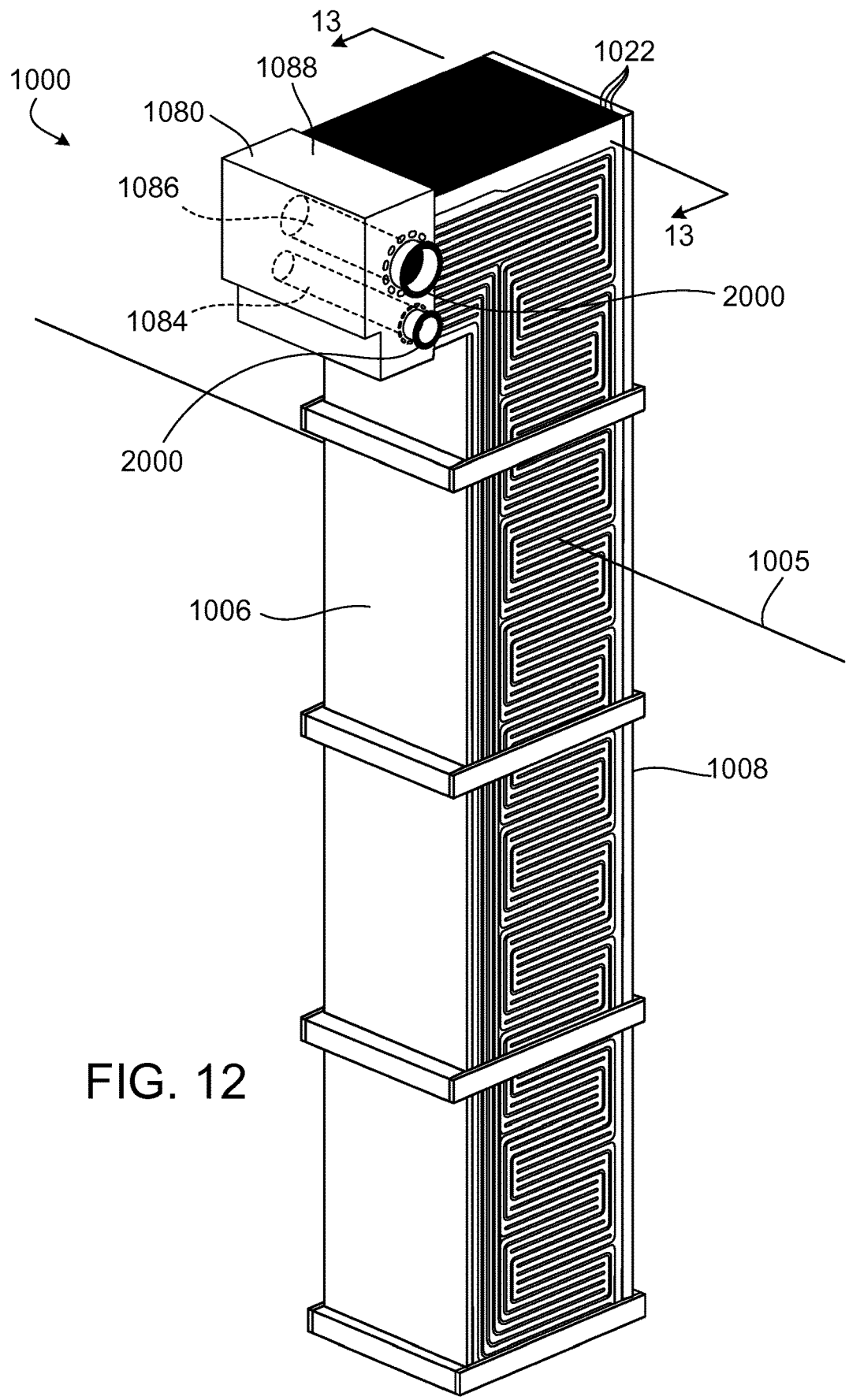
FIG. 12 illustrates a perspective view of a single heat exchanger array.
Figure 13:
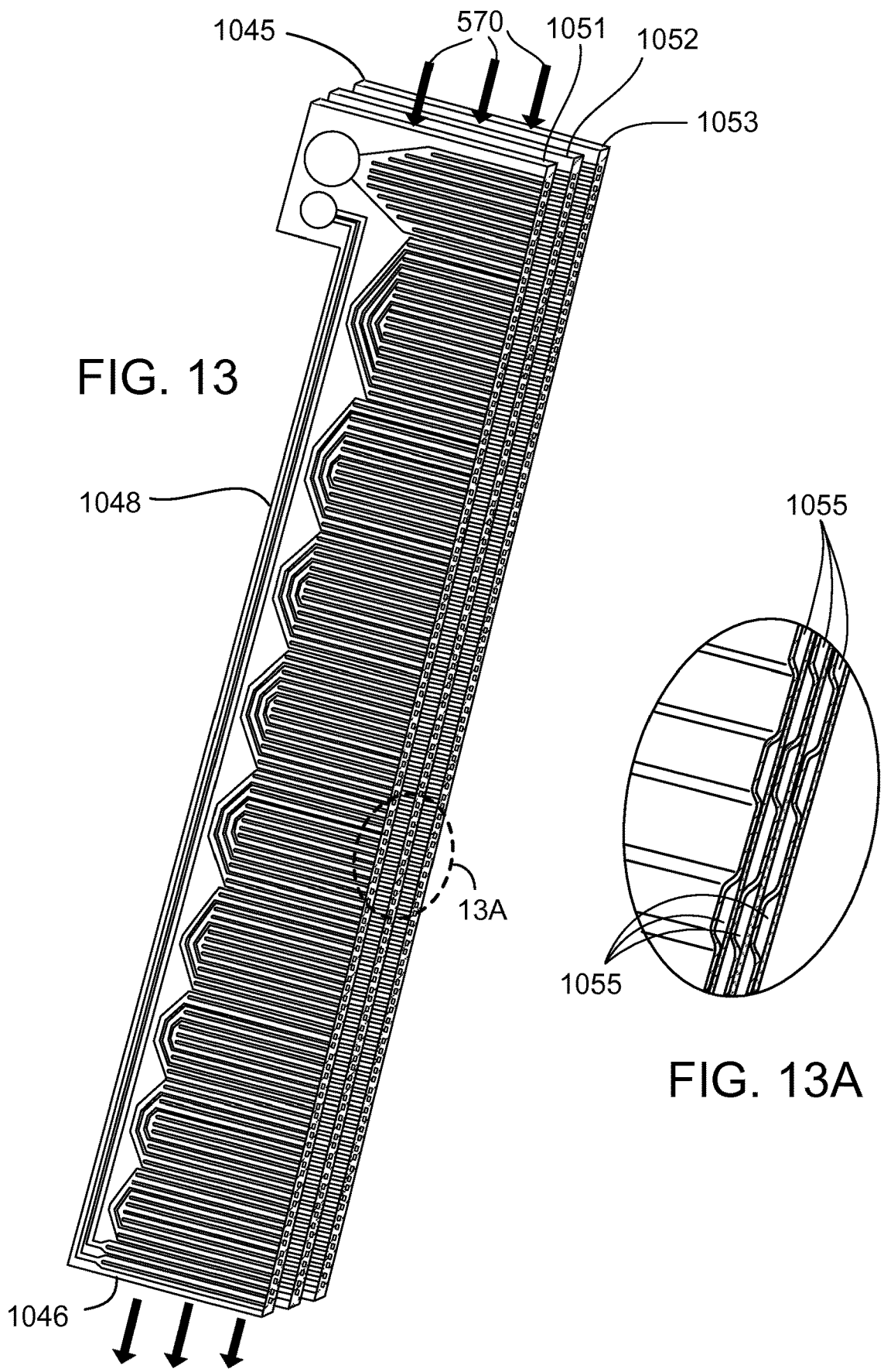
FIG. 13 illustrates a perspective cross-sectional view of the heat exchanger array as seen along line 13-13 of FIG. 12.

Referring to FIGS. 9 and 12-13, each heat exchanger array 1000 is formed of multiple, open-flow heat exchange plates 1022. Each open flow plate 1022 has a front face 1040, a back face 1042, and a peripheral edge 1044. Within each of the heat exchange arrays 1000, the heat exchange plates 1022 are stacked along an alignment axis 1005 that extends perpendicular to the front and back faces 1040, 1042. In the illustrated embodiment, the alignment axis 1005 extends horizontally, so that the heat exchange plates 1022 are arranged in horizontal alignment. In addition, a gap 1025 is provided between adjacent plates 1022.

The front face 1040 and back face 1042 provide the non-working fluid heat transfer surfaces of each plate 1022. The internal working fluid passageway 1055, described further below, provides the working fluid heat transfer surfaces of each plate 1022. Heat transfer surface efficiency can be improved using surface shape, treatment and spacing as described herein. Material selection such as alloys of aluminum offer superior economic performance over traditional titanium base designs. The heat transfer surface can comprise 100 Series, 3000 Series, or 5000 Series aluminum alloys. The heat transfer surface can comprise titanium and titanium alloys.

Figure 14:
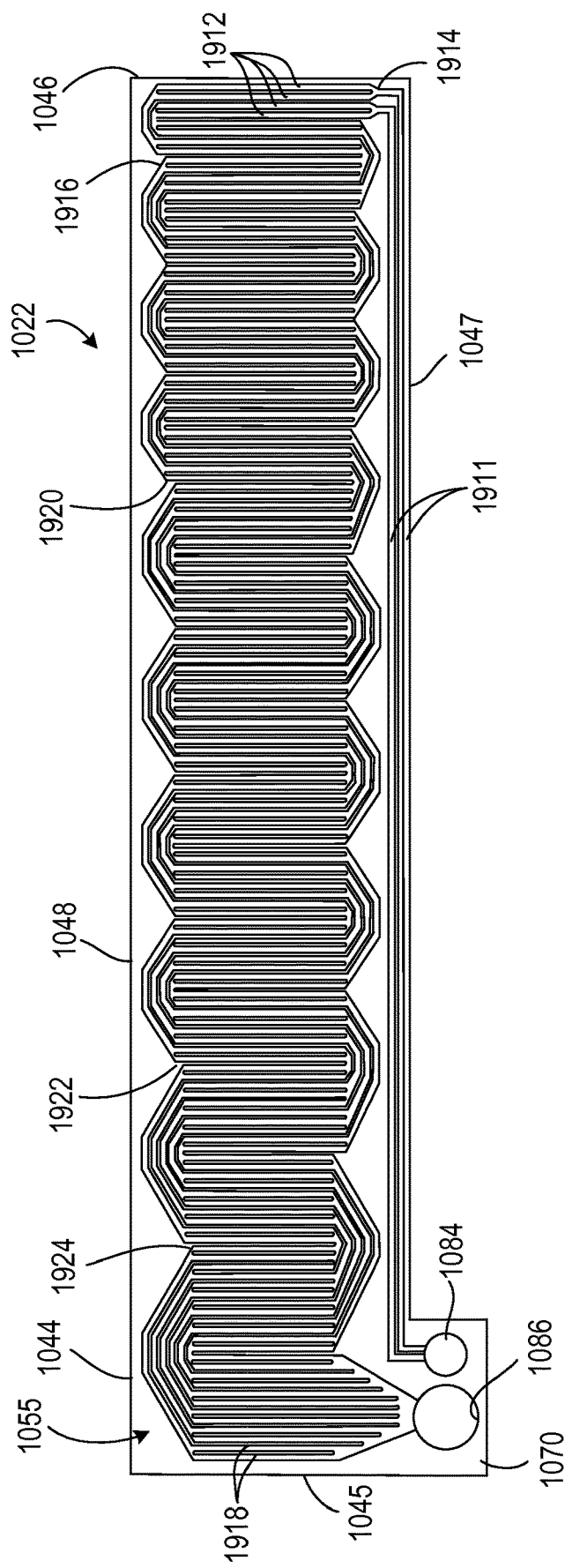
FIG. 14 illustrates a plan view of a heat exchange plate.

The peripheral edge 1044 of each plate 1022 includes a top (first) edge 1045, a bottom (second) edge 1046, a right (or back—third) edge 1047 and a left (or front—fourth) edge 1048, as shown in FIG. 14. As used herein, references to direction, including the terms front, back, top, bottom, left, and right, are made with respect to the orientation of the array shown in FIG. 12 which illustrates an evaporator configuration, and are not limiting. For example, when the heat exchange module 524 is used in a condenser configuration, it is inverted (rotated in space 180 degrees about the alignment axis 1005) such that the top edge 1045 of the plate becomes the bottom edge 1045' (not shown).

The plates 1022 are arranged in stacks in horizontal alignment so that the back face 1042 of a first plate 1051 faces the front face 1040 of a second plate 1052 adjacent to and immediately behind the first plate 1051, and the respective peripheral edges 1044 of each plate 1022 are aligned. To assure that uniform spacing is provided between adjacent plates 1051, 1052 (e.g., to assure that each gap 1025 is the same dimension), grooved backing plates 1006, 1008 are provided at the front and back sides of the stack. The first backing plate 1006 is disposed along a front side of the stack and extends from the tab 1070 to the bottom edge of the plates 1022. The second backing plate 1008 is disposed along the rear side of the stack and extends from the top edge to the bottom edge of the plates 1022. The stack-facing surfaces of the backing plates 1006, 1008 include grooves that receive the respective front side edges 1048 or back side edges 1047 each plate in the stack, and the groove spacing corresponds to the desired plate spacing.

Working fluid 580 is supplied to and discharged from the working fluid passageway 1055 at a peripheral edge of each of the plates 1022 using a manifold 1080 (FIG. 12) to avoid impediments to the flow of the raw water through the gaps 1025 as the non-working fluid flows past the front and back faces 1040, 1042 of the plurality of plates 1022 in the rack 1002. For example, in the illustrated embodiment, the manifold 1080 is provided along the right edge 1048.

Each of the plates 1022 includes the working fluid passageway 1055 that is internal to the plate. The manifold 1080 is in fluid communication with the working fluid flow passage 1055 of each plate 1022 of the heat exchanger array 1000, and supplies working fluid to each plate 1022 of the heat exchanger array.

Referring to FIG. 14, the working fluid passageway 1055 may be formed of several parallel mini-channels 1912. The mini-channels that provide the internal flow paths within each open-flow plate are arranged in an alternating serpentine pattern so that the flow of the working fluid 580 is substantially perpendicular or cross-flow to the flow direction of the non-working fluid 570. In addition, the progression of the working fluid 580 through the serpentine pattern can be generally parallel to the flow of the non-working fluid 570 or opposite the direction of flow of the non-working fluid 570. In some embodiments, guide vanes and varying flow path dimensions can be implemented to even the flow distribution among parallel channels to smoothly direct the fluid to subsequent channels when the flow direction is reversed. These and other channel features and configurations are described in co-pending U.S. patent application Ser. No. 13/209,944 entitled Staved Ocean Thermal Energy Conversion Power Plant-Cold Water Pipe Connection, which is incorporated by reference in its entirety.

It has been found that the working fluid changes its phase from liquid to vapor along the flow path, and consequently the working fluid pressure drop will increase significantly if the same flow passage area is used throughout the entire heat exchange plate like. In order to reduce the fluid-pressure drop increase along the flow associated with its vapor quality change, the number of parallel flow passages per pass can be increased along the flow path of the working fluid. For example, the heat exchange plate 1022 in FIG. 14 has two inlet passageways 1911 which each feed into corresponding mini-channels 1912 adjacent the bottom edge 1046. The mini-channels 1912 extend along the plate in a serpentine fashion. The flow from two mini-channels feeds into four mini-channels at a first transition point 1914. The flow from four mini-channels feeds into six mini-channels at a second transition point 1916. The flow from the six mini-channels feeds into eight mini-channels at a third transition point 1920, and from eight mini-channels to ten mini-channels at a fourth transition point 1922. The flow from ten mini-channels feeds into twelve mini-channels at a fifth transition point 1924. The resulting twelve mini-channels discharge through fluid outlets 1918.

The two inlet passageways 1911 are supplied with the working fluid 580 by the manifold 1080. In particular, the manifold 1080 includes a manifold supply chamber 1084 extends in a direction parallel to the alignment axis 1005 and is in fluid communication with each of the four inlet passageways 1911 of each plate 1022 of the heat exchange array 1000. In addition, the manifold 1080 includes a manifold discharge chamber 1086 that extends in a direction parallel to the alignment axis 1005, and is separate and isolated from the manifold discharge chamber 1086 within the manifold 1080. Each of the four outlet passageways 1918 of each plate 1051, 1052 of the heat exchanger array 1000 is in fluid communication with a manifold discharge chamber 1086, and the working fluid 590 is discharged from the eight outlet passageways into the manifold discharge chamber 1086.

To facilitate connection of the working fluid inlets and outlets to the manifold 1080, the manifold 1080 includes tabs 1070 that connect to the right side edge 1078 of the plate 1022. Each tab 1070 is coplanar with the corresponding plate 1022, and includes internal tab inlet passageways 1072 that are in fluid communication with, and form extensions of, each working fluid inlet passageway 1911 of the plate 1022. In addition, each tab 1070 includes internal tab outlet passageways 1074 that are in fluid communication with, and form extensions of, each working fluid outlet passageway 1918 of the plate 1022. An inlet opening 1076 is formed in each tab that defines a portion of the manifold supply chamber 1084, and an outlet opening 1078 is formed in each tab that defines a portion of the manifold discharge chamber, as discussed below.

Although the manifold supply chamber 1084 and the manifold discharge chamber 1086 are structurally similar, the manifold supply chamber 1084 for a heat exchanger array 1000 being used as an evaporator is smaller than the corresponding manifold discharge chamber 1086. This is achieved by forming the tab inlet openings 1076 with a smaller diameter than the tab outlet openings 1078. This size difference reflects the fact that the working fluid 580 enters an evaporator as a liquid, and the same fluid exits the evaporator as a gas. Accordingly, when the heat exchanger array 1000 is employed in a condenser, the manifold supply chamber 1084 is larger than the corresponding manifold discharge chamber 1086.

In use, the manifold supply chamber 1084 for a heat exchanger array 1000 being used as an evaporator is located below (e.g., located further from the plate top edge 1045) than the manifold discharge chamber 1086. This is because the working fluid 580 enters the plate 1022 from the manifold supply chamber 1084 as a liquid, and exits as a gas to the manifold discharge chamber 1086. Accordingly, when the heat exchanger array 1000 is employed in a condenser, the relative positions of the manifold supply chamber 1084 and the manifold discharge chamber 1086 with respect to the top edge 1045 are reversed and the tab 1070 is translated to the bottom of the plate. Port 1085 on the condenser is then in communication with channels 1911 that port working fluid gas to the top of the cartridge to be in communication with channels 1918. The gas changes phase and the liquid working fluid falls and collects at the bottom of the cartridge in channels 1912 that are in communication with port 1084 through which the liquid working fluid is discharged.

The manifold 1080 includes a manifold housing 1088 that encloses all the tabs 1070 of the plates 1020 within a heat exchanger array 1000. The housing 1088 has a box shaped outer periphery, and can be formed of a rigid material such as a polysulfate-based epoxy resin (hereinafter referred to as "epoxy"). By encapsulating the tabs 1070, including the manifold supply chamber 1084 and the manifold discharge chamber 1086 (evaporator; supply and discharge are reversed for the condenser), in epoxy, welds provided between adjacent tabs 1070 are reinforced and a secondary barrier to leakage of the working fluid is provided. In addition, encapsulating the tabs 1070 in epoxy serves to set and hold the plate spacing, and structurally reinforce the manifold 1080 since the epoxy acts as a stiffener. Also advantageously, encapsulation also seals all joints from contact with the non-working fluid 580 (e.g., sea water).

Figures 15A, 15B:
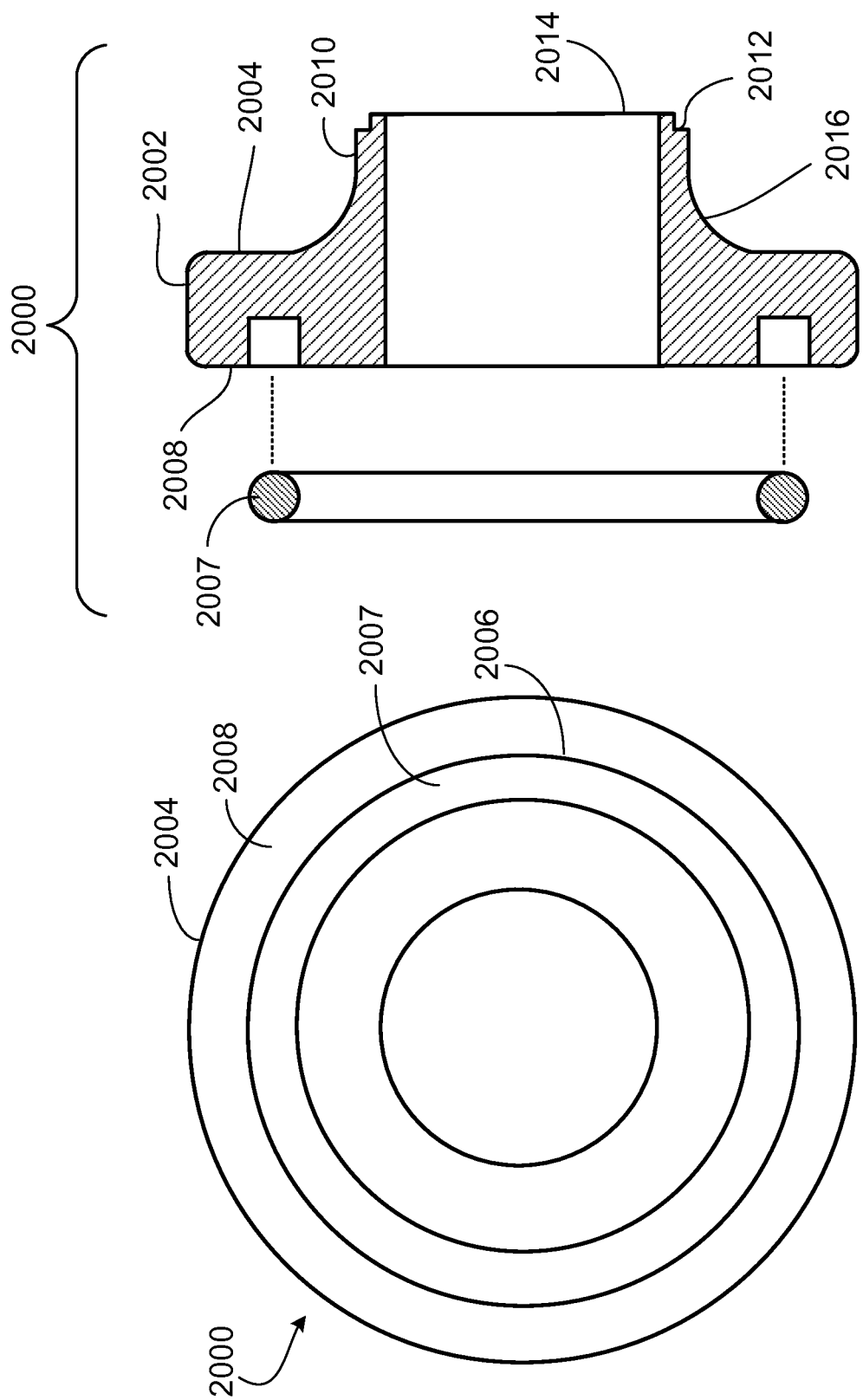
FIG. 15A illustrates an end view of a flange connector.
FIG. 15B illustrates an exploded side view of the flange connector of FIG. 15A.
Figure 16:
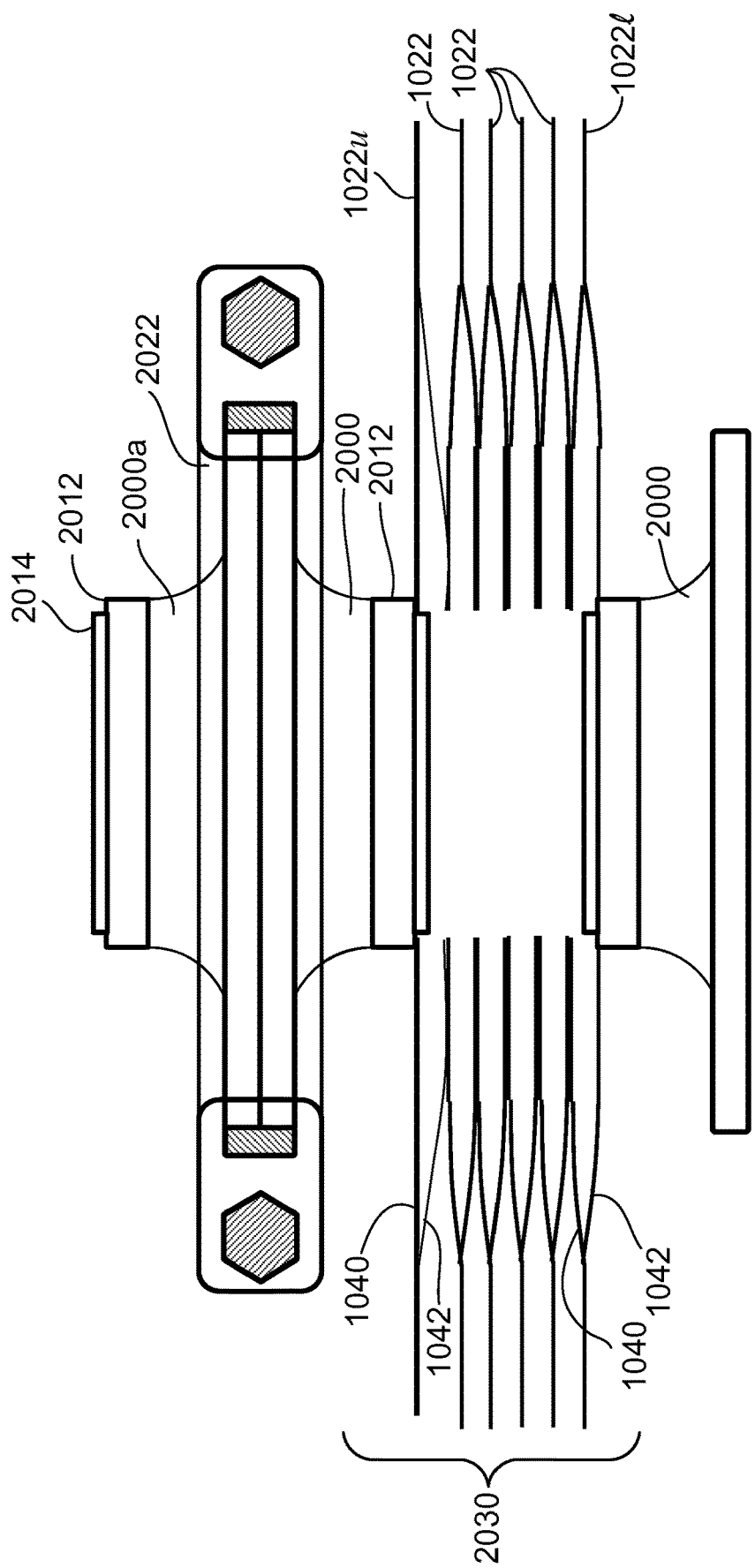
FIG. 16 illustrates a side sectional view of a portion of a manifold including flange connectors.
Figure 17:
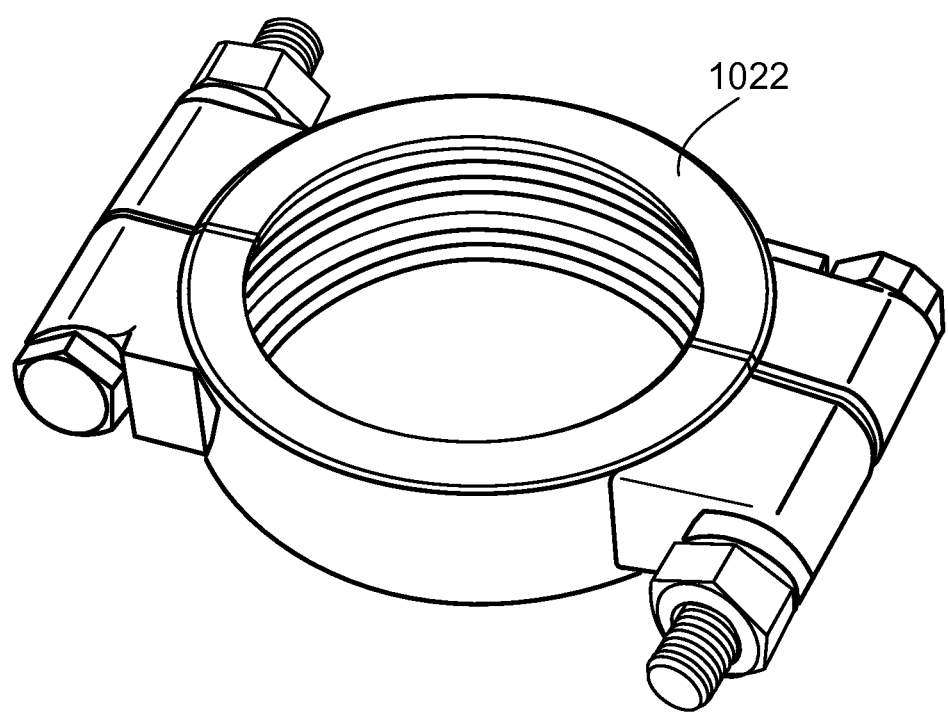
FIG. 17 illustrates a perspective view of a clamp.

Referring to FIGS. 15A and 15B, the manifolds 1080 of adjacent heat exchanger arrays 1000 within the heat exchanger module 524 are connected using flange connectors 2000 that permit fluid communication between the adjacent manifolds 1080 or connection to a fluid supply line. In particular, a flange connector 2000 is provided at each end of the manifold supply chamber 1084, and at each end of the manifold discharge chamber 1086. Each flange connector 2000 is a frusto-conical tube that includes a sidewall 2016 shaped such that the connector first end 2002 is larger in dimension than the opposed connector second end 2010, and the connector sidewalls are curved between the connector first end 2002 and the connector second end 2010.

Referring to FIGS. 12, 15, 16 and 17, the connector first end 2002 is used to join the flange connector 2000 to a corresponding flange connector 2000a of an adjacent manifold 1080 or to a supply or discharge line 2020. The connector first end 2002 includes a rim 2004, and an O-ring 2007 is provided in a groove 2006 on the end face 2008 of the connector first end 2002. The O-ring 2007 provides a seal that prevents leakage of working fluid 580 at the connection surface. In use, a clamp 2022 (FIGS. 16 and 17) is used to secure the connector first end 2002 of one flange connector 2000 to the connector first end 2002 of the adjacent flange connector 2000a so that the respective second end faces 2008 are abutting and fluid communication is provided between the corresponding manifold chambers. An exemplary clamp for this purpose is a two-bolt, high-pressure sanitary clamp.

The connector second end 2010 has a slightly larger outer diameter than the corresponding manifold supply or discharge chamber 1084, 1086, and includes a stepped portion or ferrule 2014 that extends longitudinally outward from an end face 2012 of the connector second end 2010. The stepped portion 2014 has an outer diameter that corresponds to the inner diameter of the corresponding manifold supply or discharge chamber 1084, 1086. In use, the stepped portion 2014 is received within the corresponding manifold supply or discharge chamber 1084, 1086, and the connector second end 2010 is fixed to the manifold 1080. In some embodiments, the connector second end 2010 is welded to the manifold 1080.

It will be appreciated that each heat exchanger module 524, 523, 522, and 521 has similar components and is vertically aligned such that the horizontally aligned plates 1022 in one module vertically align over the plates in the module below. The gaps 1025 between plates 1022 on one module vertically align over the gaps 1025 between plates 1022 in the module below.

Figure 18:
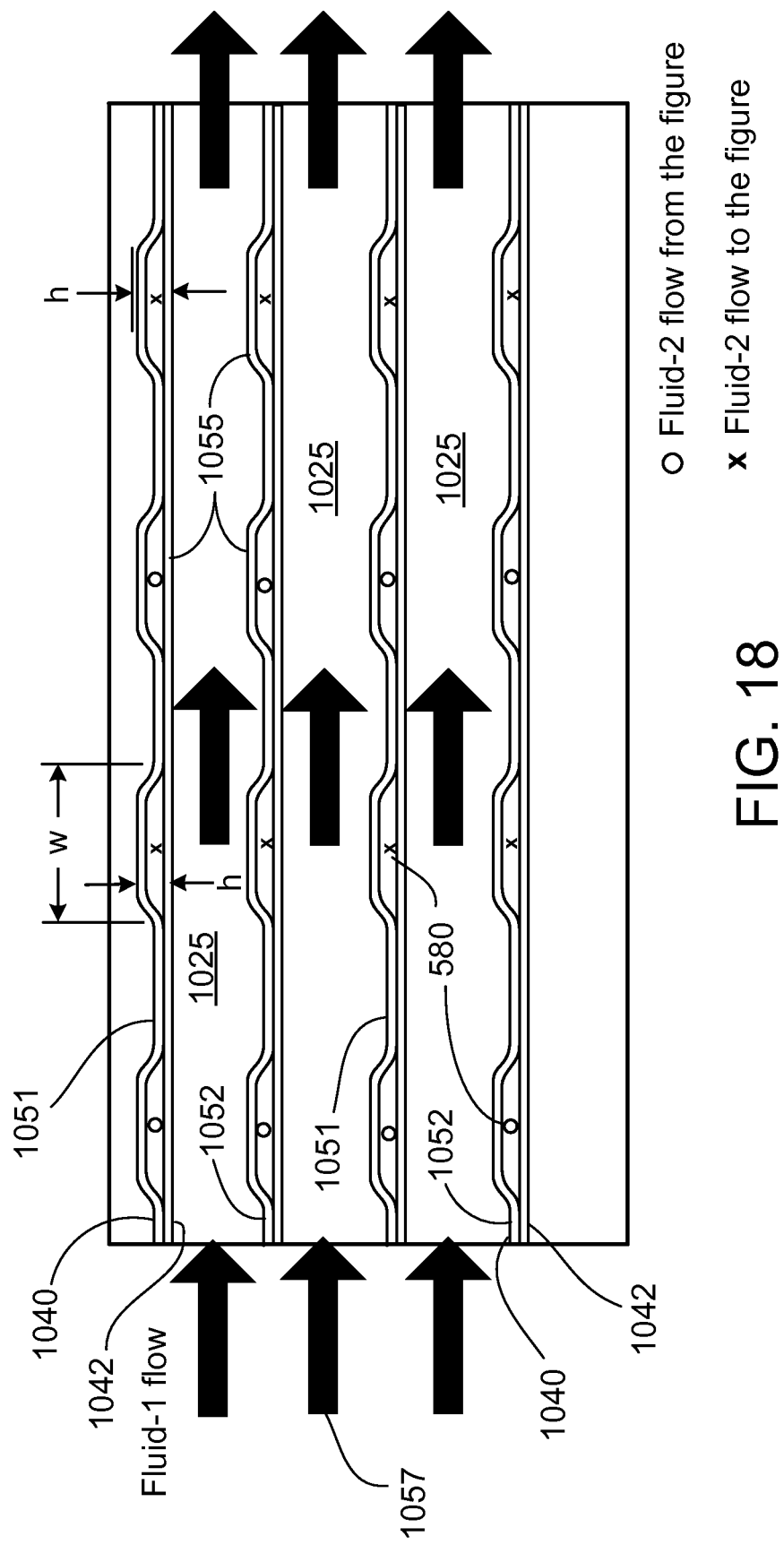
FIG. 18 illustrates a cross sectional view of a portion of the heat exchanger array.

Referring to FIG. 18, which illustrates a side sectional view of a portion of the heat exchange module 524, an exemplary implementation of the plate arrangement in a heat exchanger array 1000 includes at least one first open-flow heat exchange plate 1051 having an exterior surface including at least a front face 1040 and back face 1042. In use, the exterior surface is in fluid communication with and surrounded by the non-working fluid 570, such as cold raw water. The first open flow plate 1051 also includes the internal passage 1055 in fluid communication with a manifold 1080 and configured to receive a working fluid 580 via the manifold 1080. At least one second open-flow heat exchange plate 1052 is horizontally aligned with the first open-flow heat exchange plate 1051 such that the front exterior face 1040 of the second plate 1052 faces the back exterior face 1042 of the first plate 1051. The first open flow plate 1051 is substantially identical to the second open flow plate 1052. That is, like the first plate 1051, the exterior surfaces of the second plate 1052 are in fluid communication with and surrounded by the non-working fluid 570. In addition, the second plate 1052 includes an internal passage 1055 that is in fluid communication with the manifold 1080 and is configured to receive the working fluid 580.

The first open-flow heat exchange plate 1051 is separated from the second heat exchange plate 1052 by the gap 1025, and the non-working fluid 570 flows through the gap 1025. The working fluid 580 flows through the internal working fluid flow passages 1055.

As described above, in some implementations, a single heat exchange module 524 can be dedicated to a single stage of a hybrid cascade OTEC cycle. In some implementations, four heat exchange modules 521, 522, 523, 524 are vertically aligned, as depicted and described in FIGS. 8 and 10. In some implementations, modules having working fluid supply and discharge lines connected to a manifold 1080 located at the peripheral edge 1044 of each plate. This avoids having working fluid conduits located on the face 1040, 1042 of the plates and impeding the flow of both the working fluid within the plate plates 1051, 1052 and the non-working fluid along the plate faces 1040, 1042.

For example, a gasket-free multi-stage heat exchange system can include a first stage heat exchange module comprising one or more open-flow plates in fluid communication with a first working fluid flowing through an internal passage in each of the one or more open-flow plates. The working fluid can be supplied and discharged from each plate via a first manifold including a fluid supply chamber 1084 and a fluid discharge chamber 1086, each chamber connected to a peripheral edge of each individual plate. A second stage heat exchange module vertically aligned with the first stage heat exchange module is also included. The second stage heat exchange module includes one or more open-flow plates in fluid communication with a second working fluid flowing through an internal passage in each of the one or more open-flow plates. Again, the second working fluid is supplied and discharged to and from each individual plate via a second manifold including a fluid supply chamber 1084 and a fluid discharge chamber 1086, each chamber connected to a peripheral edge of each individual plate. A non-working fluid, such as water, flows first through the first stage heat exchange module and around each of the one or more open-flow plates allowing for thermal exchange with the first working fluid. The non-working fluid then passes through the second stage heat exchange module and around each of the open-flow plates allowing for thermal exchange with the second working fluid.

The first stage heat exchange module includes a plurality of open-flow plates in horizontal alignment having a gap between each plate. The second stage heat exchange module also includes a plurality of open-flow plates in horizontal alignment having a gap between each plate within the second stage heat exchange modules. The plurality of open-flow plates and gaps in the second stage heat exchange module are vertically aligned with the plurality of open-flow plates and gaps in the first stage heat exchange module. This reduces pressure losses in the flow of the non-working fluid through the first and second stage heat exchange modules.

Pressure losses in the non-working fluid are also reduced by having the non-working fluid directly discharge from one module to the next thereby eliminating the need for extensive and massive piping systems. In some embodiments, backing plates 1006, 1008 that are used to maintain spacing of individual plates 1022 within the array 1000, and are positioned adjacent the plate side edges 1047, 1048 form the conduit through which the non-working fluid flows.

Due to the open-flow arrangement of the plates in each array of each stage of an exemplary four stage OTEC system, the flow ratio of the non-working fluid to the working fluid is increased from the typical 1:1 of most conventional plate heat exchanger systems. In some implementations the flow ratio of the non-working fluid is greater than 1:1, (e.g., greater than 2:1, greater than 10:1, greater than 20:1, greater than 30:1, greater than 40:1, greater than 50:1, greater than 60:1, greater than 70:1, greater than 80:1, greater than 90:1 or greater than 100:1).

When a multi-stage arrangement of heat exchange modules is used as a condenser, the non-working fluid (e.g., the cold sea water) generally enters the first stage heat exchange module at a temperature lower than when the non-working fluid enters the second stage heat exchange module, and the non-working fluid then enters the second stage heat exchange module at a temperature lower than when the non-working fluid entered the third stage heat exchange module; and the non-working fluid enters the third stage heat exchange module at a temperature generally lower than when it enters the fourth stage heat exchange module.

When a multi-stage arrangement of heat exchange modules are used as an evaporator, the non-working fluid (e.g., the warm sea water) generally enters the first stage heat exchange module at a temperature higher than when the non-working fluid enters the second stage heat exchange module, and the non-working fluid then enters the second stage heat exchange module at a temperature higher than when the non-working fluid enters the third stage heat exchange module; and the non-working fluid enters the third stage heat exchange module at a temperature generally higher than when it enters the fourth stage heat exchange module.

When a multi-stage arrangement of heat exchange modules are used as an condenser, the working fluid (e.g., the ammonia) generally exits the first stage heat exchange module at a temperature lower than when the working fluid exits the second stage heat exchange module, and the working fluid exits the second stage heat exchange module at a temperature lower than the working fluid exits the third stage heat exchange module; and the working fluid exits the third stage heat exchange module at a temperature generally lower than when it exits the fourth stage heat exchange module.

When a multi-stage arrangement of heat exchange modules are used as an evaporator, the working fluid (e.g., the ammonia) generally exits the first stage heat exchange module at a temperature higher than the working fluid exiting the second stage heat exchange module, and the working fluid exits the second stage heat exchange module at a temperature generally higher than the working fluid exits the third stage heat exchange module; and the working fluid exits the third stage heat exchange module at a temperature generally higher than when it exits the fourth stage heat exchange module.

An exemplary heat balance of an implementation of a four stage OTEC cycle is described herein and generally illustrates these concepts.

In some implementations, a four stage, gasket-free, heat exchange system includes a first stage heat exchange module having one or more open-flow plates, each plate includes an exterior surface having at least a front and back face surrounded by a non-working fluid. Each plate also includes an internal passage in fluid communication with a first working fluid flowing through the internal passage. The working fluid is supplied and discharged from each plate by supply and discharge lines dedicated to each plate.

The four-stage heat exchange system also includes second stage heat exchange module vertically aligned with the first heat exchange module, the second stage heat exchange module includes one or more open-flow heat exchange plates substantially similar to those of the first stage and vertically aligned with the plates of the first stage.

A third stage heat exchange module, substantially similar to the first and second stage heat exchange modules is also included and is vertically aligned with the second stage heat exchange module. A fourth stage heat exchange module substantially similar to the first, second and third stage heat exchange modules is included and vertically aligned with the third stage heat exchange module.

In operation, the non-working fluid flows through the first stage heat exchange module and surrounds each open-flow plate therein for thermal interaction with the first working fluid flowing within the internal flow passages of each plate. The non-working fluid then flows through the second stage heat exchange module for thermal interaction with the second working fluid. The non-working fluid then flows through the second stage heat exchange module for thermal interaction with the second working fluid before flowing through the third stage heat exchange module for thermal interaction with the third working fluid. The non-working fluid flows through the third stage heat exchange module for thermal interaction with the third working fluid before flowing through the fourth stage heat exchange module for thermal interaction with the fourth working fluid. The non-working fluid is then discharged from the heat exchange system.

The low temperature differential of OTEC operations (typically between 35 degrees F. and 85 degrees F.) requires a heat exchange plate design free of obstructions in the flow of the non-working fluid and the working fluid. Moreover the plate must provide enough surface area to support the low temperature lift energy conversion of the working fluid.

Conventional power generation systems typically use combustion process with a large temperature lift system such as a steam power cycle. As environmental issues and unbalanced fossil fuel supply issues become more prevalent, Low Temperature Lift Energy Conversion (LTLEC) systems, such as the implementations of OTEC systems described herein, and which use renewable energy sources such as solar thermal and ocean thermal, will become more important. While conventional steam power cycles use exhaust gas from combustion process and are usually at very high temperatures, the LTLEC cycles use low temperature energy sources ranging from 30 to 100 degrees C. Therefore, the temperature difference between the heat source and heat sink of the LTLEC cycle is much smaller than that of the steam power cycle.

Figure 19:
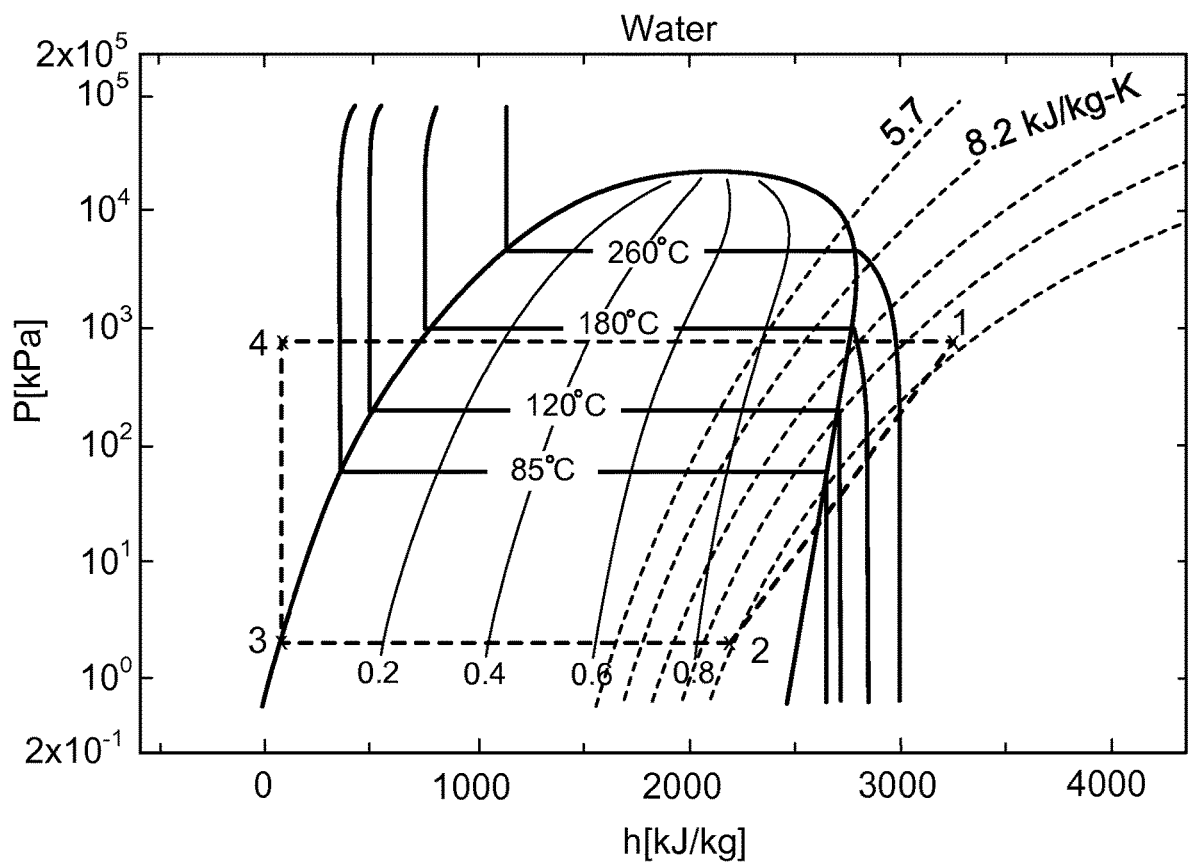
FIG. 19 illustrates a P-h diagram of a conventional high pressure steam cycle.

FIG. 19 shows the process of a conventional high temperature steam power cycle in a pressure-enthalpy (P-h) diagram. Thermal efficiency of the steam power cycle is in the range of 30 to 35%.

Figure 20:
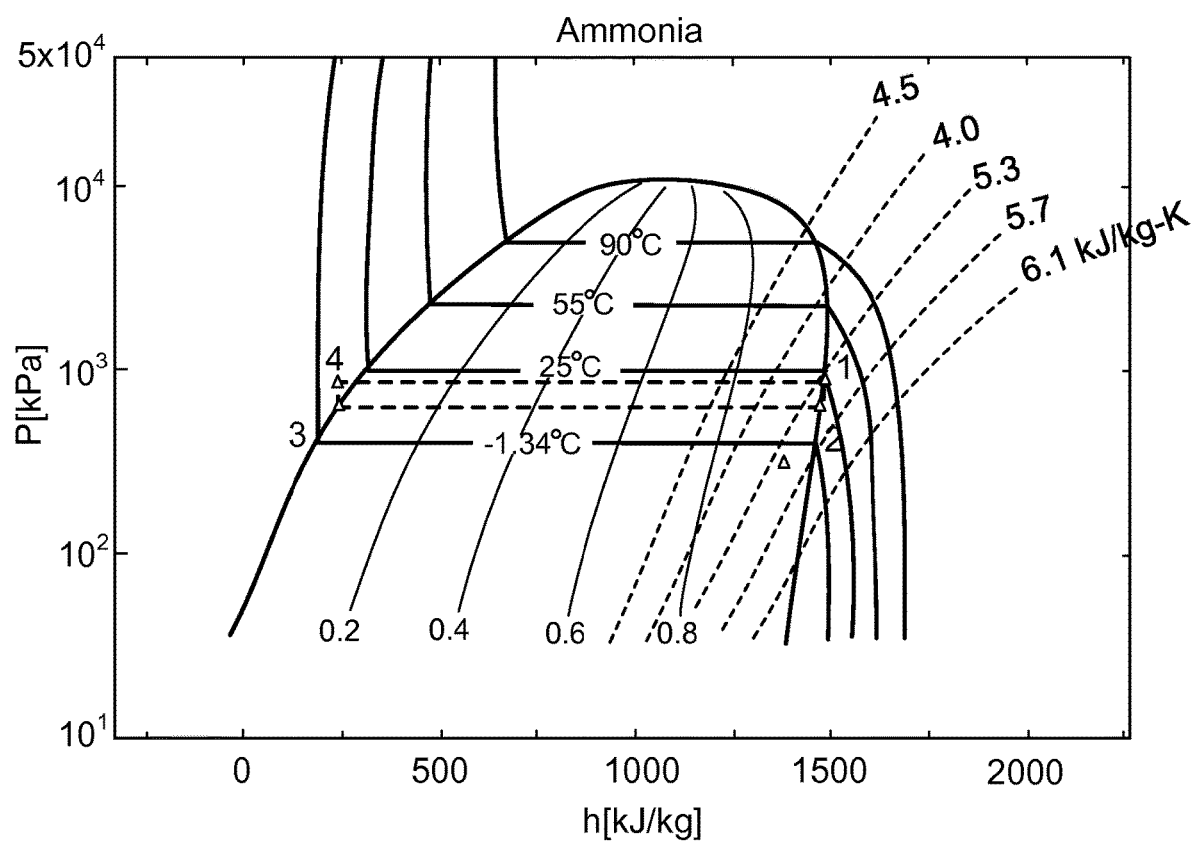
FIG. 20 illustrates a P-h diagram of a heat cycle.

In contrast, FIG. 20 shows the P-h diagram of an LTLEC cycle, such as those used in OTEC operations. Typical thermal efficiency for an LTLEC cycle is 2 to 10%. This is almost one-third to one-tenth that of a conventional high temperature steam power cycle. Hence, an LTLEC cycle needs much larger size heat exchangers than conventional power cycles.

The heat exchange plates described herein provide high heat transfer performance and also low pressure drop in heat source and heat sink fluid sides to limit the pumping power requirements which affect the system efficiency. These heat exchange plates, designed for OTEC and other LTLEC cycles, can include the following features:

1) A working fluid flow path having a mini-channel design. This can be provided in a roll-bonded aluminum heat exchange plate and provides a large active heat transfer area between the working and non-working fluids;

2) A gap provided between plates so as to significantly reduce the pressure drop in heat source and heat sink non-working fluids. In this way, a relatively wide fluid flow area for heat source and heat sink fluid sides can be provided, while maintaining a relatively narrow fluid flow area for the working fluid of the power cycle;

3) A configuration of progressively changing channel numbers per pass within the flow passages of the working fluid can reduce the pressure drop of the phase-changing working fluid along the flow. The number of channels in the plate can be designed according to the working fluid, operating conditions, and heat exchanger geometry.

4) A wavy working fluid flow passage or channel configuration can enhance the heat transfer performance.

5) Within the working fluid flow channels and among parallel channels, both ends of channel's inner walls of the flow channel can be curved to smoothly direct the fluid to subsequent channels when the flow direction is reversed, and non-uniform distances from the ends of channel's inner walls to the side wall can be used among parallel channels.

The above features can reduce the pumping power needed in the system, and enhance the heat transfer performance.

Referring again to FIGS. 13, 13A and 18, mini-channel roll-bonded heat exchange plates 1051 and 1052 are shown in perspective view. A cross-counter flow between the working fluid 580 and the non-working fluid 570 is provided. When used as an evaporator, the non-working fluid 570 (e.g., seawater) enters at the top edge 1045 of the plates 1051, 1052 and leaves from the bottom edge 1046 of the plates 1051, 1052. The working fluid 580 (e.g., ammonia) enters the right side edge 1048 of the plates via the manifold 1080 in liquid state, and evaporates and finally becomes vapor phase by absorbing thermal energy from the higher temperature non-working fluid 570. The generated vapor leaves the plates from the right side edge 1048 via the manifold.

The plates 1051, 1052 can be formed using a roll-bonding process so that the working fluid flow channels 1055 are disposed within the plate itself. Roll bonding is a manufacturing process by which two metal panels are fused together by heat and pressure and then expanded with high pressure air so that flow channels are created between the two panels. Prior to fusion, a carbon-based material is printed on an upper surface of a first one of the panels in a pattern corresponding to the desired path of the working fluid flow channels. The second panel is then laid atop the first panel and the two panels are then rolled through a hot rolling press to form a single plate where the two panels are fused everywhere except where the carbon material is present. At least one channel is printed to the peripheral edge of the plate, where a vibrating mandrel is inserted between the two panels, creating a port into which pressurized air is injected. The pressurized air causes the metal to deform and expand so that internal channels are created where the two panels are prevented from fusing together. There are two ways that roll bonding can be done: continuous, wherein the metal is run continuously through hot roll presses off rolls of sheet metal; or discontinuous wherein precut panels are individually processed.

Figure 21:
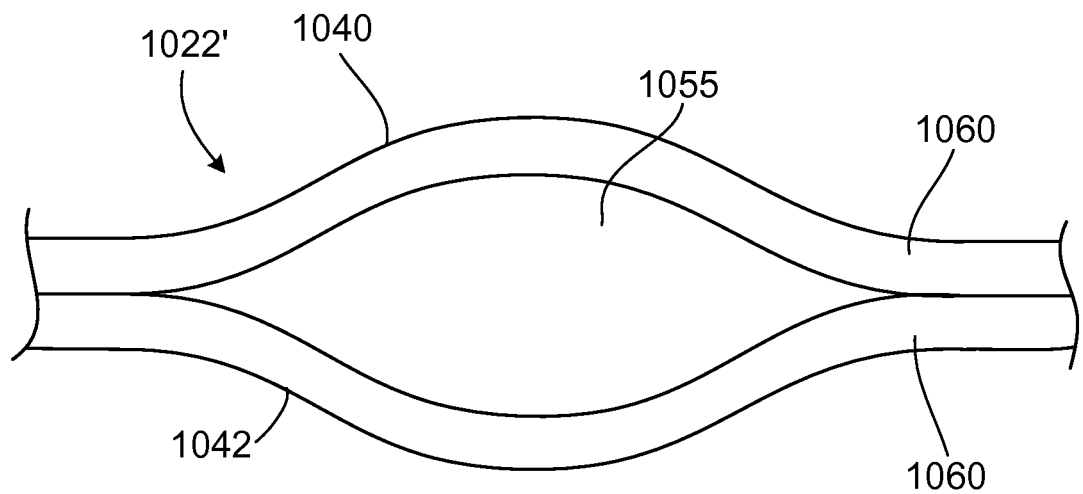
FIG. 21 illustrates a cross sectional view of an expanded portion of a two-sided plate.

Referring to FIG. 21, in some embodiments, two identical panels 1060 are roll-bonded together to form a plate 1022'. For example, each panel 1060 is approximately 1.05-1.2 mm thick, 1545 mm long, and 350 mm wide, and formed of the same material. Channels are formed between the joined metal panels having a pattern corresponding to the desired path of the working fluid flow channels by blow-molding as discussed above. The channels 1055 are formed with a width w of between 12-13.5 mm and a height h of about 2 mm. Since the panels used to form the plate 1022' are identical, both panels 1060 are deformed during expansion to form the internal channels, and the channels expand outward evenly within each panel 1060. Both sides (e.g. the front face 1040 and the rear face 1042) of the resulting plate 1051 are contoured and include outwardly protruding regions corresponding to expanded sections at the location of the working fluid flow channel 1055. The resulting plate configuration is referred to as being double-sided.

When a first plate 1051 and a second plate 1052, each having a double-sided plate configuration, are placed adjacent to each other in a stacked configuration within a heat exchange array 1000, the plates 1051, 1052 may be arranged in a nested configuration. In a nested configuration, the plates 1051, 1052 may be arranged to be slightly offset from each other so that the protruding regions of one plate 1051 reside within the spaces between protruding regions of the adjacent plate 1052. However, although the roll-bonding process provides a plate having consistent height, it has inherent issues of lengthwise dimensional repeatability. The result is that the location of each portion of the channels cannot be reliably controlled. For example, in some cases, the protruding regions of the plates are not at the design distance from the top edge 1045 of the plate 1051. During laboratory testing of heat exchangers employing plates employing double sided plates, it was found that the dimensional variation resulted in protruding regions of adjacent plates being located directly opposite each other, resulting in pinch points within the plate separation gap 1025 leading to higher pressure losses and lower heat transfer than expected.

Figure 22:
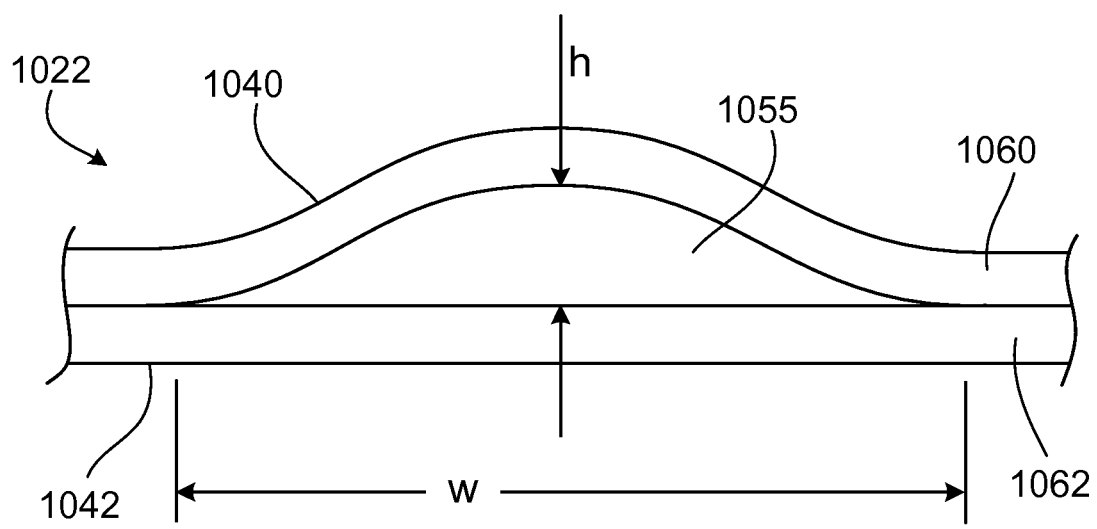
FIG. 22 illustrates a cross sectional view of an expanded portion of a one-sided plate.

Referring to FIG. 22, in some embodiments, two non-identical panels 1060, 1062 of the same peripheral shape are roll-bonded together to form a plate 1022 that addresses the dimensional variability problems described above with respect to the double-sided plate configuration. The two panels 1060, 1062 are non-identical in that they differ in yield strength. This can be accomplished, for example, by providing panels 1060, 1062 having different thicknesses or being formed of different materials. Channels are formed between the joined metal panels having a pattern corresponding to the desired path of the working fluid flow channels 1055 by blow-molding as discussed above.

The working fluid flow channels 1055 have relatively wide width w and relatively low height h in order to increase the active heat transfer area between the two fluids while reducing the volume of the entire heat exchange plate. The width w of the channels can range between about 10 and about 15 mm (e g, more than 11 mm, more than 12 mm, more than 13 mm, less than 14 mm, less than 13 mm, and/or less than 12 mm) The height h of the channels can range between about 1 and about 3 mm (e.g., more than 1.25 mm, more than 1.5 mm, more than 1.75 mm, more than 2 mm, less than 2.75 mm, less than 2.5 mm, less than 2.25 mm and/or less than 2 mm) The spacing between channels can be between about 4 and about 8 mm (e.g., more than 4.5 mm, more than 5 mm, more than 5.5 mm, less than 7.5 mm, less than 7 mm, and/or less than 6.5 mm).

The difference in the yield strengths of the panels used to form the plate are controlled so that only one of the panels 1060 is deformed during expansion to form the internal channel(s). In this case, the channels expand outward from only one side of the plate 1022, resulting in a plate 1022 in which one side (i.e., the front face 1040) includes outwardly protruding regions corresponding to the location of the working fluid flow channel 1055, and in which the other side (i.e, the rear face 1042) is un-deformed, and thus remains generally planar. The resulting plate configuration is referred to as being single-sided.

In the embodiment illustrated in FIGS. 10-14, the plates 1051, 1052 are formed having a single-sided plate configuration. When plates 1051, 1052 are placed adjacent to each other in a stacked configuration within a heat exchange array 1000, the plates 1051, 1052 are arranged so that the front face 1040 of one plate 1052, having protruding regions corresponding to expanded sections at the location of the working fluid flow channel, faces the rear face 1042 of the adjacent plate 1051 which is generally planar. In addition, the adjacent plates 1051, 1052 are arranged so that the gap 1025 exists between the front face 1040 of one plate 1052 and the rear face 1042 of the adjacent plate 1051. In an exemplary embodiment, the plates 1051, 1052 have an edge spacing of 8 mm, providing a minimum gap dimension between the plates 1051, 1052 of 2.2 mm at locations corresponding to protruding regions, and a maximum gap dimension between the plates 1051, 1052 of 4.8 mm at locations between the protruding regions.

The single-sided plate configuration mitigates the impact of lengthwise dimensional inconsistency due to the roll-bonding process. In this configuration, the spacing between adjacent plates has consistent maximum and minimum clearances regardless of where expansion occurs along the length. Laboratory results confirm that the pressure losses are significantly reduced relative to the double-sided plate configuration for equal fluid flows and nominal spacing.

In addition, when forming heat exchanger arrays of plates having the single-sided plate configuration, there is no need to nest so that the protruding regions of one plate 1051 reside within the spaces between protruding regions of the adjacent plate 1052. Instead, the single-sided plates 1051, 1052 are arranged so that the front face 1040 of one plate 1052, having protruding regions faces the generally planar rear face 1042 of the adjacent plate 1051. In addition, the protruding regions are aligned in a direction parallel to the alignment axis 1005. Although heat transfer at the planar surface is generally lower than at the surface having protruding regions, this effect is at least partially offset by turbulence in the gap 1025 between plates caused by the presence of the protruding regions in the fluid flow path, resulting in low pressure drop but enhanced velocities in the gap 1025.

In all embodiments, a wider non-working fluid flow area is provided than the working fluid flow area in working fluid flow channels 1055. This arrangement reduces the pressure drop in the heat source and heat sink fluid sides.

Figure 23:
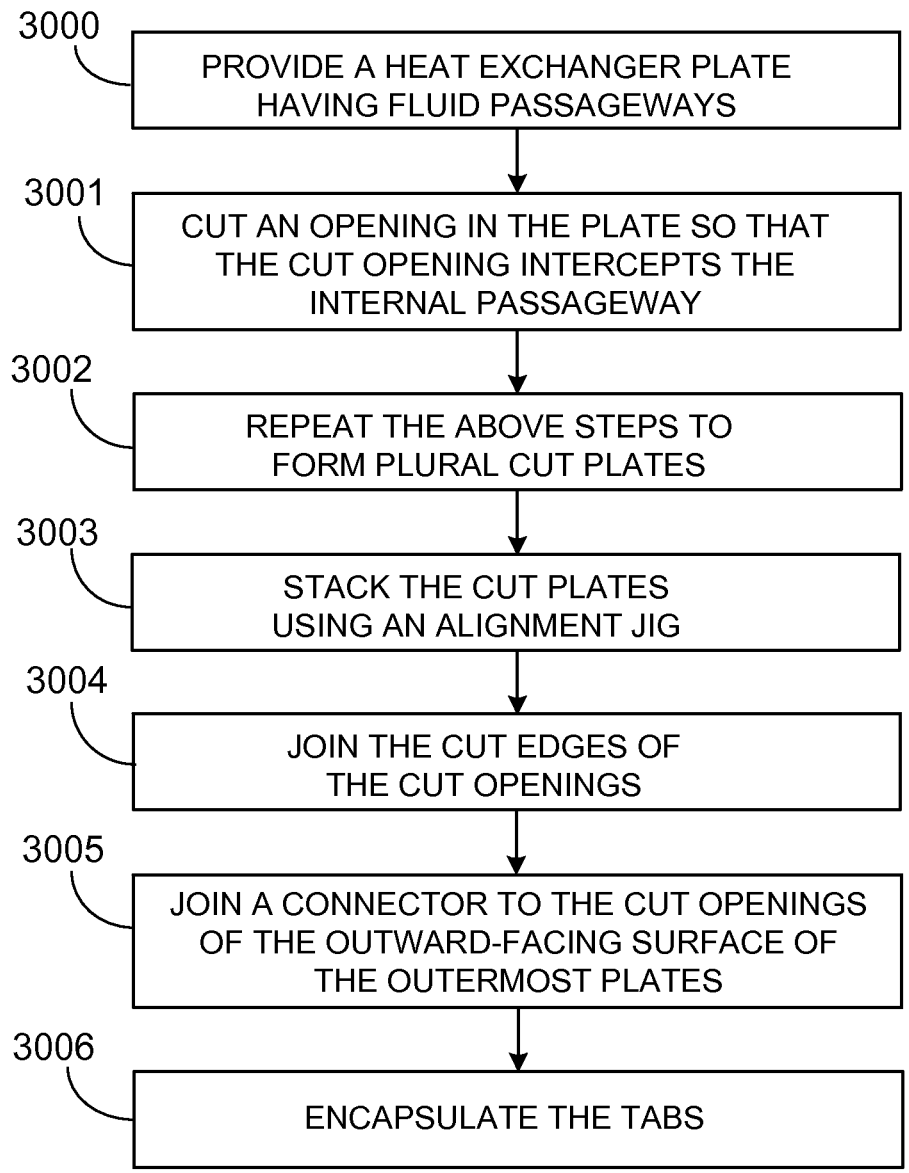
FIG. 23 is a flow chart of method steps for manufacturing a heat exchanger array including a manifold.

Referring to FIG. 23, a method of manufacturing the heat exchanger array 1000 will now be described.

At step 3000, the method includes providing a heat exchanger plate 1022 having internal fluid passageways 1055 arranged in a predetermined pattern corresponding to the desired fluid flow path of the working fluid 580. In some embodiments, the heat exchanger plate 1022 is formed by providing first panel 1060 and a second panel 1062, and applying a bonding preventing agent to a surface of the first panel 1060 in a predetermined pattern. The first panel and the second panel are then stacked so that the bonding agent resides between the first panel and the second panel. The stacked first and second panels 1060, 1062 are then roll-bonded to form a single plate 1022.

The roll-bonded plate 1022 is expanded by injecting air between the first panel 1060 and the second panel 1062 so as to form an expanded plate 1022 having the internal passageway 1055. In order to control the expansion amount (e.g., height h) of the internal passageway 1055, and to permit different expansion amounts in different regions of the plate 1022, the plate 1022 is placed in an expansion jig (not shown) during passageway expansion. The expansion jig includes a pair of rigid plates arranged in parallel, the rigid plates having zones of differing spacing therebetween. The plate 1022 is placed in the jig so as to be sandwiched between the rigid plates while air is injected. The rigid plates limit the amount of passageway expansion during air injection according the zone arrangement. For example, in some embodiments, a first zone corresponding to the location of the tab 1070 has a first height h1 that is greater than a second height h2 of a second zone corresponding to the location of the mini-channels 1912.

Figure 24:
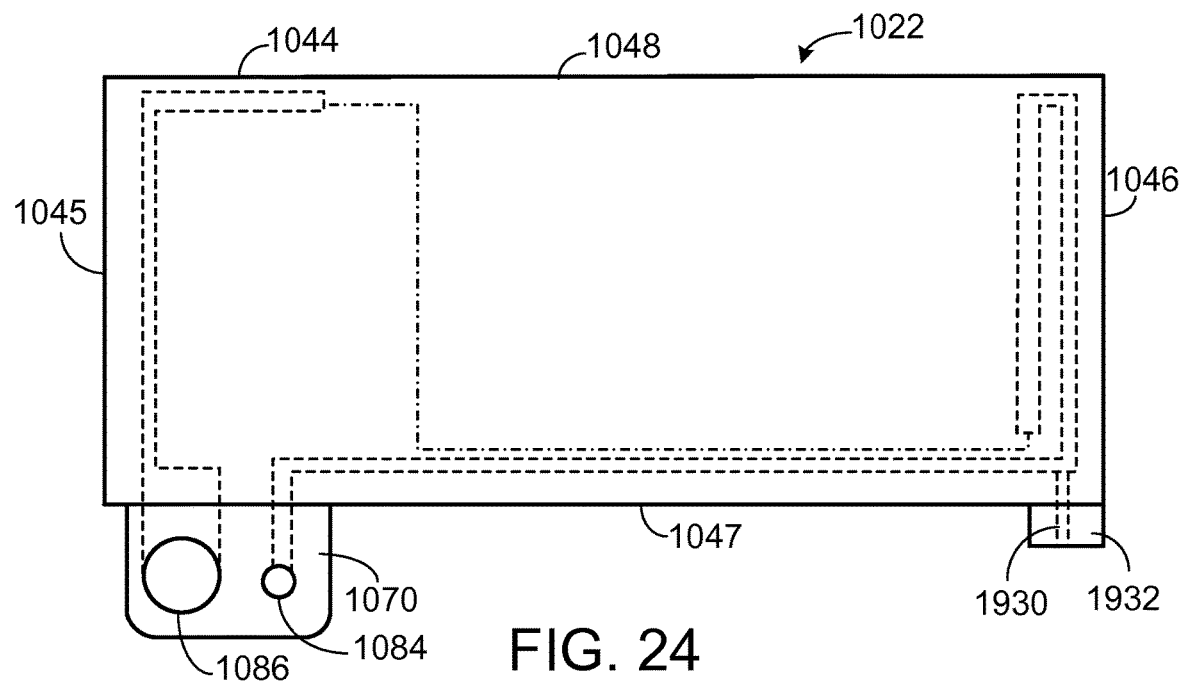
FIG. 24 illustrates a schematic plan view of a plate including an air injection inlet.
Figure 25:
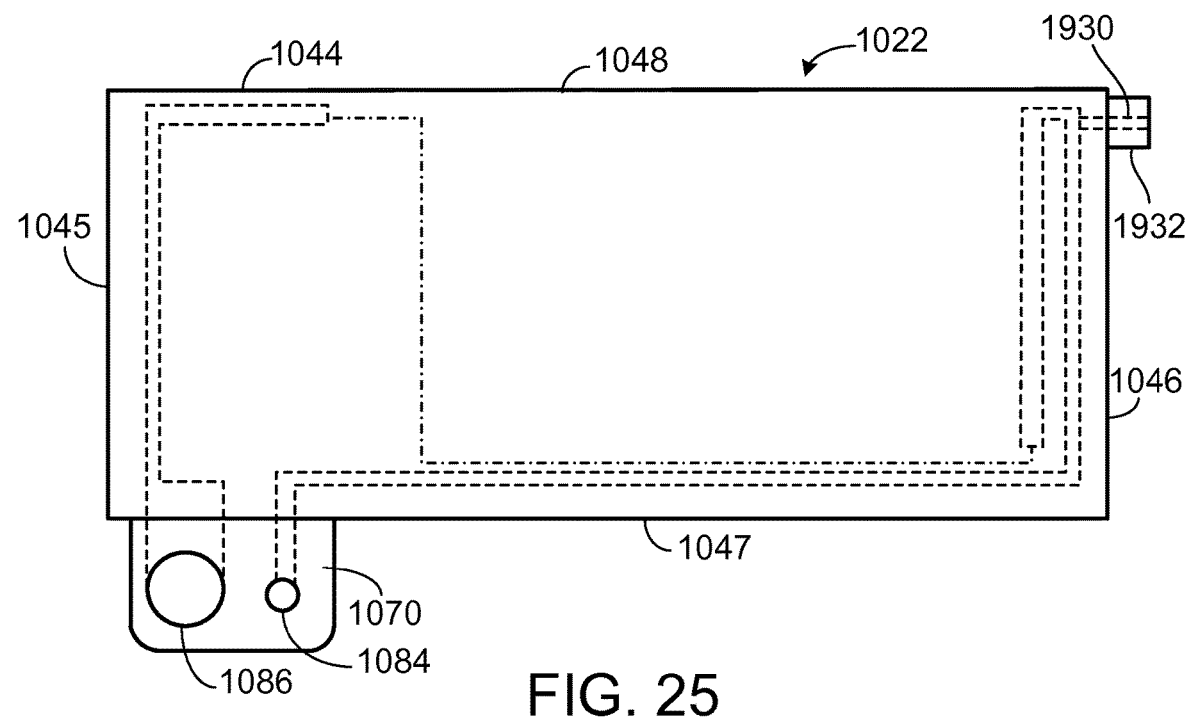
FIG. 25 illustrates a schematic plan view of another plate including an air injection inlet.

Referring to FIG. 24, in some embodiments, an air injection inlet 1930 is provided in the plate 1022 to facilitate air injection. The air injection inlet 1930 is formed in an air injection tab 1932 that is located at a peripheral edge 1044 of the plate 1022. In the illustrated embodiment, the air injection tab 1932 and air injection inlet 1930 are located at a side edge 1048 of the plate 1022. This position is advantageous since it is outside of the flow path of the non-working fluid 570, and thus does not negatively affect fluid through-flow pressures. However, the air injection tab 1032 and air injection inlet 1030 can be provided at other locations on the peripheral edge 1044, including the top end 1045 or bottom end 1046 (shown in FIG. 25).

After the plate 1022 has been expanded, the air injection inlet 1930 is closed, for example by pinching the air injection tab 1932, and then fused, for example by welding. This procedure is performed for all plates 1022 used to form a stack (discussed below), except for the outermost plates of the stack. In the two outermost plates of the stack, the air injection inlet remains open, permitting venting of gases that build up in the plates during subsequent manufacturing steps such as brazing; however, the air injection inlets are subsequently closed and fused. In some embodiments, the air injection tab 1032 is also used as a connection location for connecting the heat exchanger array 1000 to mounting structures within the heat exchanger module 524.

In embodiments in which a single-sided plate configuration is employed, the method further includes providing a first panel 1060 having a lower yield strength than the second panel 1062. Then, during the step of injecting air into the plate, the first panel 1060 is deformed by a pressure of injected air and the second panel 1062 remains un-deformed by the pressure of injected air.

Figure 26:
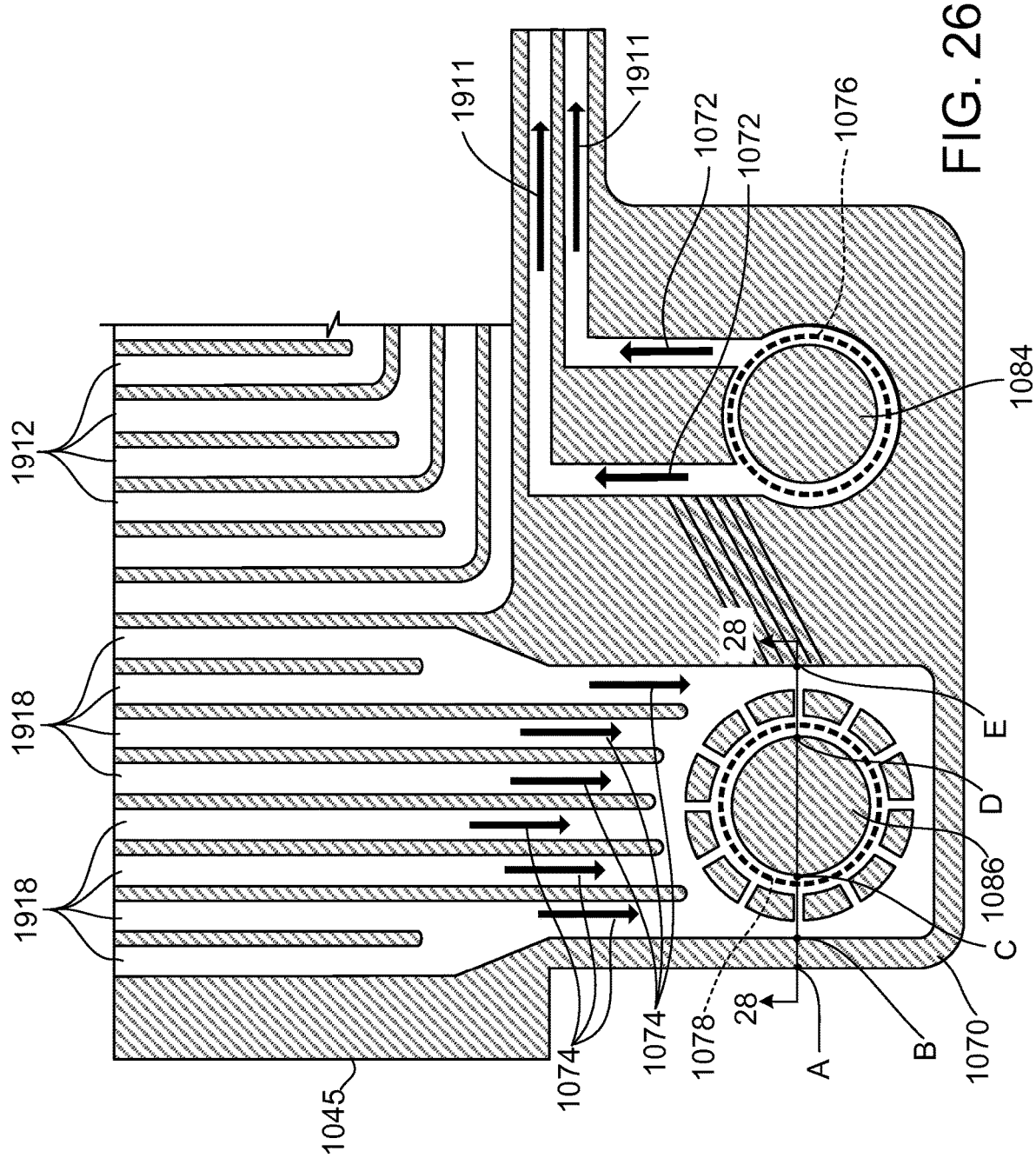
FIG. 26 illustrates a plan view of a portion of a plate including the tab.

At step 3001, referring to FIG. 26, openings are cut in the expanded plate 1022 that intercept the internal passageway 1055. More specifically, a tab inlet opening 1076 is formed in the tab 1070 at a location that intercepts all tab inlet passageways 1072. In addition, a tab outlet opening 1078 is formed in the tab 1070 at a location that intercepts all tab outlet passageways 1074. As seen in FIG. 26, the bonding preventing agent is applied in a pattern (see cross hatched areas) that permits adequate stiffening to permit accurate plate cutting. For example, the circular area corresponding to an interior space of the outlet and inlet openings is not expanded, but instead includes bonded portions. In some embodiments, cutting is achieved, for example, using a high speed hole saw having a pilot drill bit that helps to maintain plate alignment during cutting, or using other cutting processes such as milling or water jet.

In some embodiments employing a single-sided plate configuration in which the first panel 1060 expands relative to the second panel 1062, the cut opening is made larger within the first panel 1060 (e.g. on the expanded side of the plate 1022) than within the second panel 1062 (e.g., on the non-expanded side of the plate 1022).

At step 3002, the steps of providing a heat exchanger plate 1022 having internal fluid passageways 1055 and cutting openings in the plate 1022 are repeated for each plate 1022 of the heat exchanger array 1000 until the desired number of cut plates 1022 is obtained.

At step 3003, the cut plates 1022 are stacked for use in forming a heat exchanger array 1000. In the illustrated embodiment, 48 plates 1022 are stacked so as to be arranged one on top of another with front faces 1040 facing in the same direction and normal to the alignment axis 1005. In particular, the plates 1022 are arranged in an alignment jig to provide a plate stack 2030 having aligned peripheral edges 1044 and cut openings 1076, 1078. It is understood that greater or fewer numbers of plates 1022 can be stacked, and that the number of plates in the stack 2030 is determined by the specific application.

Figure 27:
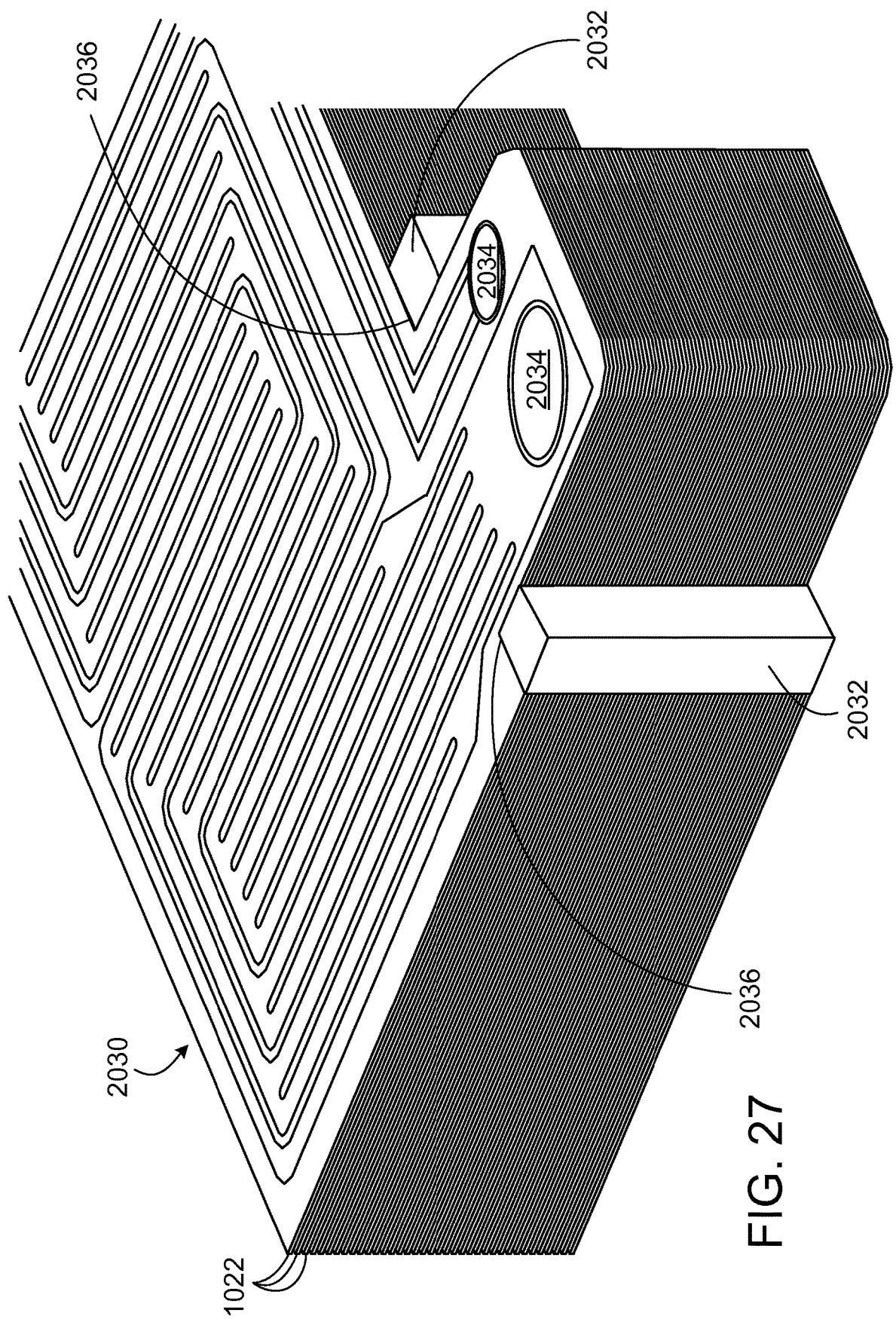
FIG. 27 illustrates a plate stack and alignment jigs used to align the plates within the stack.

Referring to FIG. 27, precise alignment of the plates 1022 can be accomplished by stacking the cut plates within the alignment jig that includes one or more alignment fixtures. In the illustrated embodiment, alignment fixtures include rectangular rods 2032 and cylindrical mandrels 2034 that are strategically placed within the jig. When plates 1022 are placed in the jig, the cut openings 1076, 1078 are placed over the mandrels 2034, and the peripheral edge 1044 is positioned so that the rods 2032 abut interior corners 2036 provided in the peripheral edge 1044 of each plate 1022.

In embodiments in which the stacked plates employ a single-sided plate configuration, the stacking step further comprises arranging the plates 1022 such that the first exterior heat exchanging surface of one plate (i.e., the front face 1040) faces the second exterior heat exchanging surface (i.e., the back face 1042) of an adjacent plate. To assure that uniform spacing is provided between adjacent plates, grooved backing plates 1006, 1008 are provided at the front and back sides of the stack, as discussed above.

When the cut plates 1022 are stacked and aligned, the mandrels 2034 are removed from the alignment jig to permit formation of the manifold supply and discharge chamber 1084, 1086 within the corresponding opening, as discussed in step 3004. The rods 2032 remain in place to maintain the stack 2030 in alignment during subsequent steps. In addition, the alignment jig remains with the stack assembly to form a cocoon-like encasement for the array 1000, to protect the array 1000 from damage and, in cooperation with the backing panels 1006, 1008 serve to channel the flow of the non-working fluid into the gaps 1025 between plates 1022 and over the active heat transfer surface area.

Figure 28:
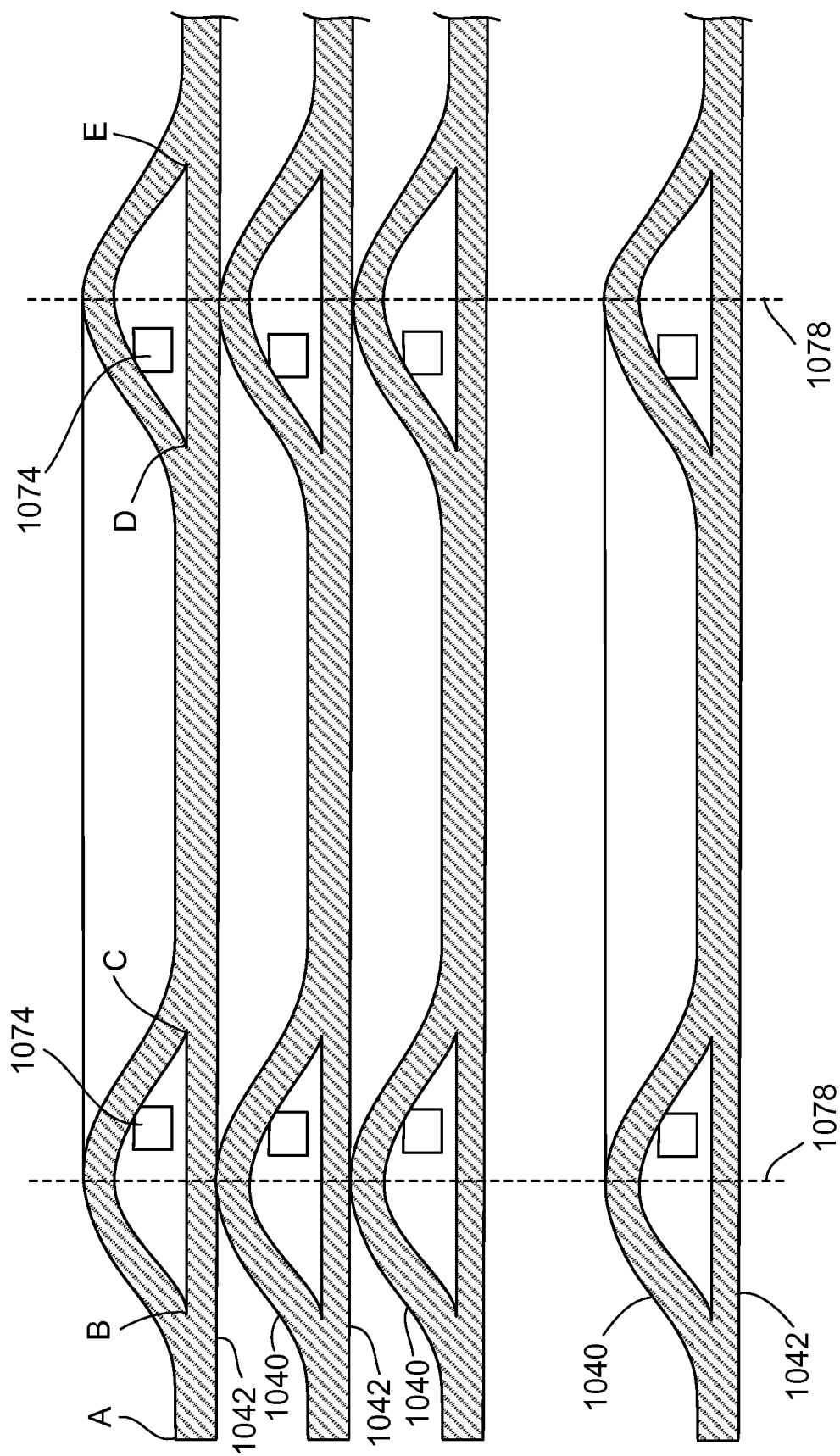
FIG. 28 illustrates a cross sectional view along lines 28-28 of FIG. 26.
Figure 29:
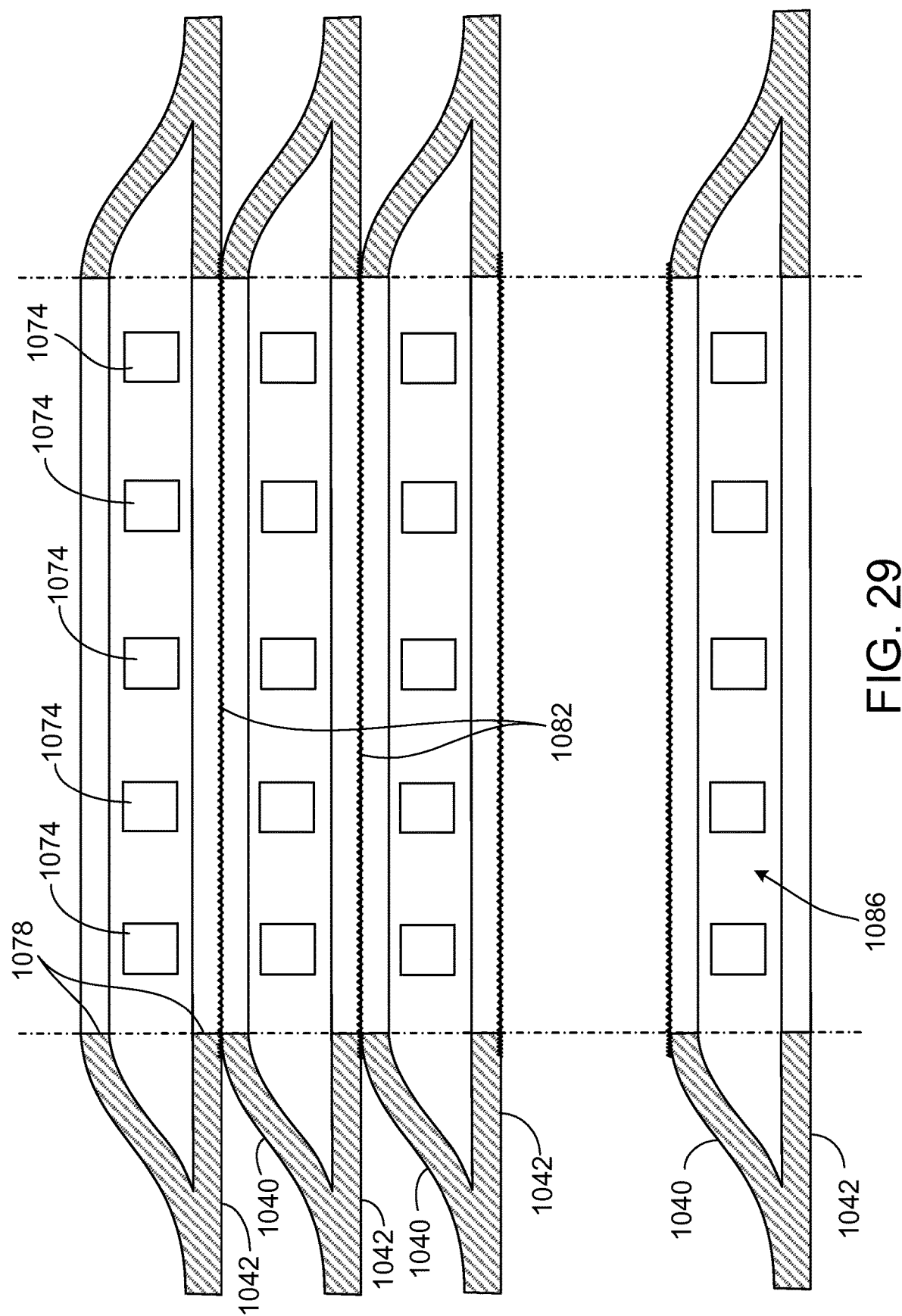
FIG. 29 illustrates the cross sectional view of FIG. 28 after cutting and plate joining to form a manifold chamber.

Referring to FIG. 29, at step 3004, the cut edges of the cut openings 1076, 1078 of a first plate 1051 are joined to the corresponding cut edges of an adjacent plate 1052. When the plates are aligned in step 3003, the expanded regions corresponding to the tab inlet passageways 1072 and tab outlet passageways 1074 are also aligned in a direction parallel to the alignment axis 1005. In addition, referring to FIGS. 26 and 28-29, during expansion of the plate, at least one panel 1060 that forms the plate is deformed so that the respective panels 1060, 1062 are locally spaced apart to provide the working fluid passage 1055. As a result, the back face 1042 of a first plate 1051 abuts, or nearly abuts, the front face 1040 of a second plate 1052 that is adjacent to and below the first plate 1051. For each plate 1022 in the stack 2030, the front face 1040 is joined to the back face 1042 of the plate above it along the entire circumference of each of the inlet cut opening 1076 and the outlet cut opening 1078. In addition, the back face of each plate in the stack 2030 is joined to the front face 1040 of the plate below it along the entire circumference of each of the inlet cut opening 1076 and the outlet cut opening 1078. The respective faces 1040, 1042 are joined continuously to form annular, fluid impermeable joints 1082, for example by tungsten inert gas (TIG) welding, autogenous TIG welding, sputter TIG welding or laser welding. In FIG. 29, welds are represented by zig-zagged lines.

This procedure results in a manifold supply chamber 1084 within the stack 2030 defined in part by the series of annular joints 1082 formed at the connection of each adjacent plate along the inlet cut openings 1076, and a manifold discharge chamber 1086 (shown in FIG. 29) defined in part by the annular joints 1082 corresponding to the connection of each adjacent plate along the outlet cut openings 1078. Within each plate of the stack 2030, the expanded region at each of the cut openings is in fluid communication with the channels 1912 of the working fluid passageway 1055, as discussed above. For example, the manifold supply chamber 1084 is in fluid communication with the inlet passageways 1911 via the tab inlet passageways 1072. In addition, the manifold discharge chamber 1086 is in fluid communication with the outlet passageways 1918 via the tab outlet passageways 1074. Due to the sealed nature of the annular joints 1082, fluid communication is prevented between the internal passageways 1055 and exterior surfaces of the plates 1022, and thus also between the working fluid 570 and the non-working fluid 570.

Figure 29A:
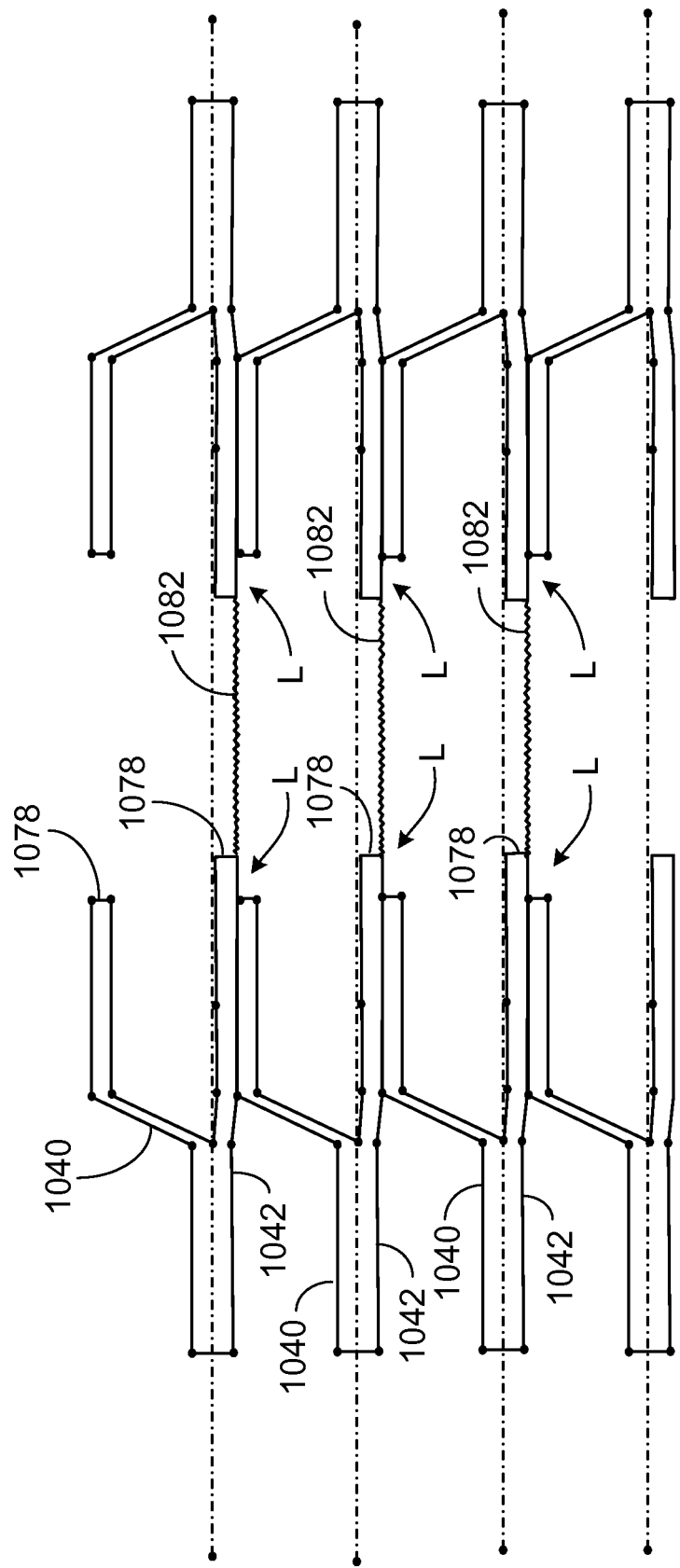
FIG. 29A is a partial cross-sectional view of a manifold supply chamber including lap joints.

Referring to FIG. 29A, in embodiments in which the cut opening is made larger within the first panel 1060 (e.g. on the front face 1040) than within the second panel 1062 (e.g., on the back face 1042), when the plates are stacked, lap joints L are formed. For each plate 1022 in the stack 2030, the front face 1040 is joined to the back face 1042 of the plate above it at the lap joint L (e.g., along the entire circumference of each of the inlet cut opening 1076 and the outlet cut opening 1078). In addition, the back face 1042 of each plate in the stack 2030 is joined to the front face 1040 of the plate below it at the lap joint L (e.g., along the entire circumference of each of the inlet cut opening 1076 and the outlet cut opening 1078). The respective faces 1040, 1042 are joined continuously, for example by welding, to form the annular, fluid impermeable joint 1082.

As previously discussed, the amount of expansion of the tab passageways 1072, 1074 in the tab 1070, in at least the vicinity of the cut openings 1076, 1078, is made higher (for example, have a greater channel height h) than that of the working fluid passageways 1055 within the plate 1022. By this arrangement, spacing between the adjacent plates 1022 (i.e., plates 1051, 1052) is maintained while permitting the annular joints to be formed.

At step 3005, referring again to FIG. 16, a flange connector 2000 is welded to the tab inlet opening 1076 and tab outlet opening 1078 formed on the outward facing surfaces of the outermost plates 1022 used to form the stack 2030.

For the uppermost plate 1022u, a flange connector 2000 is fixed to the front face 1040 at both the inlet cut opening 1076 and the outlet cut opening 1078. For example, a flange connector 2000 is placed in each opening 1076, 1078 and welded to the cut edge along the entire circumference of each respective opening 1076, 1078 so as to provide a fluid-impermeable connection. In addition, the back face 1042 of the uppermost plate 1022u is joined to the front face 1040 of the plate below it along the entire circumference of each of the inlet cut opening 1076 and the outlet cut opening 1078. The respective faces 1040, 1042 are joined continuously to form an annular, fluid impermeable joint 1082.

The lowermost plate 1022l is similarly treated. That is, for the lowermost plate 1022l, a flange connector 2000 is fixed to the rear face 1042 at both the inlet cut opening 1076 and the outlet cut opening 1078. For example, a flange connector 2000 is placed in each opening 1076, 1078 and welded to the cut edge along the entire circumference of each respective opening 1076, 1078 so as to provide a fluid-impermeable connection. In addition, the front face 1040 of the lowermost plate 1022l is joined to the back face 1042 of the plate above it along the entire circumference of each of the inlet cut opening 1076 and the outlet cut opening 1078. The respective faces 1040, 1042 are joined continuously to form an annular, fluid impermeable joint 1082.

At step 3006, formation of the manifold 1080 is completed by encapsulating the joined tabs 1070 of the heat exchanger array 1000 in a plastic material such as epoxy to form the manifold housing 1088 that encloses all the tabs 1070 of the plates 1020 within the heat exchanger array 1000. The manifold housing 1088 is defined by the outer surfaces of the epoxy.

Encapsulation is achieved by placing the joined tabs of the stack 2030 within a pot 2050, filling the pot 2050 with an epoxy so that the epoxy fills the space between an interior of the pot 2050 and the outside surface of the joined tabs 1070, permitting the epoxy to set, and then leaving the pot 2050 to remain as part of the assembly.

Figure 30:
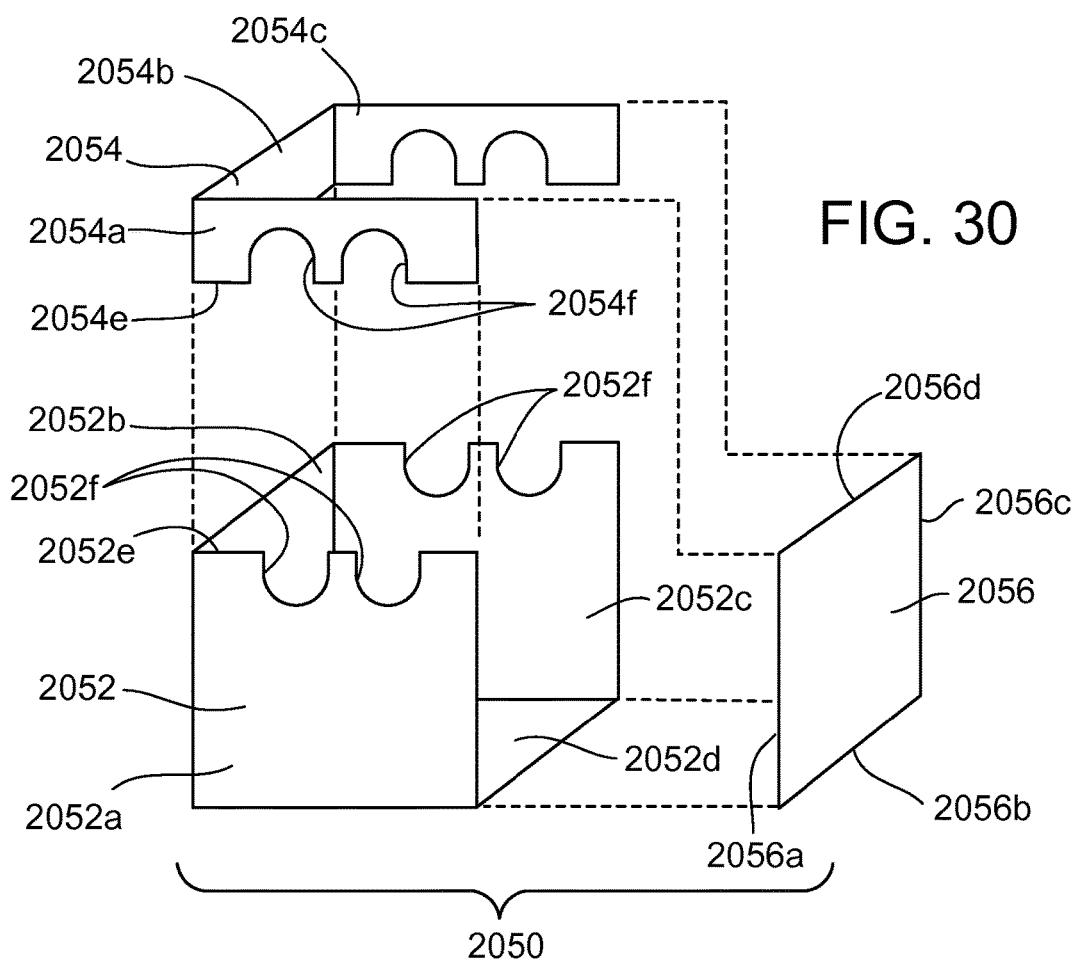
FIG. 30 illustrates an exploded view of a pot.

Referring to FIG. 30, due to the complex shape of the tabs 1070, which extend from the side edge 1048 of each plate and include flange connectors 2000 extending outward from the outer surfaces thereof, the pot 2050 is formed as a multi-piece structure that can be assembled over the tabs 1070 and around the flange connectors 2000. In particular, the pot 2050 is formed of a plastic such as polycarbonate and has a first sidewall portion 2052, a second sidewall portion 2054 and a third sidewall portion 2056 that can be assembled together to form a container.

The first sidewall portion 2052 includes three sides 2052a, 2052b, 2052c and a bottom 2052d. The three sides 2052a, 2052b, 2052c adjoin each other, and also adjoin and extend upward from the bottom 2052d. An upper edge 2052e of the first sidewall portion 2052 includes semi-circular cut out portions 2052f that are dimensioned to receive a sidewall 2006 of the flange connector 2000 therein. The second sidewall portion 2054 includes three sides 2054a, 2054b, 2054c. The three sides 2054a, 2054b, 2054c adjoin each other. In addition, a lower edge 2054e of the second sidewall portion 2054 includes semi-circular cut out portions 2052f that are dimensioned to receive a sidewall 2006 of the flange connector 2000 therein. The third sidewall portion 2056 includes a single side in the form of a flat panel having a first edge 2056a, a second edge 2056b, a third edge 2056c and a fourth edge 2056d.

During assembly of the pot 2050, the heat exchanger unit 1000 is positioned over the first sidewall portion in such a way that the joined tabs 1070 extend into the space defined by the three sides 2052a, 2052b, 2052c and the bottom 2052d, and the flanges 2000 are disposed within the cutout portion 2052f. The second sidewall portion 2054 is then placed along the first sidewall portion upper edge 2052e in such a way that the first sidewall portion first side 2052a adjoins the second sidewall portion first side 2054a, the first sidewall portion second side 2052b adjoins the second sidewall portion second side 2054b, the first sidewall portion third side 2052c adjoins the second sidewall portion third side 2054b, and the flanges 2000 are received in the second sidewall portion cut out portion 2052f. Finally, the third sidewall portion 2056 is placed adjoining the first and second sidewall portions 2052, 2054 such that the third sidewall portion first edge 2056a adjoins the first sides 2052a, 2054a of the first and second sidewall portions 2052, 2054, the third sidewall second edge 2056b adjoins the bottom 2052d of the first sidewall portion 2052, and the third sidewall third edge 2056c adjoins the third sides 2052c, 2054c of the first and second sidewall portions 2052, 2054. When the pot 2052 is thus assembled, the joined tabs 1070 are enclosed by the sidewall portions 2052, 2054, 2056.

Figure 31:
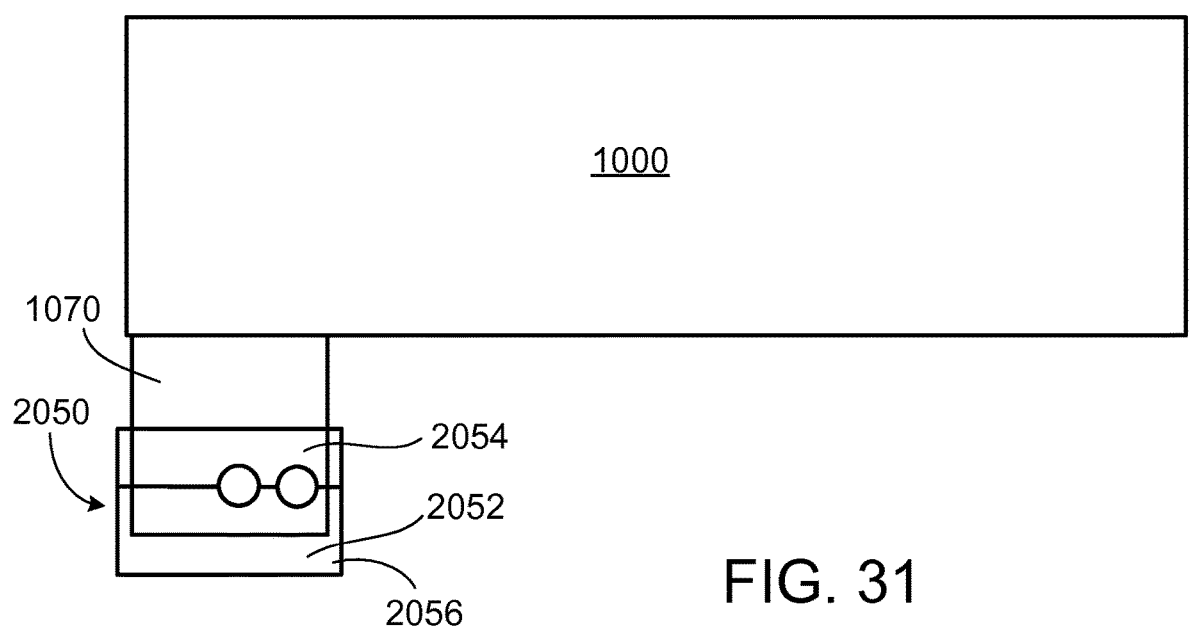
FIG. 31 illustrates a schematic side view of the heat exchanger stack arranged with the tab portion within the pot.

Referring to FIG. 31, in the assembled configuration, the pot 2050 includes an open upper end, and is sized to enclose the joined tabs 1070 while minimizing the amount of injected epoxy filler required. The pot 2050 is filled from the bottom with epoxy to set and hold the plate spacing, seal all joints from seawater, and reinforce the heat exchanger array 1000. In addition, the epoxy provides supplemental welded joint support and assembly stiffening, a supplemental barrier to internal fluid leakage from the welded joint should that occur, and a solid mounting support surface for the array of joined plates. During encapsulation, the fluid passageways of each of the flange connectors 2000 are closed to avoid contamination of the manifold chambers 1084, 1086 with the encapsulation material. Upon completion of encapsulation, these fluid passageways are cleared to permit proper functioning of the respective flange connectors 2000, particularly to permit fluid flow therethrough. Once the flange connectors 2000 are cleared, the heat exchanger unit 1000 is complete.

Figure 32:
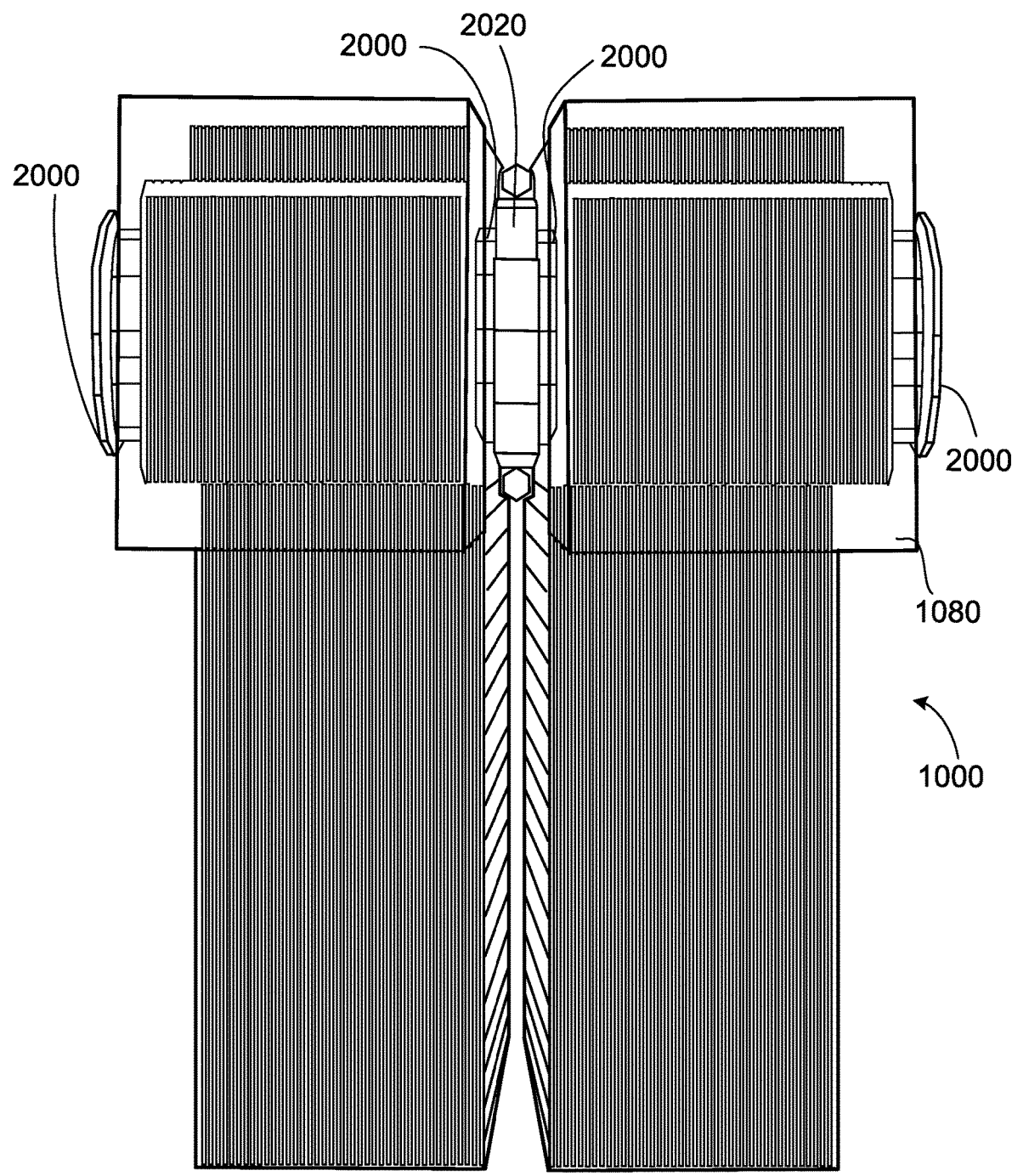
FIG. 32 illustrates a side view of two heat exchanger arrays in which the flange connectors of the manifolds are connected using a clamp.

Referring to FIGS. 11 and 32, when forming a heat exchanger module 524 that includes several heat exchanger arrays 1000, the manifold 1080 of each individual heat exchanger array 1000 is joined to the manifold 1080 of the adjacent heat exchanger arrays 1000. In particular, respective flange connectors 2000 of the manifold supply chamber 1084 of adjacent heat exchanger arrays 1000 are joined so that the manifold supply chamber 1084 is in fluid communication with each heat exchanger array 1000 of the module 524. Likewise, respective flange connectors 2000 of the manifold discharge chamber 1086 of adjacent heat exchanger arrays 1000 are joined so that the manifold discharge chamber 1086 is in fluid communication with each heat exchanger array 1000 of the module 524. The flange connectors 2000 of adjacent heat exchanger arrays 1000 are joined using the clamp 2020. In the illustrated embodiment, twelve heat exchanger arrays 1000 are connected using a common manifold and provide the heat exchanger module 524. It is understood, however, that a greater or fewer number of heat exchange arrays 1000 can be used to form the module 524, and the number employed depends on the requirements of the specific application.

Figure 33:
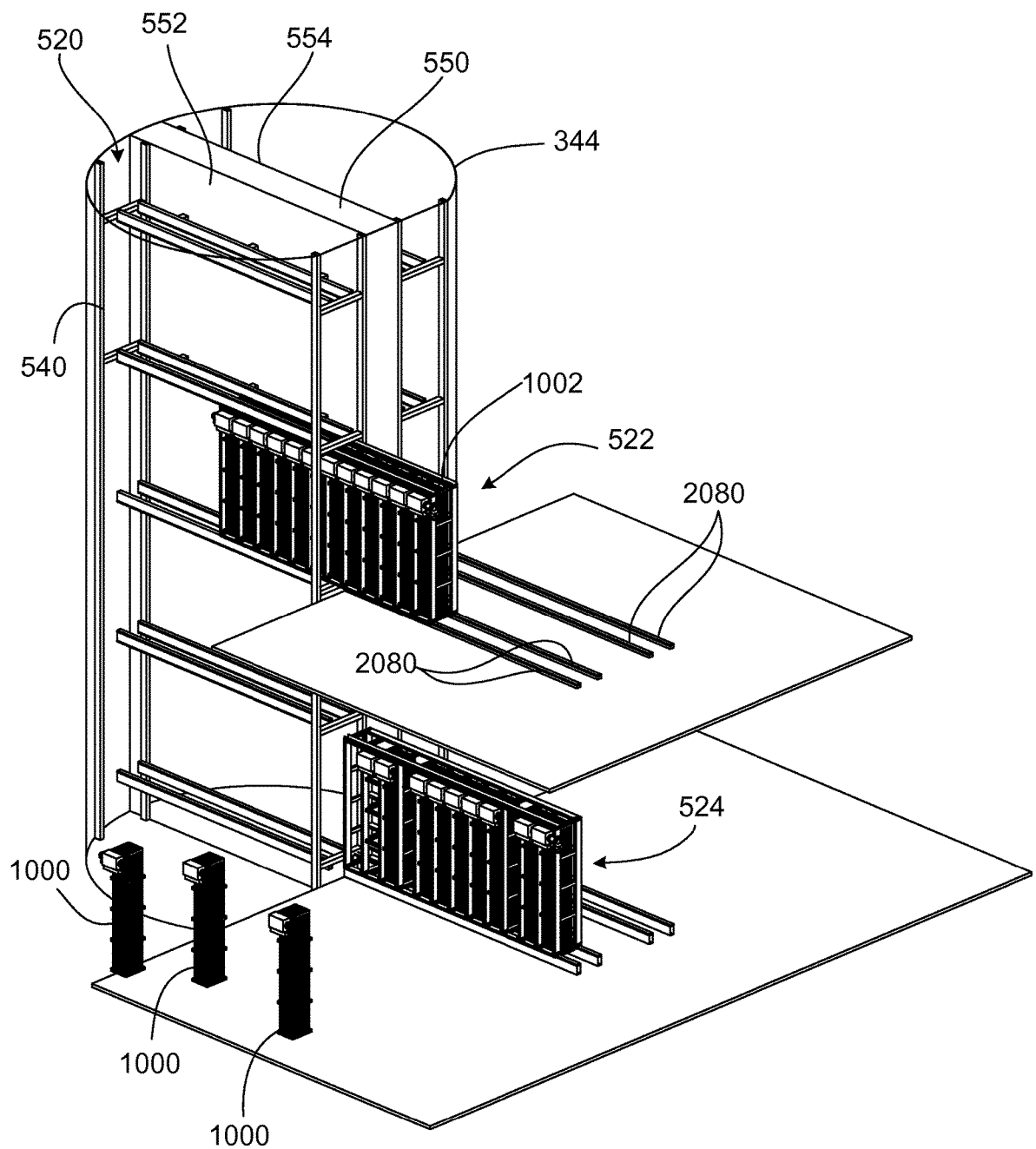
FIG. 33 illustrates a cut away perspective view of a partially assembled evaporator unit.

Referring to FIGS. 10 and 33, the heat exchanger arrays 1000, connected by a common manifold 1080, are supported on a rack 1002. The heat exchanger arrays 1000, the connected manifolds 1080, and the rack 1002 together form a heat exchanger stage. In the illustrated embodiment, the multi-stage heat exchanger system 520 is a four-stage module heat exchanger that allows for the use of a hybrid cascade OTEC cycle, and thus includes four heat exchanger modules 521, 522, 523, 524 (only the second and fourth stage are shown in FIG. 33). Each module is received within and supported on the support frame 540 when assembled into the heat exchanger system 520. In some embodiments, the rack 1002 of each heat exchanger module is provided with rails (not shown) that engage with corresponding rails 2080 included in the support frame 540 to facilitate assembly of the heat exchanger modules 521, 522, 523, 524 within the heat exchanger system 520. For example, mounted on rails with continuous plastic contact surfaces, the rack 1002 enables linear extraction for removal and maintenance of individual arrays 1000. In addition, during array maintenance, a temporary header connector can replace an array 1000 in a module 524 until the array 1000 is replaced, enabling continued operation of the balance of the heat exchanger with only partial reduction in energy transfer.

In the illustrated embodiment, the evaporator portion 344 of the spar 310 includes a central pillar 550, and a support frame 540 supported on each of the opposed sides 552, 554 of the pillar 550. A similar arrangement is provided within the condenser portion 320.

Figure 34:
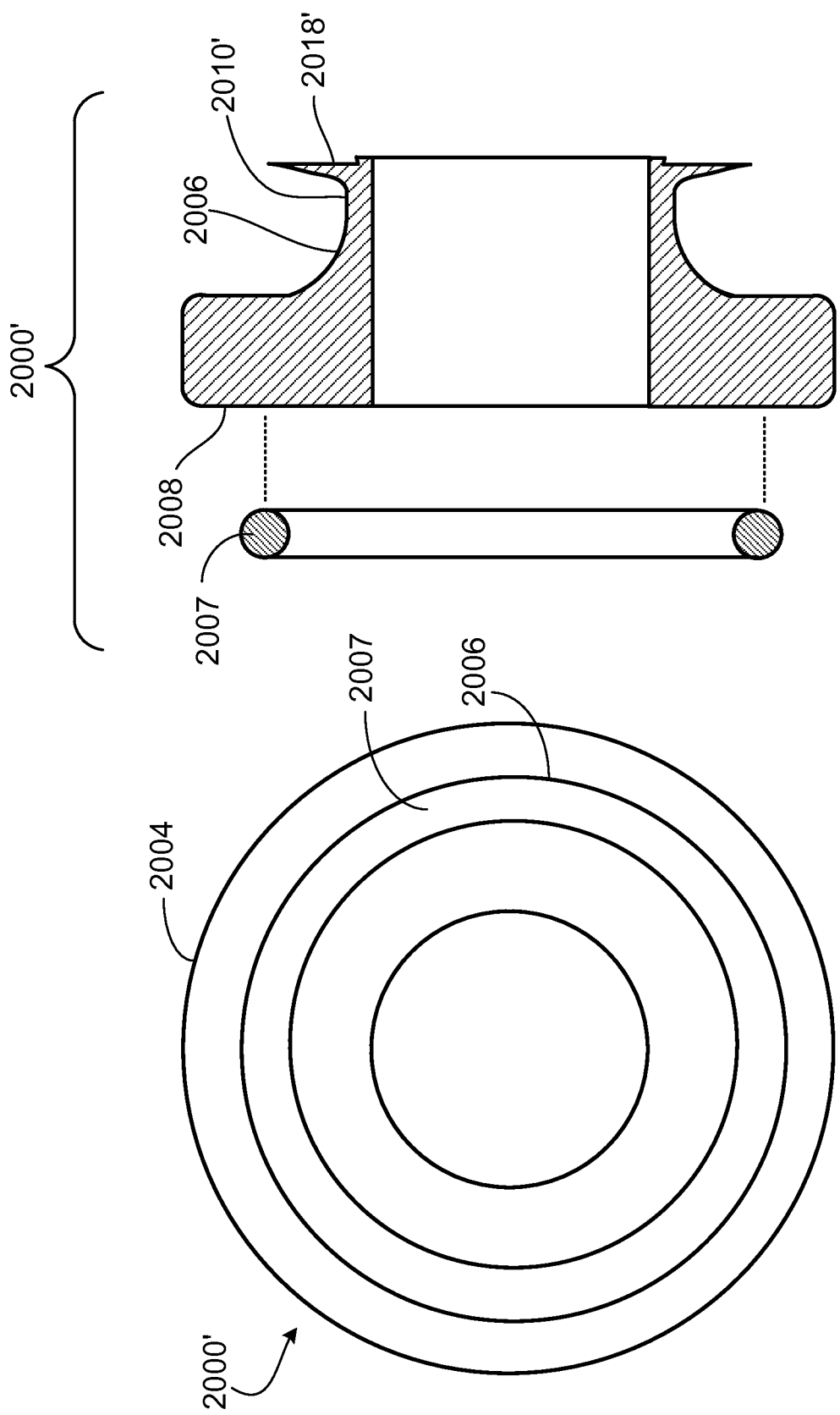
FIG. 34A illustrates an end view of another flange connector.
FIG. 34B illustrates an exploded side view of the flange connector of FIG. 34A.

The flange connector 2000 is described herein as being welded to the manifold 1080, and includes the stepped portion 2014 that resides within the manifold chamber, providing alignment and improving the strength of the welded joint. However, the flange connector 2000 is not limited to being secured to the manifold 1080 by welding. For example, the flange connector 2000 can be secured to the manifold 1080 by adhesive bonding. Referring to FIGS. 34A and 34B, in some embodiments using adhesive bonding, the connector second end 2010 can be modified so that the bonding surface has a larger area. In particular, a modified flange connector 2000' may include a connector second end 2010' having a lip 2018' that protrudes radially outward and provides a large bonding surface area.

Figure 35:
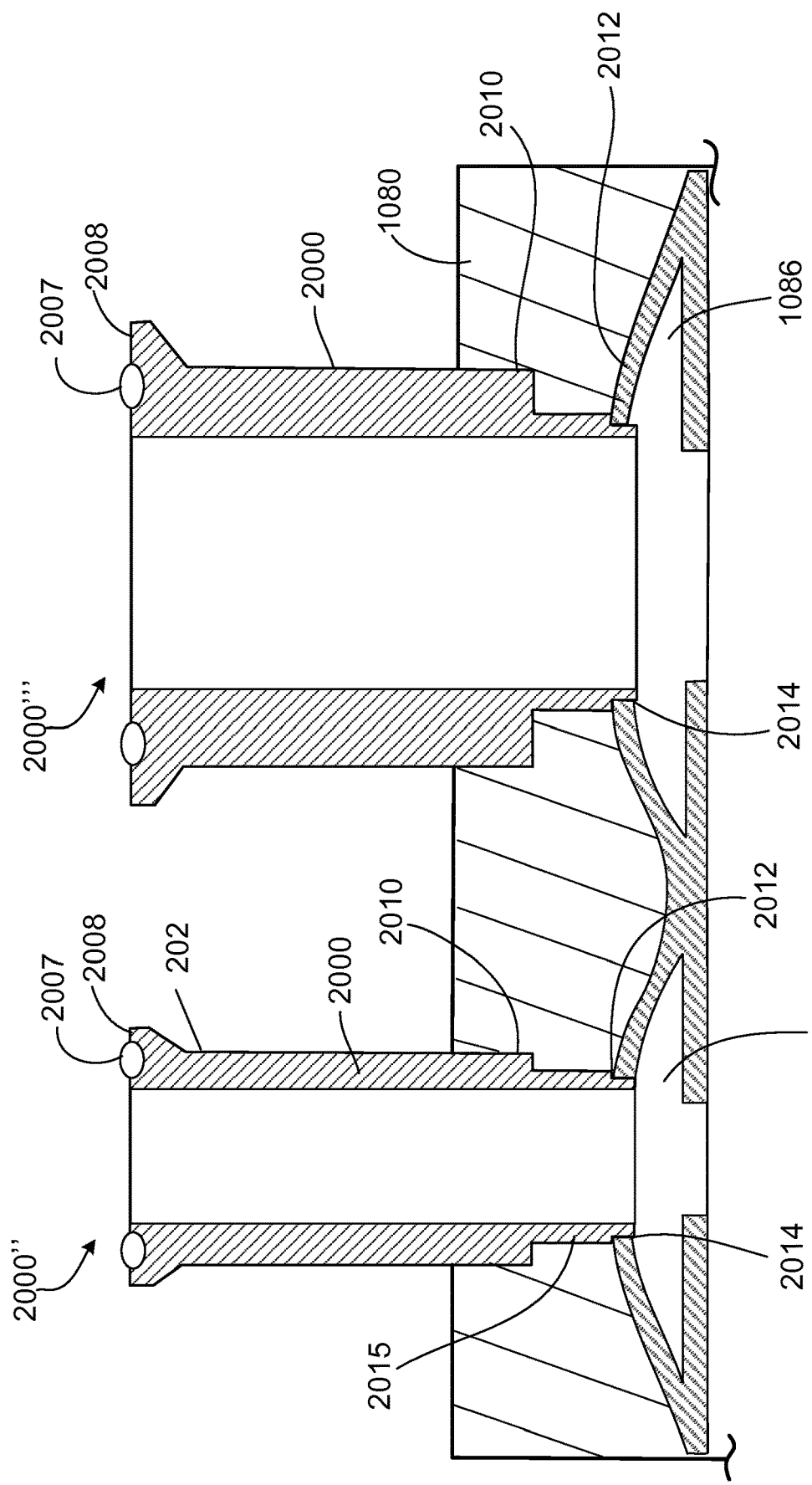
FIG. 35 is a cross-sectional view of a condenser manifold illustrating other flange connectors.

Referring to FIG. 35, an inlet flange connector 2000" is connected to a manifold supply chamber 1084 of a condenser, and an outlet flange connector 2000' is connected to the corresponding manifold discharge chamber 1086. The inlet flange connector 2000" has a smaller diameter than the outlet flange connector 2000''', but is otherwise similar. For this reason, only the inlet flange connector 2000" will be described. The inlet flange connector 2000", like the earlier-described flange connector 2000 illustrated in FIG. 15B, includes the first stepped portion 2014 that has an outer diameter dimensioned to correspond to the inner diameter of the corresponding manifold supply or discharge chamber 1084, 1086. In addition, the inlet flange connector 2000" includes a second stepped portion 2015 disposed adjacent to the end face 2012 of the connector second end 2010 such that the end face 2012 defines the step between the first stepped portion 2014 and the second stepped portion 2015. The second stepped portion 2015 has an outer diameter that is less than that of the connector first end 2002, and greater than that of the first stepped portion 2014. During manufacture of the array, the first stepped portion 2014 is inserted into and welded to a tab inlet (or outlet) opening. During this procedure, the second stepped portion 2015 serves to balance the heat sink between the tab 1070 of the heat exchange plate 1022 and the inlet flange connector 2000".

Figure 38:
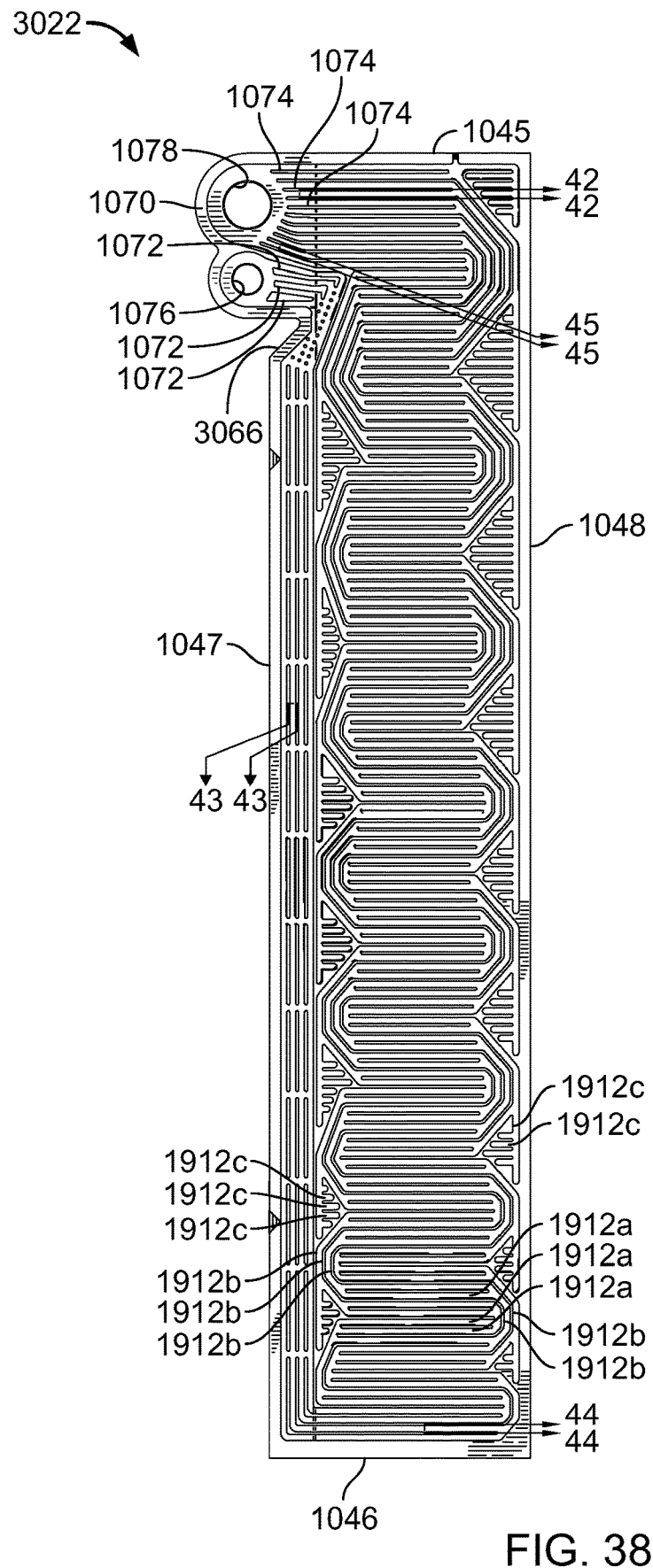
FIG. 38 is a top view of the heat exchange plate of FIG. 36.

Referring to FIGS. 36-38, an alternative heat exchange plate 3022 that is configured for use in an evaporator is similar to the heat exchange plate 1022 described above with respect to FIG. 14. In view of the similarity, like features will be referred to with like references numbers. The heat exchange plate 3022 includes a working flow passageway 3055, including several parallel mini-channels 1912 having an alternating serpentine pattern. In order to accommodate phase changes in the working fluid, (e.g., change from liquid to vapor), the number of parallel flow passages per pass is increased along the flow path of the working fluid from the passage inlet to the passage outlet. For example, the heat exchange plate 3022 in FIG. 36 has four inlet passageways 1911 which each feed into corresponding mini-channels 1912 adjacent the bottom edge 1046. The mini-channels 1912 extend along the plate in a serpentine fashion from the bottom edge 1046 to the top edge 1045. Here, reference to "top" or "bottom" refers to the orientation of the heat exchange plate in the normal operating position. In FIG. 38, the evaporator heat exchange plate 3022 is illustrated in its operating position with top edge 1045 overlying the bottom edge 1046. The flow from four mini-channels feeds into six mini-channels at a first transition point 3914. The flow from six mini-channels feeds into eight mini-channels at a second transition point 3916. The flow from the eight mini-channels feeds into ten mini-channels at a third transition point 3920, and from ten mini-channels to twelve mini-channels at a fourth transition point 3922. The resulting twelve mini-channels discharge through fluid outlets 1918.

The four inlet passageways 1911 are supplied with the working fluid 580 in a liquid state by the manifold supply chamber 1084 via tab inlet passageways 1072, and the twelve outlet passageways 1918 discharge working fluid in a vapor state into the manifold discharge chamber 1086 via the tab outlet passageways 1074.

Although the manifold supply chamber 1084 and the manifold discharge chamber 1086 are structurally similar, the manifold supply chamber 1084 is has a different size than the corresponding manifold discharge chamber 1086. For example, for a heat exchanger plate 3022 configured for use as part of an array 1000 in an evaporator (FIGS. 36-38), the manifold supply chamber 1084 is smaller than the corresponding manifold discharge chamber 1086. This is achieved by forming the tab inlet openings 1076 with a smaller diameter than the tab outlet openings 1078. This size difference reflects the fact that the working fluid 580 enters an evaporator as a liquid at the inlet thus requiring less overall passageway volume than the same fluid as it exits the evaporator as a gas at the outlet. Accordingly, for a heat exchanger plate 4022 configured for use as part of an array 1000 in a condenser (FIGS. 39-41), the manifold supply chamber 1084 is larger than the corresponding manifold discharge chamber 1086.

Figure 41:
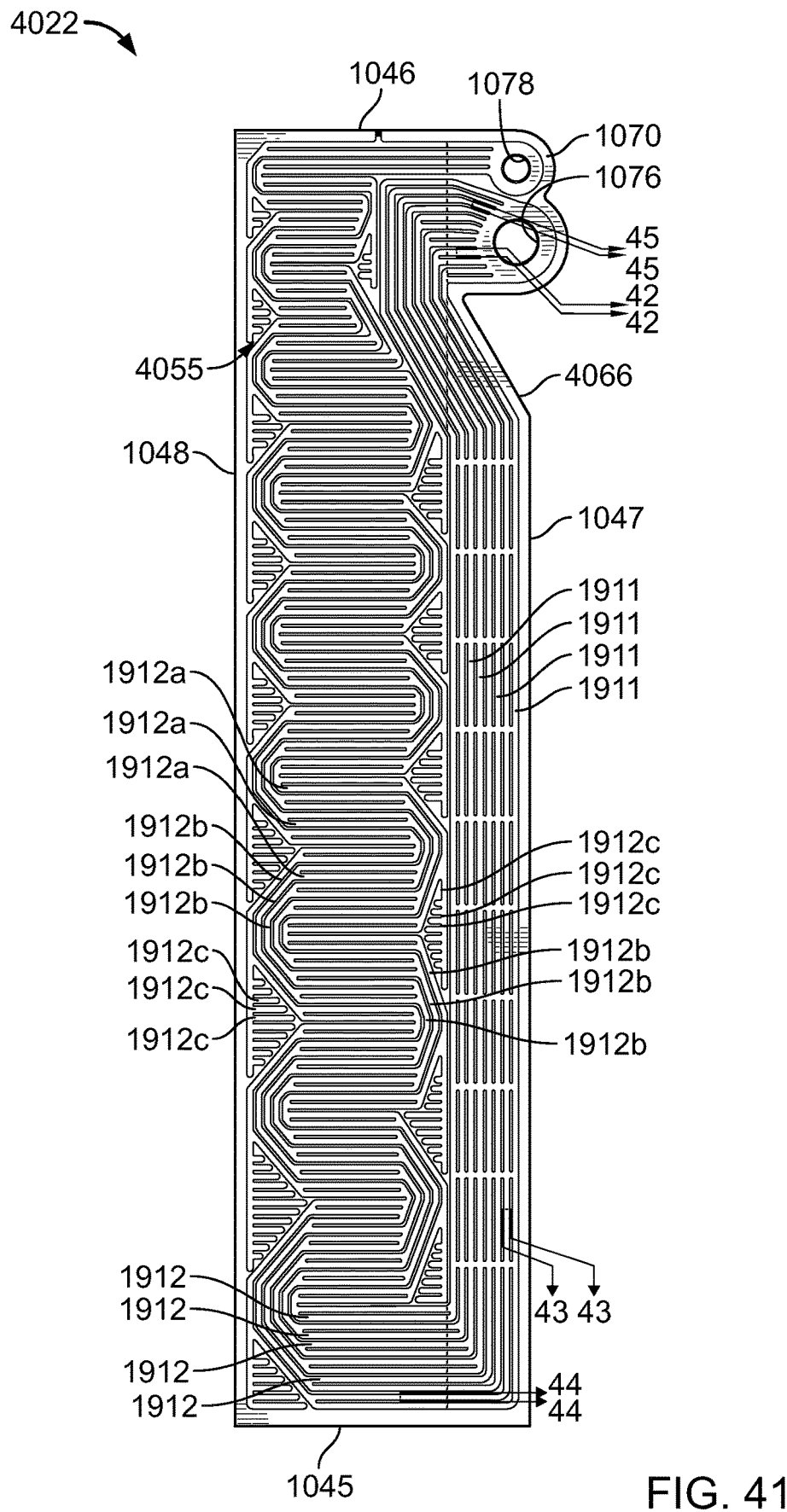
FIG. 41 is a top view of the heat exchange plate of FIG. 39.
Figure 42:
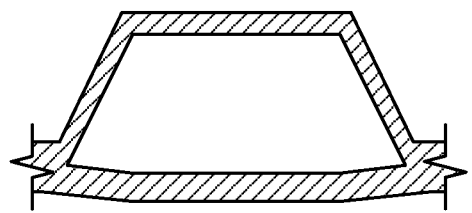
FIG. 42 is a cross-sectional view of a portion of the heat exchange plate as seen along line 42-42 of FIG. 38 and FIG. 41.

Referring to FIGS. 39-41, a heat exchange plate 4022 that is configured for use in a condenser is similar to the evaporator heat exchange plate 3022 described above with respect to FIGS. 36-38. In view of the similarity, like features will be referred to with like references numbers. The heat exchange plate 4022 includes a working flow passageway 4055, including several parallel mini-channels 1912 having an alternating serpentine pattern. The number of working fluid inlet passageways 1911 aligned with an axis parallel to the direction of flow of non-working fluid is greater in the condenser heat exchange plate 4022 than in the evaporator heat exchange plate 3022 in order to accommodate a relatively larger volume of fluid at the inlet in a condenser (e.g., gas) than at the inlet in an evaporator (e.g., liquid). In order to accommodate phase changes in the working fluid, (e.g., change from gas to liquid), the number of parallel flow passages per pass is decreased along the flow path of the working fluid from the passage inlet to the passage outlet. For example, the heat exchange plate 4022 in FIG. 39 has eight inlet passageways 1911 which each feed into twelve corresponding mini-channels 1912 adjacent the top edge 1045. The mini-channels 1912 extend along the plate in a serpentine fashion from the top edge 1045 to the bottom edge 1046. In FIG. 41, the condenser heat exchange plate 4022 is illustrated upside-down relative to its operating position with bottom edge 1046 overlying the top edge 1045. The flow from twelve mini-channels feeds into ten mini-channels at a first transition point 4914. The flow from ten mini-channels feeds into eight mini-channels at a second transition point 4916. The flow from the eight mini-channels feeds into six mini-channels at a third transition point 4920, and from six mini-channels to four mini-channels at a fourth transition point 4922. The resulting four mini-channels discharge through fluid outlets 1918.

The eight inlet passageways 1911 are supplied with the working fluid 580 in a vapor state by the manifold supply chamber 1084 via tab inlet passageways 1072, and the four outlet passageways 1918 discharge working fluid in a liquid state into the manifold discharge chamber 1086 via the tab outlet passageways 1074.

In both the condenser heat exchange plate 4022 and the evaporator heat exchange plate 3022, the mini-channels 1912 extend along the plate in a serpentine fashion from the top edge 1045 to the bottom edge 1046. The mini-channels 1912 include linear regions 1912a, curved regions 1912b and distributary channels 1912c. The linear regions 1912a extend in parallel to the top edge 1045. The curved regions 1912b connect adjacent linear regions 1912a and reside adjacent the plate right edge 1047 or left edge 1048. The distributary channels 1912c are channels that branch off from a mini-channel at a corresponding curved region 1912b. The distributary channels 1912c are in fluid communication with the corresponding curved region 1912b via a distributary fluid inlet 1912d that opens toward the manifold-end of the plate 3022, 4022. In particular, each distributary channel 1912c communicates with the mini-channel 1912 at a single location (e.g, the distributary fluid inlet 1912d), and each distributary channel 1912 is disposed in a generally triangular region defined by adjacent curved regions 1912b and the corresponding plate edge 1047 or 1048. Each distributary channel 1912c is branched to provide mini distributary channels that are configured to substantially fill the generally triangular region. It will be noted that the distributary channels are placed in areas of the plates 3022, 4022 that, in other embodiments, were not covered by working fluid flow passages, for example in the spaces between the serpentine mini-channels 1912 and plate edges 1045, 1046, 1047, 1048. By placing the distributary channels in these areas, a greater heat exchange surface area is provided for the working fluid. In addition, by placing the distributary channels in these areas, substantially the entire front surface is covered by the mini-channels 1912 whereby pooling of the non-working fluid unused areas is prevented and losses are reduced.

The condenser heat exchange plate 4022 and the evaporator heat exchange plate 3022 are each provided with a cut out 3066, 4066 formed in the plate right edge 1047. The cut out 3066, 4066 opens in the plate right edge 1047 at a location adjoining the tab 1070, and is generally V-shaped when viewed facing the front face 1040. During manufacture of the array, the pot 2050 is received within the cut out 3066, 4066. By providing the cut out 3066, 4066, during the potting step of manufacture of the heat exchange array 1000, the pot 2050 can surround a larger portion of each tab 1070, permitting epoxy to be placed around a larger portion of each tab 1070, than an array in which the plates 1022 are formed without the V shaped cut outs.

Figure 43:
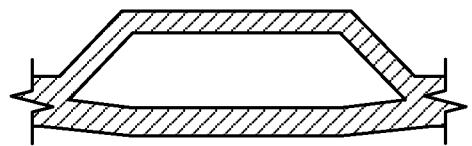
FIG. 43 is a cross-sectional view of a portion of the heat exchange plate as seen along line 43-43 of FIG. 38 and FIG. 41.
Figure 44:
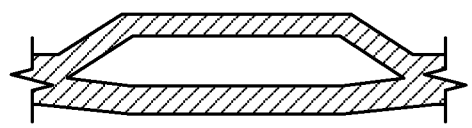
FIG. 44 is a cross-sectional view of a portion of the heat exchange plate as seen along line 44-44 of FIG. 38 and FIG. 41.
Figure 45:
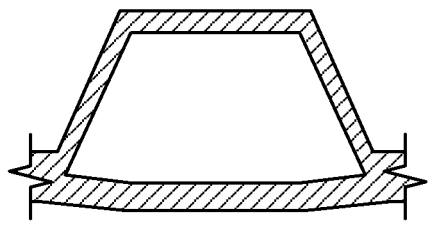
FIG. 45 is a cross-sectional view of a portion of the heat exchange plate as seen along line 45-45 of FIG. 38 and FIG. 41.

As previously discussed, the plate 1022 includes multiple zones, where each zone corresponds to a region in which the mini-channels 1912 are permitted to expand to a particular height. The evaporator heat exchange plate 3022 and the condenser heat exchange plate 4022 are each provided with three zones. For example, referring to FIGS. 38 and 42-46, the evaporator heat exchange plate 3022 includes a first zone Z1 that is disposed in the tab 1070 (e.g., the manifold region, see FIGS. 38, 42, 45 and 46), a second zone Z2 that extends along the third edge 1047 between the tab 1070 and the bottom edge 1046 (e.g., the inlet passageway region, see FIGS. 38, 43 and 46), and a third zone Z3 that extends between the first and second zones Z1, Z2 and the fourth edge 1048 (e.g., the active area, see FIGS. 38, 44 and 46). Of the three zones, the mini-channels 1912 in the first zone Z1 have the greatest height. The mini-channels 1912 in the second zone Z2 have a height that is less than that of the mini-channels in the first zone Z2 and greater than the height of the mini-channels 1912 in the third zone Z3.

The condenser heat exchange plate 4022 also includes three zones. Referring to FIGS. 41-46, like the evaporator heat exchange plate 3022, the condenser heat exchange plate includes a first zone Z1 that is disposed in the tab 1070 (e.g, the manifold region, see FIGS. 41, 42 and 45), a second zone Z2 that extends along the third edge 1047 between the tab 1070 and the bottom edge 1046 (e.g., the inlet passageway region, see FIGS. 41 and 43), and a third zone Z3 that extends between the first and second zones Z1, Z2 and the fourth edge 1048 (e.g., the active area, see FIGS. 41 and 44). Of the three zones, the mini-channels 1912 in the first zone Z1 have the greatest height. The mini-channels 1912 in the second zone Z2 have a height that is less than that of the mini-channels in the first zone Z2 and greater than the height of the mini-channels 1912 in the third zone Z3.

Figure 46:
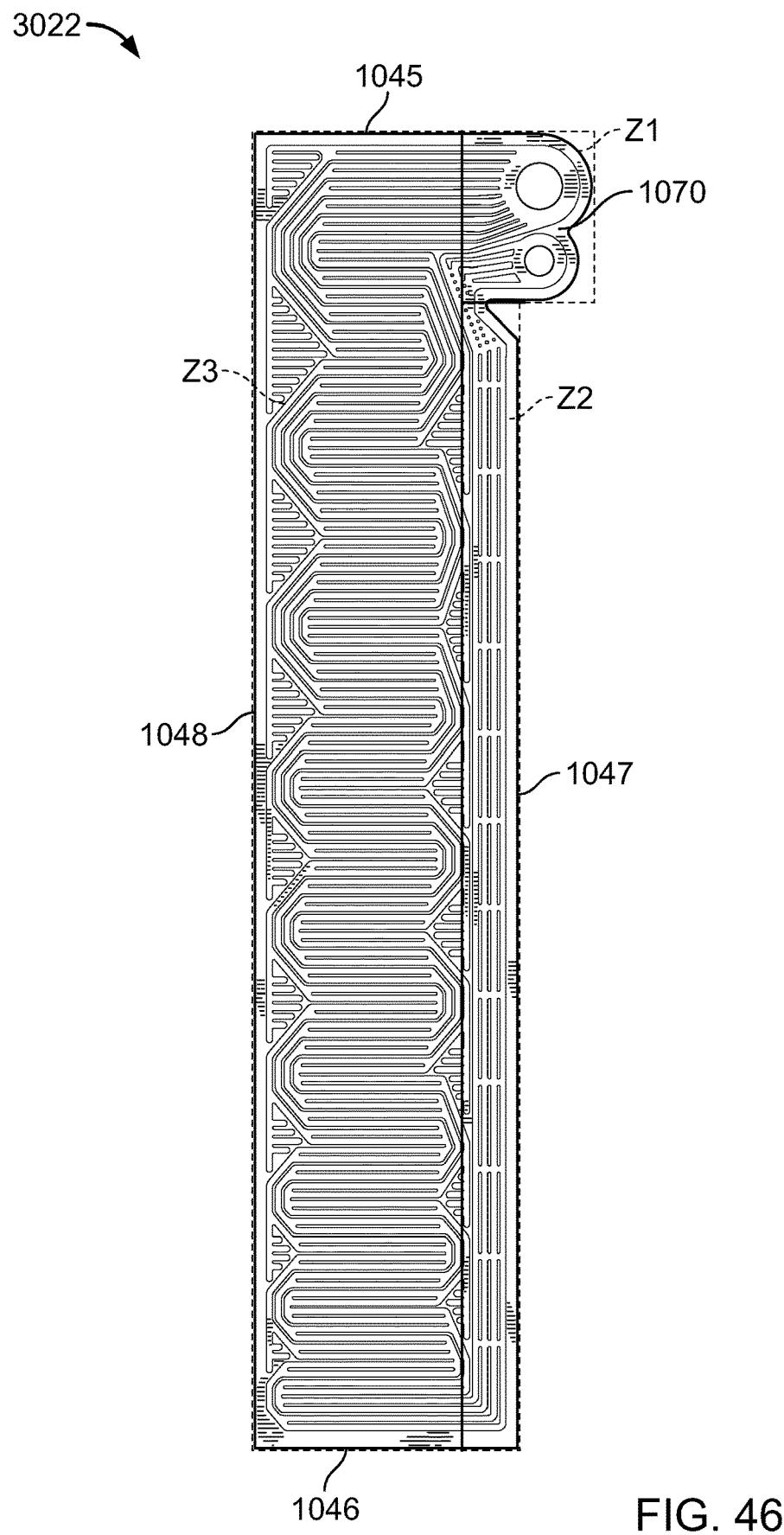
FIG. 46 is a top view of a heat exchange plate illustrating the location of zone 1, zone 2, and zone 3 with respect to the plate.

For example, in some embodiments, the height of the mini-channels 1912 in the first zone Z1 is about 5 mm, the height of the mini-channels 1912 in the second zone Z2 is about 3 mm, and the height of the mini-channels 1912 in the third zone Z3 is about 2 mm. When arranged in an array 1000, the mini-channels of the first zone Z1 of a plate 3022, 4022 abut the adjacent plate such that substantially no gap 1025 exists between adjacent plates within the first zone Z1. Within the second zone Z2, a gap 1025 of about 2 mm is provided between adjacent plates, while a gap 1025 of about 4 mm is provided between adjacent plates within the third zone Z3. The height of the zones Z1, Z2, Z3 and the arrangement of the zones Z1, Z2, Z3 is configured to help maintain the flow of non-working fluid within the "active area" of the heat exchanger plate. The active area is the area of the plate in which substantially most of the heat transfer occurs between the working fluid and the non-working fluid, and generally corresponds to the location of the serpentine flow channels and distributary channels. Thus, as seen in FIG. 46, the "active area" of the heat exchanger plate is generally located in the third zone Z3. Because the third zone Z3 is formed of mini-channels having a low height relative to those in the first and second zones Z1, Z2, resulting in a relatively large gap 1025 between adjacent plates when stacked, there is less resistance to flow in this area and therefore the non-working fluid will tend to flow through this area.

Figure 49:
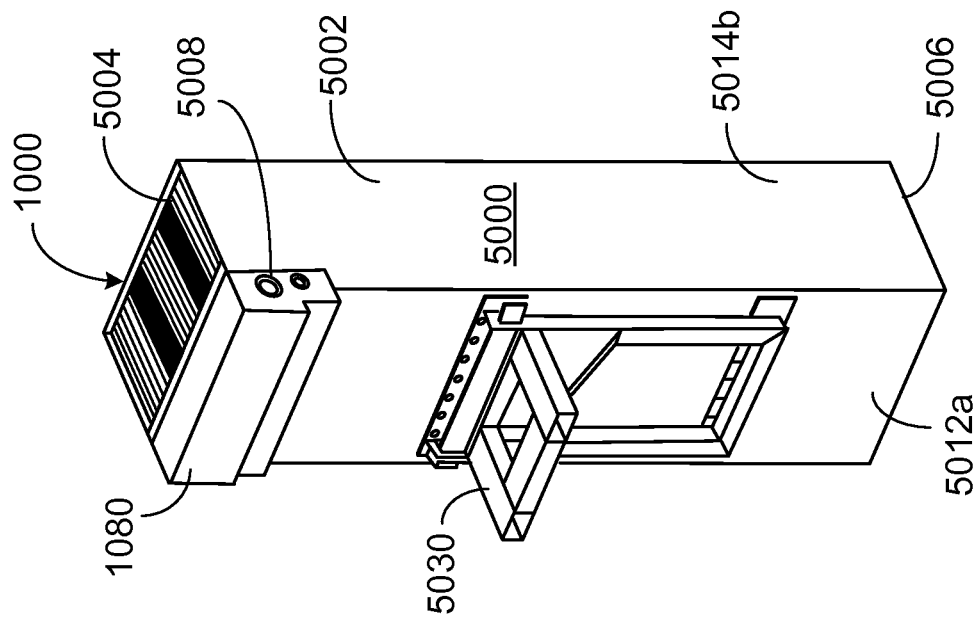
FIG. 49 is a perspective view of the array and cocoon of FIG. 48 including a handle.
Figure 48:
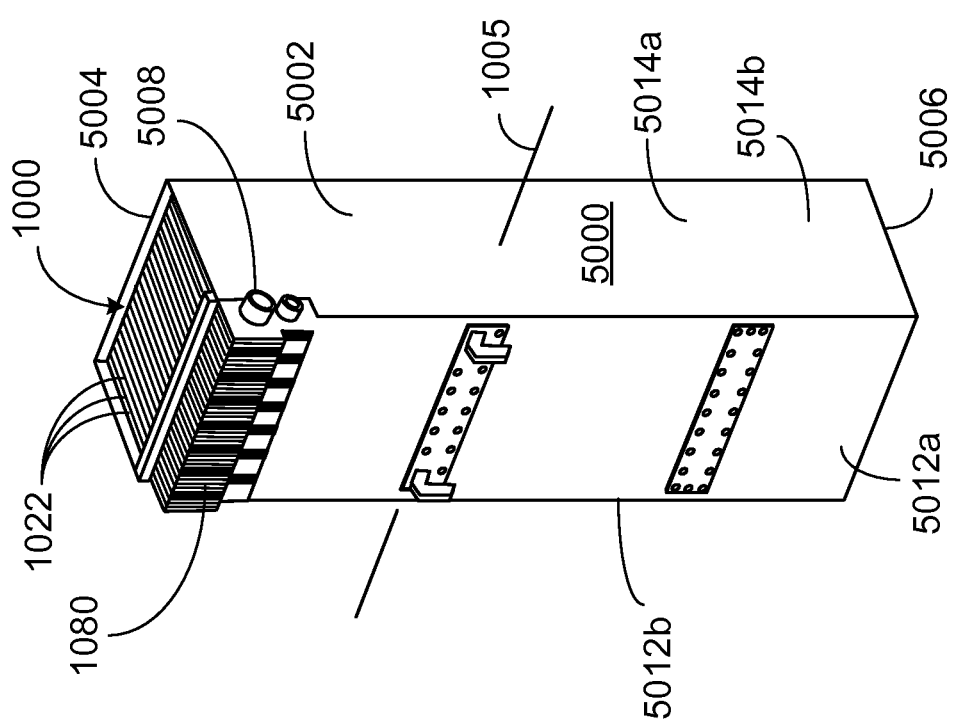
FIG. 48 is a perspective view of the array and cocoon of FIG. 47.

Referring to FIGS. 47-49, in some aspects, an array 1000 of heat exchange plates 1022, 3022, 4022 may be surrounded by a generally tubular housing (e.g., "cocoon") 5000 that surrounds the array 1000. The cocoon 5000 includes a sidewall 5002, an open first end 5004 and an open second end 5006 that is opposed to the first end 5004. The open first end 5004 defines an inlet of the cocoon 5000, permitting the non-working fluid to be directed into the gaps 1025 between the adjacent plates 1022, 3022, 4022 of the array 1000. The open second end 5006 defines an outlet of the cocoon 5000, permitting the non-working fluid to exit the gap 1025 after passing over the plate front and rear surfaces 1040, 1042. The sidewall 5002 also includes an opening 5008 that is configured to receive the manifold 1080, such that the manifold 1080 extends through the opening 5008 when the array is surrounded by the cocoon 5000.

The cocoon sidewall 5002 is an assembly of a first sidewall member 5012 and a second sidewall member 5014. Each sidewall member 5012, 5014 has an L shape when viewed in cross section, and the first sidewall member 5012 is identical to the second sidewall member 5014. In particular, the first sidewall member 5012 includes a first side 5012a, and a second side 5012b that is disposed at an end of the first side 5012a and extends perpendicular to the first side 5012a. Likewise, the second sidewall member 5014 includes a first side 5014a, and a second side 5014b that is disposed at an end of the first side 5014a and extends perpendicular to the first side 5014a. When assembled, the first sidewall member 5012 cooperates with the second sidewall member 5014 to form a tube having a rectangular cross section and includes the sides 5012a, 5012b, 5014a, 5014b. The heat exchange plates 1022, 3022, 4022 are supported in grooves 5010 formed on the inner surface of opposed sides 5012a, 5014a of the cocoon sidewall 5002. The grooves 5010 are parallel to each other and equally spaced apart in a direction parallel to the alignment axis 1005. The groove spacing corresponds to the desired distance between the plates 1022, 3022, 4022. Each groove 5010 is configured to receive and support a heat exchanger plate. Because the first and second sidewall members 5012, 5014 are L-shaped and identical, assembly of the cocoon is simplified, and the alignment of the grooves 5010 on the opposed sides 5012a, 5014a of the cocoon 5000 is assured.

Referring to FIG. 49, in some aspects, the cocoon includes a handle 5030 disposed on the outside surface of one side 5012a. The handle 5030 can be selectively attached and detached from the side 5012a, and is used to facilitate handling of the array 1000, particularly during installation in a heat exchange module 524.

The cocoon 5000 provides several benefits. For example, the cocoon 5000 is configured to support the heat exchanger plates 1022, 3022, 4022 and help to maintain them in the parallel, spaced apart relationship both during array assembly and in operation. For example, the cocoon 5000 holds the heat exchanger plates in a parallel, stacked arrangement having the desired plate spacing, whereby the alignment jig and/or mandrels, described above with respect to step 3003 of the method of manufacturing the heat exchange array 1000 may not be required, simplifying the manufacturing process. The cocoon 5000 protects the heat exchanger plates 1022, 3022, 4022 from the damage from external structures during shipping and during assembly with other arrays within a heat exchange module 524. During use, the cocoon 5000 directs the non-working fluid into the array 1000, and maintains the flow of the non-working fluid within the array and over the active area.

In addition, although the heat exchange devices and systems are described herein with application to evaporators and condensers of OTEC power plants, the heat exchange devices and systems are not limited to this application. For example, the heat exchange devices and systems described herein would be useful in other applications requiring high efficiency heat exchange such as steam dump condensers and other waste heat conversion devices, and passive cooling systems of nuclear fuel plants.

Selected illustrative embodiments of the heat exchanger device and method of manufacture are described above in some detail. It should be understood that only structures considered necessary for clarifying the embodiment have been described herein. Other conventional structures, and those of ancillary and auxiliary components of the system, are assumed to be known and understood by those skilled in the art. Moreover, while a working example of the device and method have been described above, the device and method are not limited to the working example described above, but various design alterations may be carried out.

What is claimed is:

1. A heat exchange plate comprising:
a front face that defines a first heat exchange surface,
a back face on a side of the plate opposed to the front face, the back face defining a second heat exchange surface;
a peripheral edge that borders the front face and the back face, the peripheral edge comprising a first edge, a second edge spaced apart from and extending in parallel to the first edge, a third edge extending between the first edge and the second edge, and a fourth edge spaced apart from and extending in parallel to a portion of the third edge, the fourth edge extending between the first edge and the second edge,
an interior fluid passageway disposed between the front face and the back face, a surface of the interior fluid passageway defining a third heat exchange surface, the interior fluid passageway comprising a fluid inlet and a fluid outlet,
a manifold region defining a manifold supply chamber extending through the heat exchange plate from the front face to the back face and a manifold discharge chamber extending through the heat exchange plate from the front face to the back face,
wherein the fluid inlet and the fluid outlet are disposed in the manifold region, the fluid inlet opens to the manifold supply chamber, and the fluid outlet opens to the manifold discharge chamber
wherein the front face comprises outwardly protruding regions corresponding to a location of the interior fluid passageway, the outwardly protruding regions protruding in a given location to an extent that is defined by a height of the interior fluid passageway in the given location, where height refers to a dimension in a direction normal to the front face, the outwardly protruding regions including:
a first zone corresponding to a first interior fluid passageway height, and
a second zone corresponding to a second interior fluid passageway height, where the first interior fluid passageway height is greater than the second interior fluid passageway height,
wherein the first zone is disposed in the manifold region, the second zone extends along the third edge between the manifold region and the second edge,
wherein the third edge of the peripheral edge comprises:
at least one linear side edge, and
a cut out region that opens along the linear side edge, wherein the manifold region extends outward relative to the at least one linear side edge in a direction normal to the linear side edge, and the cut out region is adjacent the manifold region.

2. The heat exchange plate of claim 1, wherein the cut out region is generally triangular when viewed facing the front face.

3. A heat exchanger comprising
two or more of the heat exchange plates of claim 1 in a stacked arrangement such that each heat exchange plate is spaced apart from adjacent heat exchange plates, a space between the adjacent heat exchange plates defining an external fluid passageway, each external fluid passageway configured to receive a first fluid
a manifold having fluid communication with the manifold supply chamber of each heat exchange plate, and
a housing that surrounds the stacked arrangement of the heat exchange plates, the housing configured to support the heat exchange plates spaced apart from the adjacent heat exchange plates.

4. The heat exchanger of claim 3, wherein the housing comprises a sidewall, an open first end and an open second end that is opposed to the first end, the open first end defining the fluid inlet for the first fluid into the respective external passageways, and the open second end defining a fluid outlet for the respective first fluid from the external passageways.

5. The heat exchanger of claim 3, wherein the housing comprises an opening configured to receive the manifold, and the manifold extends through the opening.

6. The heat exchanger of claim 3 wherein the housing comprises four sides arranged to form a rectangle when viewed in cross-section, and an inner surface of a pair of opposed sides of the housing is formed having parallel grooves, and each groove configured to receive and support a heat exchange plate.

7. The heat exchanger of claim 6 wherein the housing is an assembly of a first sidewall member and a second sidewall member, each sidewall member having an L shape in cross section, wherein the first sidewall member is identical to the second sidewall member.

8. The heat exchanger of claim 3 further comprising a handle disposed on an outer surface of the housing.

9. The heat exchanger of claim 8, wherein the handle is selectively detachable from the outer surface.

10. The heat exchanger of claim 3, wherein each heat exchange plate comprises a flange connector configured to connect to a flange connector of another heat exchange plate.

11. The heat exchanger of claim 10, wherein:
the flange connector comprises a first end and a second end, the first end having a first outer diameter greater than a second outer diameter of the second end,
the flange connector further comprises a sealing member disposed at the first end of the flange connector, and
the first end of the flange connector is configured to sealingly connect to a first end of the flange connector of the other heat exchange plate.

12. The heat exchange plate of claim 1, further comprising a third zone corresponding to a third interior fluid passageway height and the second interior fluid passageway height is greater than the third interior fluid passageway height.

13. The heat exchange plate of claim 12, wherein the third zone extends between the first and second zones and the fourth edge.

14. The heat exchange plate of claim 12, wherein the third zone is disposed in an area in which the interior fluid passageway extends along a serpentine path.

15. A heat exchange plate comprising:
a front face that defines a first heat exchange surface,
a back face on a side of the plate opposed to the front face, the back face defining a second heat exchange surface;
a peripheral edge that borders the front face and the back face, wherein peripheral edge includes a first edge, a second edge spaced apart from and extending in parallel to the first edge, a third edge extending between the first edge and the second edge, and a fourth edge spaced apart from and extending in parallel to the third edge, the fourth edge extending between the first edge and the second edge, and
an interior fluid passageway disposed between the front face and the back face, a surface of the interior fluid passageway defining a third heat exchange surface,
wherein the front face comprises outwardly protruding regions corresponding to a location of the interior fluid passageway, the outwardly protruding regions protruding in a given location to an extent that is defined by a height of the interior fluid passageway in the given location, where height refers to a dimension in a direction normal to the front face, the outwardly protruding regions including
a first zone corresponding to a first interior fluid passageway height, and
a second zone corresponding to a second interior fluid passageway height, where the first interior fluid passageway height is greater than the second interior fluid passageway height,
wherein a manifold region extends outward relative to a linear portion of the third edge, the first zone is disposed in the manifold region, and the second zone extends along the third edge between the manifold region and the second edge.

16. The heat exchange plate of claim 15, further comprising a third zone corresponding to a third interior fluid passageway height, where the second interior fluid passageway height is greater than the third interior fluid passageway height.

17. The heat exchange plate of claim 16, wherein the third zone is disposed in an area in which the interior fluid passageway extends along a serpentine path.

18. The heat exchange plate of claim 15, further comprising
a fluid inlet in communication with the interior fluid passageway,
a fluid outlet in communication with the interior fluid passageway, and
wherein the fluid inlet and the fluid outlet are disposed in the manifold region, and the first zone is disposed in the manifold region, and the second zone is disposed outside the manifold region.

19. The heat exchange plate of claim 15, further comprising a third zone corresponding to a third interior fluid passageway height, where the second interior fluid passageway height is greater than the third interior fluid passageway height, and the third zone extends between the first and second zones and the fourth edge.

20. The heat exchange plate of claim 15, wherein the interior fluid passageway is defined by a substantially flat interior surface of the heat exchange plate and a substantially non-flat interior surface of the heat exchange plate.

* * * * *